United States Patent
Kasaoka et al.

(10) Patent No.: US 8,232,701 B2
(45) Date of Patent: Jul. 31, 2012

(54) MAGNETIC MACHINE

(75) Inventors: Kota Kasaoka, Saitama-ken (JP);
Noriyuki Abe, Saitama-ken (JP);
Shigemitsu Akutsu, Wako (JP);
Satoyoshi Oya, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 12/864,937

(22) PCT Filed: Nov. 5, 2008

(86) PCT No.: PCT/JP2008/070096
§ 371 (c)(1),
(2), (4) Date: Jul. 28, 2010

(87) PCT Pub. No.: WO2009/098807
PCT Pub. Date: Aug. 13, 2009

(65) Prior Publication Data
US 2010/0308674 A1 Dec. 9, 2010

(30) Foreign Application Priority Data

Feb. 8, 2008 (JP) .................................. 2008-029772
Jun. 12, 2008 (JP) .................................. 2008-154211

(51) Int. Cl.
*H02K 16/00* (2006.01)
(52) U.S. Cl. ..................... 310/114; 310/112; 310/156.36
(58) Field of Classification Search .......... 310/112–114, 310/268, 156.36
See application file for complete search history.

(56) References Cited

U.S. PATENT DOCUMENTS

| 7,095,155 B2 * | 8/2006 | Takeuchi ...................... 310/266 |
| 2006/0022552 A1 * | 2/2006 | Zhu et al. ...................... 310/268 |
| 2007/0205689 A1 * | 9/2007 | Nemoto et al. .......... 310/156.47 |
| 2008/0030090 A1 | 2/2008 | Abe et al. |

FOREIGN PATENT DOCUMENTS

| JP | 11-341757 | 12/1999 |
| JP | 2006-187194 | 7/2006 |
| JP | 2008-039045 | 2/2008 |
| JP | 2008-067592 | 3/2008 |
| JP | 4085128 | 5/2008 |
| WO | 2008/016135 | 2/2008 |

* cited by examiner

*Primary Examiner* — Quyen Leung
*Assistant Examiner* — Leda Pham
(74) *Attorney, Agent, or Firm* — Squire Sanders (US) LLP

(57) ABSTRACT

To provide a magnetic machine capable of reducing the ripple and cogging of torque or thrust. An electric motor 1 includes three stators 6 to 8 each having an armature row, a rotor 3 having a permanent magnet row, and a rotor 10 having a soft magnetic material row. The respective phases in electrical angle between magnetic poles generated at respective armatures 6a to 8a of the armature row and the magnetic poles of the permanent magnet row are set to be each displaced in a predetermined direction by an electrical angle of $2\pi/3$, and the respective phases in electrical angle between the magnetic poles generated at the respective armatures 6a to 8a of the armature row and soft magnetic material cores 11b to 13b of the soft magnetic material row are set to be each displaced in the predetermined direction by an electrical angle of $\pi/3$.

13 Claims, 24 Drawing Sheets

F I G. 5
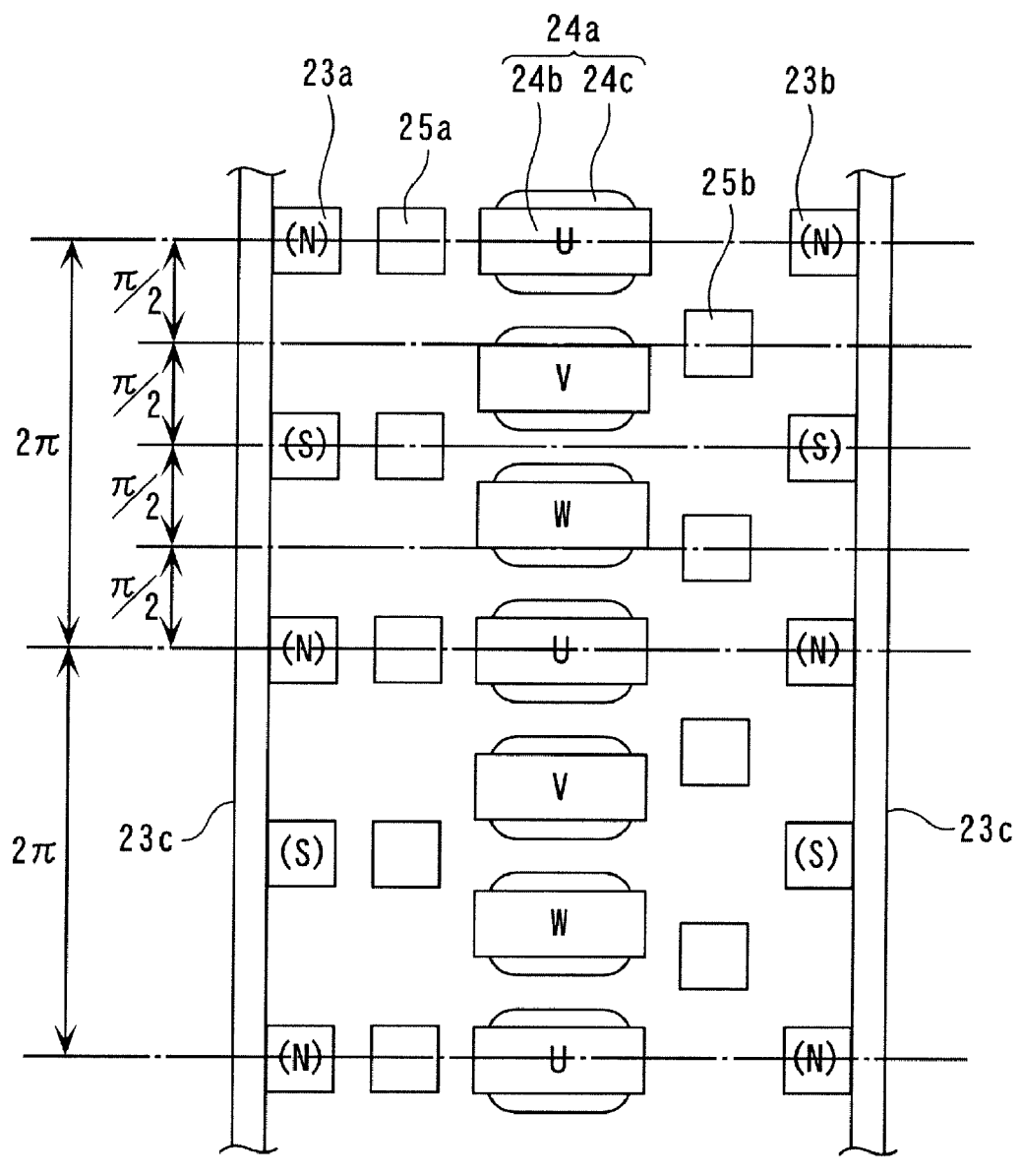

F I G. 7A
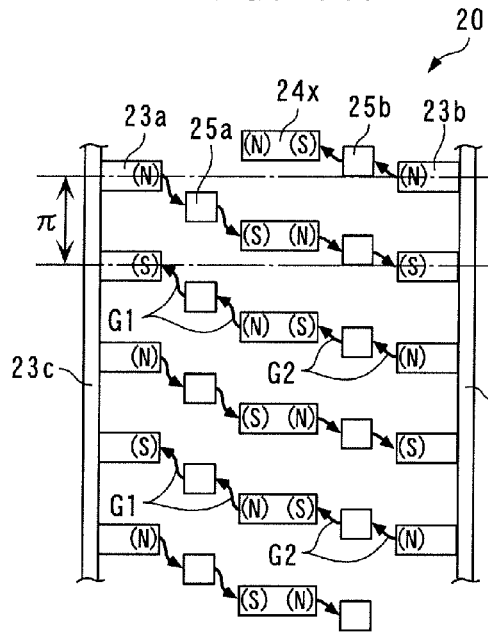
F I G. 7B
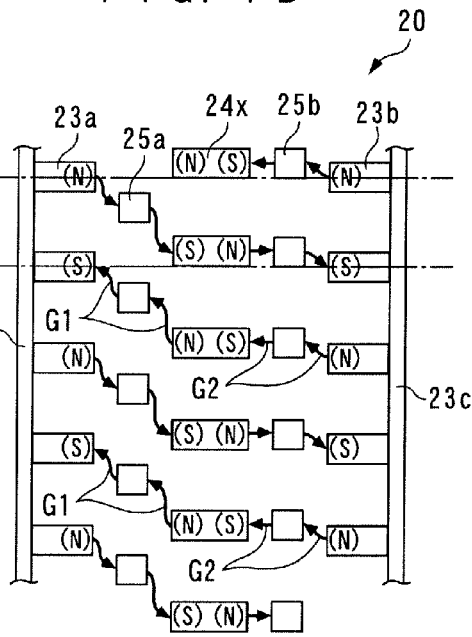
F I G. 7C
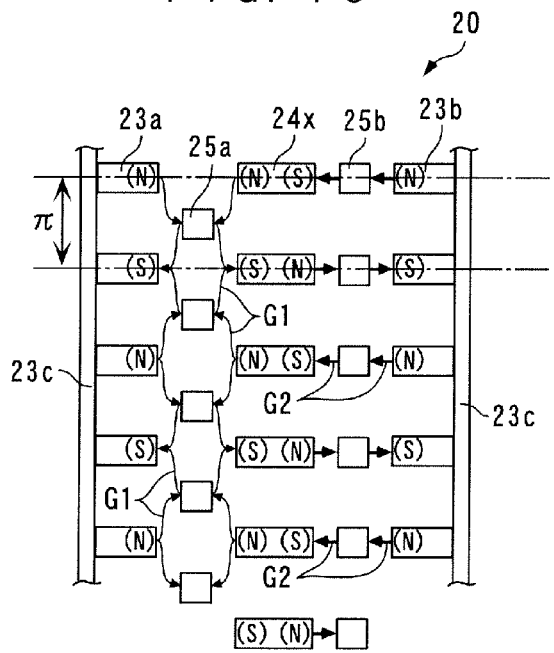

F I G. 10A
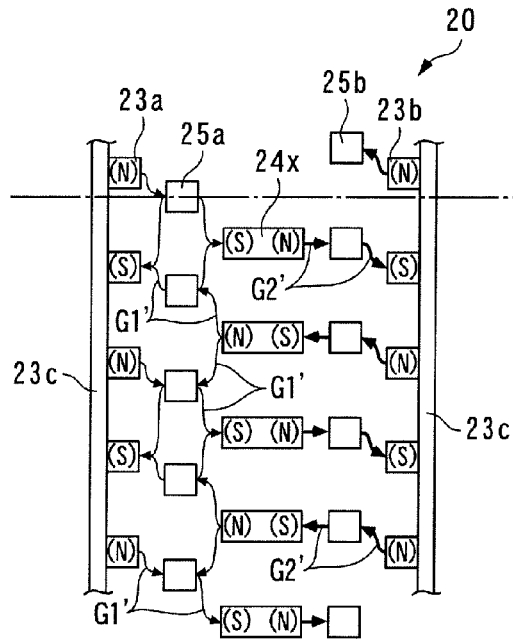
F I G. 10B
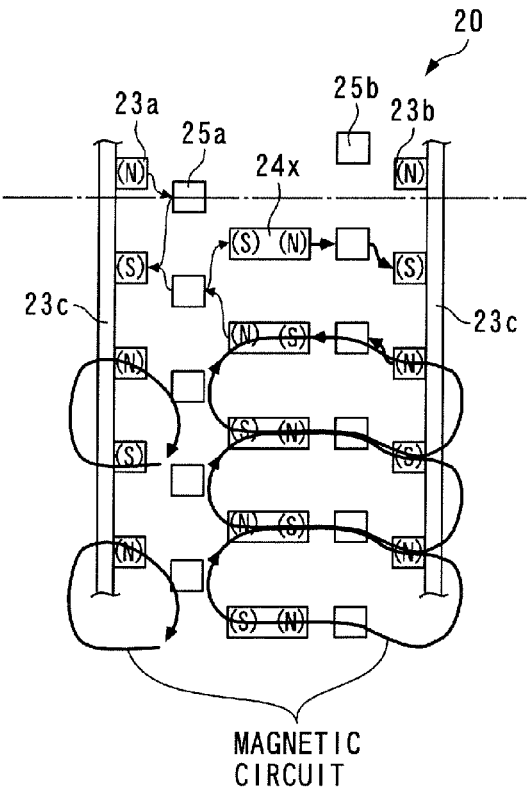
MAGNETIC CIRCUIT
F I G. 10C
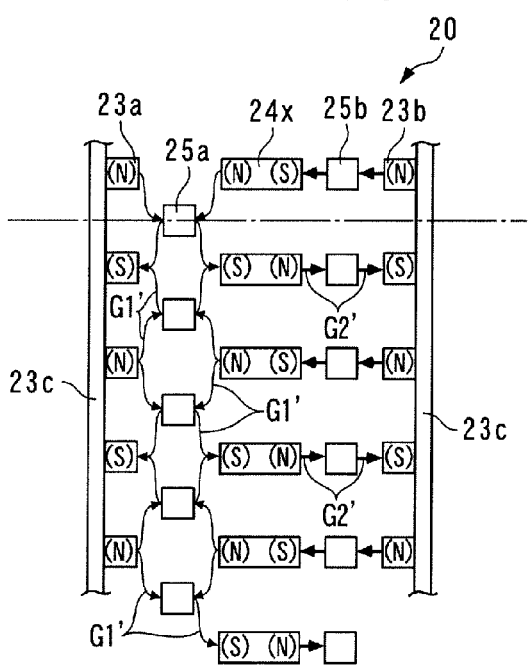

SECOND ELECTRIC MOTOR STRUCTURE ced in Patent Literature 1 is known. This electric motor includes a cylindrical inner rotor, a hollow cylindrical stator, a hollow cylindrical outer rotor, and so forth. The inner rotor has a plurality of permanent magnets arranged in the circumferential direction. Further, the stator includes a plurality of armatures. The armatures are circumferentially arranged, and are fixed to each other by a resin mold. The outer roller is formed by winding coils around respective cores formed by laminating a plurality of rings, but the coils are not supplied with electric power. Further, the inner rotor, the stator, and the outer rotor are arranged sequentially from inside, and are rotatable relative to each other.

MAGNETIC MACHINE

FIELD OF THE INVENTION

The present invention relates to a magnetic machine equipped with stators and movable elements the total sum of which is not smaller than three, that is, an electric motor or a magnetic power transmission system.

BACKGROUND ART

Conventionally, as an electric motor, one disclosed in Patent Literature 1 is known. This electric motor includes a cylindrical inner rotor, a hollow cylindrical stator, a hollow cylindrical outer rotor, and so forth. The inner rotor has a plurality of permanent magnets arranged in the circumferential direction. Further, the stator includes a plurality of armatures. The armatures are circumferentially arranged, and are fixed to each other by a resin mold. The outer roller is formed by winding coils around respective cores formed by laminating a plurality of rings, but the coils are not supplied with electric power. Further, the inner rotor, the stator, and the outer rotor are arranged sequentially from inside, and are rotatable relative to each other.

In the electric motor constructed as above, the stator is supplied with electric power to generate a rotating magnetic field, and accordingly, magnetic poles of the permanent magnets of the inner rotor are attracted or repelled by the magnetic poles of the stator, whereby the inner rotor is caused to rotate synchronously with the rotating magnetic field, while the outer rotor is caused to rotate asynchronously by electromagnetic induction. As described above, the electric motor disclosed in Patent Literature 1 functions not as a synchronous machine but as an induction machine in which the outer rotor is caused to rotate by electromagnetic induction, and hence suffers from the problem of low efficiency.

As an electric motor capable of solving the above problem, the present applicant has already proposed an electric motor disclosed in Patent Literature 2. The electric motor shown in FIGS. 1 to 6 in Patent Literature 2 is a rotating electric motor, and comprises two outer stators arranged on an outer side thereof, inner stators arranged between the two outer stators, and soft magnetic material rotors disposed between the outer and inner stators and each having two rotor sections. A plurality of armatures are arranged at predetermined spaced intervals on each outer stator, and when the electric motor operates, these armatures are provided with electric power such that N poles and S poles are alternately arranged.

Further, also on each inner stator, there are arranged a plurality of armatures at predetermined spaced intervals smaller than the spaced intervals at which the armatures are arranged on each outer stator. When electric power is supplied, the coils of each adjacent three of the armatures on each inner stator are formed as three-phase coils which exhibit U-phase, V-phase, and W-phase, respectively, and generate a moving magnetic field. Furthermore, a plurality of soft magnetic material cores are arranged on each of the two rotor sections of each soft magnetic material rotor at the same spaced intervals as the spaced intervals at which the armatures are arranged on each outer stator. When the positions of magnetic poles generated at the armatures of the outer stators are used as references, the soft magnetic material cores of one of the rotor sections are arranged such that they are displaced by an electrical angle of $\pi/2$ from corresponding ones of the soft magnetic material cores of the other rotor section.

In the above electric motor, along with generation of the moving magnetic fields at the inner stator, magnetic circuits are formed between magnetic poles generated at the armatures of the inner stators, the soft magnetic material cores, and the magnetic poles of the armatures of the outer stators, and magnetic force lines acting on the soft magnetic material cores of the two soft magnetic material rotors drive the two rotor sections, that is, the soft magnetic material rotors, for rotation. At this time, the two rotor sections rotate in unison with each other, while alternately repeating respective states in which the magnetic forces acting on the soft magnetic material cores of one of the rotor sections and the magnetic forces acting on the soft magnetic material cores of the other rotor section increase and decrease by turns. As described above, the electric motor functions as a synchronous machine during operation thereof, whereby it is possible to improve the efficiency compared with the electric motor disclosed in Patent Literature 1.

Further, as a magnetic power transmission system corresponding to the magnetic machine, the present applicant has already proposed one disclosed in Patent Literature 3. This magnetic power transmission system has a construction corresponding to a construction formed by replacing the magnetic poles generated at the armatures in Patent Literature 2 with the magnetic poles of permanent magnets.

[Patent Literature 1] Japanese Laid-Open Patent Publication (Kokai) No. H11-341757

[Patent Literature 2] Japanese Laid-Open Patent Publication (Kokai) No. 2008-67592

[Patent Literature 3] Japanese Laid-Open Patent Publication (Kokai) No. 2008-39045

DISCLOSURE OF THE INVENTION

As described above, according to the electric motor disclosed in Patent Literature 2, for a structural reason, it has a characteristic that the magnetic forces acting on the soft magnetic material cores of one of the rotor sections of each soft magnetic material rotor and the magnetic forces acting on the soft magnetic material cores of the other rotor section thereof increase and decrease by turns, and hence it has the problem of occurrences of torque ripple and cogging torque.

Further, the magnetic power transmission system disclosed in Patent Literature 3 has the above-described construction, and hence there are also caused cogging torque and the like during operation thereof, similarly to the electric motor disclosed in Patent Literature 2.

The present invention has been made to provide a solution to the above-described problems, and an object thereof is to provide an magnetic machine which is capable of reducing the ripple or cogging of torque or thrust.

To attain the object, a magnetic machine (electric motor 1, 1A) as recited in claim 1 comprises a first magnetic pole member (first to third stators 6 to 8, casing 2) having a first magnetic pole row formed of a plurality of first magnetic poles (first to third armatures 6a to 8a) arranged side by side in a predetermined direction, the first magnetic pole row being arranged such that each adjacent two of the first magnetic poles are different in polarity from each other, a second magnetic pole member (first rotor 3) having a second magnetic pole row formed of a plurality of second magnetic poles (first and second permanent magnets 4b, 5b) arranged side by side in the predetermined direction, the second magnetic pole row being arranged such that each adjacent two of the second magnetic poles are different in polarity from each other and the second magnetic pole row is opposed to the first magnetic pole row, and a soft magnetic material member (second rotor 10) having a soft magnetic material row formed of a plurality of soft magnetic material elements (first to third soft magnetic material cores 11*b* to 13*b*) arranged side by side in a manner spaced from each other in the predetermined direction, the soft magnetic material row being arranged between the first magnetic pole row and the second magnetic pole row, wherein during operation of the magnetic machine, magnetic circuits are formed between at least two of the first magnetic pole row, the second magnetic pole row, and the soft magnetic material row, the magnetic machine further comprising m (m is an integer not smaller than 3) magnetic machine structures, each of the magnetic machine structures being formed by a set of the first magnetic pole row, the second magnetic pole row, and the soft magnetic material row, wherein each adjacent two of the magnetic machine structures are configured to be different from each other in a phase difference in electrical angle between the first magnetic poles of the first magnetic pole row and the second magnetic poles of the second magnetic pole row in the predetermined direction, and are configured to be different from each other in a phase difference in electrical angle between the first magnetic poles of the first magnetic pole row and the soft magnetic material elements of the soft magnetic material row in the predetermined direction, and wherein in the m magnetic machine structures, the first magnetic pole row, the second magnetic pole row, and the soft magnetic material row are configured to be relatively movable with respect to each other in the predetermined direction.

According to this magnetic machine, in the m magnetic machine structures, the first magnetic pole row, the second magnetic pole row and the soft magnetic material row are configured to be relatively movable with respect to each other in the predetermined direction, and during operation of the magnetic machine, magnetic circuits are formed between at least two of the first magnetic pole row, the second magnetic pole row and the soft magnetic material row, so that magnetic forces generated between at least two of the first magnetic pole row, the second magnetic pole row and the soft magnetic material row vary with the relative motions of the first magnetic pole row, the second magnetic pole row and the soft magnetic material row. Further, they are configured to be different from each other in the phase difference in electrical angle between the first magnetic poles of the first magnetic pole row and the second magnetic poles of the second magnetic pole row in the predetermined direction, and are configured to be different from each other in the phase difference in electrical angle between the first magnetic poles of the first magnetic pole row and the soft magnetic material elements of the respective soft magnetic material row in the predetermined direction. Therefore, when the above-mentioned relative motions of the first magnetic pole rows, the second magnetic pole rows and the soft magnetic material rows occur, the magnetic forces vary in a state different from each other between each two adjacent magnetic machine structures, and a change in the strength of the magnetic forces in one of the two magnetic machine structures occurs with a time lag in the other of the same.

Therefore, assuming that this magnetic machine is a magnetic power transmission system, since it includes three or more magnetic machine structures, compared with a magnetic power transmission system including only two magnetic machine structures, such as the magnetic power transmission system disclosed in Patent Literature 3, it is possible to more finely set the phase difference in electrical angle between the first magnetic poles of each first magnetic pole row and the second magnetic poles of each second magnetic pole row in the predetermined direction, and the phase difference in electrical angle between the first magnetic poles of each first magnetic pole row and the soft magnetic material elements of each soft magnetic material row in the predetermined direction. This makes it possible to reduce the cogging of torque or thrust and the like. Especially, as the number of magnetic machine structures is larger, it is possible to further reduce the cogging of torque or thrust and the like (It should be noted that throughout the specification, the "magnetic machine" is intended to mean an electric motor, such as a rotating electric motor or a linear motor, and a magnetic power transmission system that transmits a driving force via magnetism).

The invention as recited in claim 2 is the magnetic machine (electric motor 1, 1A) as recited in claim 1, wherein the m magnetic machine structures are configured to be each displaced from each other in the phase difference in electrical angle between the first magnetic poles of the first magnetic pole row and the second magnetic poles of the second magnetic pole row in the predetermined direction by an electrical angle of $2\pi/m$, and are configured to be each displaced from each other in the phase difference in electrical angle between the first magnetic poles of the respective first magnetic pole row and the soft magnetic material elements of the respective soft magnetic material row in the predetermined direction by an electrical angle of $\pi/m$.

According to this magnetic machine, the m magnetic machine structures are configured to be each displaced from each other in the phase difference in electrical angle between the first magnetic poles of the first magnetic pole row and the second magnetic poles of the second magnetic pole row in the predetermined direction by an electrical angle of $2\pi/m$, and are configured to be each displaced from each other in the phase difference in electrical angle between the first magnetic poles of the respective first magnetic pole row and the soft magnetic material elements of the respective soft magnetic material row in the predetermined direction by an electrical angle of $\pi/m$. Therefore, for example, assuming that the magnetic machine is constructed as a rotating electric motor by setting the first magnetic poles or the second magnetic poles to magnetic poles generated by armatures, equations (equations (65) to (67), referred to hereinafter) for calculating the counter-electromotive force voltages of the rotating electric motor become the same as equations (equations (28) to (30), referred to hereinafter) for calculating the counter-electromotive force voltages of the rotating electric motor disclosed in Patent Literature 2, as described hereinafter. Therefore, it is possible to operate the electric motor in the same operating state as that of the rotating electric motor disclosed in Patent Literature 2. That is, when the first magnetic pole rows are stopped, the soft magnetic material rows and the second magnetic pole rows can be driven to move along the predetermined direction, and when the second magnetic pole rows are stopped, the soft magnetic material rows and the first magnetic pole rows can be driven to move along the predetermined direction. On the other hand, when the magnetic machine is constructed as a magnetic power transmission system by setting the first magnetic poles and the second magnetic poles to the magnetic poles of permanent magnets, this magnetic power transmission system corresponds to an electric motor obtained by replacing the armatures of the above-mentioned electric motor with permanent magnets. Therefore, assuming that the magnetic power transmission system is e.g. of a torque transmission type, since this magnetic power transmission system includes three or more magnetic machine structures, compared with the magnetic power transmission system including only two magnetic machine structures, such as the magnetic power transmission system disclosed in Patent Literature 3, it is possible to more finely set the phase difference in electrical angle between the first magnetic poles of each first magnetic pole row and the second magnetic poles of each second magnetic pole row in the predetermined direction, and the phase difference in electrical angle between the first magnetic poles of each first magnetic pole row and the soft magnetic material elements of each soft magnetic material row in the predetermined direction. This makes it possible to further reduce the cogging of torque and the like.

The invention as recited in claim 3 is the magnetic machine as recited in claim 1 or 2, wherein the first magnetic pole member (first to third stators 6 to 8, casing 2) includes m first magnetic pole rows in the m magnetic machine structures, wherein the second magnetic pole member (first rotor 3) includes m second magnetic pole rows in the m magnetic machine structures, and wherein the soft magnetic material member (second rotor 10) includes m soft magnetic material rows in the m magnetic machine structures.

According to this magnetic machine, it is possible to realize a magnetic machine having the m magnetic machine structures using only one first magnetic pole member, only one second magnetic pole member, and only one soft magnetic material member. This makes it possible to reduce the number of component parts to thereby reduce manufacturing costs of the magnetic machine.

The invention as recited in claim 4 is the magnetic machine as recited in any one of claims 1 to 3, wherein at least one of the first magnetic pole member and the second magnetic pole member includes a plurality of armatures (first to third armatures 6a to 8a), and the plurality of armatures are configured to be capable of generating at least ones of the first magnetic poles and the second magnetic poles, and be capable of generating a moving magnetic field that moves in the predetermined direction, by the generated at least ones of the first magnetic poles and the second magnetic poles.

According to this magnetic machine, at least one of the first magnetic pole member and the second magnetic pole member includes a plurality of armatures, and the plurality of armatures are configured to be capable of generating at least ones of the first magnetic poles and the second magnetic poles, and be capable of generating a moving magnetic field that moves in the predetermined direction, by the generated at least ones of the first magnetic poles and the second magnetic poles. Therefore, the magnetic machine is constructed as an electric motor. Accordingly, assuming, for example, that this electric motor is a rotating electric motor, it can be operated in the same operating state as that of the rotating electric motor disclosed in Patent Literature 2. Further, since the magnetic machine includes three or more magnetic machine structures, compared with the electric motor including only two magnetic machine structures, such as the electric motor disclosed in Patent Literature 2, it is possible to more finely set the phase difference in electrical angle between the first magnetic poles of each first magnetic pole row and the second magnetic poles of each second magnetic pole row in the predetermined direction, and the phase difference in electrical angle between the first magnetic poles of each first magnetic pole row and the soft magnetic material elements of each soft magnetic material row in the predetermined direction. This makes it possible to further reduce torque ripple and cogging torque. Especially, as the number of magnetic machine structures is larger, it is possible to further reduce the torque ripple and cogging torque. Further, when the electric motor is constructed as a linear motor, it is possible to further reduce thrust ripple and cogging thrust.

The invention as recited in claim 5 is the magnetic machine as recited in any one of claims 1 to 3, wherein the first magnetic pole member includes a plurality of first permanent magnets arranged side by side in the predetermined direction, the plurality of first magnetic poles being formed by magnetic poles of the plurality of first permanent magnets, and wherein the second magnetic pole member includes a plurality of second permanent magnets arranged side by side in the predetermined direction, the plurality of second magnetic poles being formed by magnetic poles of the plurality of second permanent magnets.

According to this magnetic machine, the plurality of first magnetic poles are formed by the magnetic poles of the plurality of first permanent magnets, and the plurality of second magnetic poles are formed by the magnetic poles of the plurality of second permanent magnets. Therefore, this magnetic machine is a magnetic power transmission system. Further, this magnetic power transmission system corresponds to an electric motor obtained by replacing the armatures of the electric motor as recited in claim 4 with permanent magnets, and hence by replacing the moving magnetic fields with the motions of the first magnetic pole rows or the second magnetic pole rows, the above-described operation can be executed. Furthermore, assuming this magnetic power transmission system is constructed e.g. as the torque transmission type, it includes three or more magnetic machine structures, and hence, compared with the magnetic power transmission system including only two magnetic machine structures, such as the magnetic power transmission system disclosed in Patent Literature 3, it is possible to more finely set the phase difference in electrical angle between the first magnetic poles of each first magnetic pole row and the second magnetic poles of each second magnetic pole row in the predetermined direction, and the phase difference in electrical angle between the first magnetic poles of each first magnetic pole row and the soft magnetic material elements of each soft magnetic material row in the predetermined direction. This makes it possible to further reduce the cogging torque and the like.

The invention as recited in claim 6 is the magnetic machine as recited in claim 1, wherein the predetermined direction is a circumferential direction about a predetermined axis.

According to this magnetic machine, it is possible to realize a rotating electric motor which is capable of reducing the torque ripple and cogging torque, or a magnetic power transmission system of a torque transmission type which is capable of reducing the cogging torque and the like.

The invention as recited in claim 7 is the magnetic machine as recited in claim 1, wherein the predetermined direction is a linear direction.

According to this magnetic machine, it is possible to realize a linear motor which is capable of reducing the thrust ripple and cogging thrust, or a magnetic power transmission system of a thrust transmission type which is capable of reducing the cogging thrust and the like.

The invention as recited in claim 8 is a magnetic machine (electric motor 1B to 1D) comprising a first magnetic pole member (stator 60) including a plurality of first magnetic poles (armatures 61) arranged such that the first magnetic poles are along a predetermined imaginary surface and each adjacent two thereof are different in polarity from each other, a second magnetic pole member (first rotor 40) including a plurality of second magnetic poles (permanent magnets 42) arranged such that the second magnetic poles are along the predetermined imaginary surface and each adjacent two thereof are different in polarity from each other, and arranged in a manner spaced from the plurality of first magnetic poles, and a soft magnetic material member (second rotor 50) including a plurality of soft magnetic material elements (soft magnetic material cores 51) arranged along the predetermined imaginary surface in a manner spaced from each other between the plurality of first magnetic poles (armatures 61)

and the plurality of second magnetic poles (permanent magnets 42), wherein the plurality of first magnetic poles, the plurality of second magnetic poles, and the plurality of soft magnetic material elements are provided in a manner relatively movable with respect to each other along the predetermined imaginary surface in a predetermined moving direction, wherein the plurality of first magnetic poles (armatures 61) each extend in a first predetermined direction along the predetermined imaginary surface such that an electrical angle between opposite ends of each first magnetic pole (armature 61) becomes equal to θs, wherein the plurality of second magnetic poles (permanent magnets 42) each extend in a second predetermined direction along the predetermined imaginary surface such that an electrical angle between opposite ends of each second magnetic pole (permanent magnet 42) becomes equal to θa, wherein the plurality of soft magnetic material elements (soft magnetic material cores 51) each extend in a third predetermined direction along the predetermined imaginary surface such that an electrical angle between opposite ends of each soft magnetic material element (soft magnetic material cores 51) becomes equal to θb, and wherein the three electrical angles θs, θa, and θb are set such that θs=2θb−θa holds.

According to this magnetic machine, the plurality of first magnetic poles each extend in the first predetermined direction along the predetermined imaginary surface such that the electrical angle between the opposite ends of each first magnetic pole becomes equal to θs, the plurality of second magnetic poles each extend in the second predetermined direction along the predetermined imaginary surface such that the electrical angle between the opposite ends of each second magnetic pole becomes equal to θa, the plurality of soft magnetic material elements each extend in the third predetermined direction along the predetermined imaginary surface such that the electrical angle between the opposite ends of each soft magnetic material element becomes equal to θb, and the three electrical angles θs, θa, and θb are set such that θs=2θb−θa holds. When the magnetic machine is constructed as above, by setting the first magnetic poles and/or the second magnetic poles to magnetic poles generated by the armatures, it is possible to obtain the same operating state as that of the electric motor as recited in claim 4, as described hereinafter, and compared with the electric motor as recited in claim 4, it is possible to further reduce the ripple and cogging of torque or thrust. As a result, the ripple and cogging of torque or thrust can be reduced compared with the conventional electric motors. Further, if the first magnetic poles are set, for example, to the magnetic poles of the permanent magnets, the cogging of torque or thrust can be reduced compared with the conventional magnetic power transmission systems. On the other hand, if the magnetic machine is constructed as a magnetic power transmission system by setting the first magnetic poles and the second magnetic poles, for example, to the magnetic poles of the permanent magnets, this magnetic power transmission system corresponds to an electric motor obtained by replacing the armatures of the above-described electric motor with the permanent magnets. This makes it possible to further reduce the cogging of torque or thrust and the like.

The invention as recited in claim 9 is the magnetic machine as recited in claim 8, wherein the three electrical angles θs, θa, and θb are set such that one of the two electrical angles θs and θa is larger than the electrical angle θb by an electrical angle of π, and another of the two electrical angles θs and θa is smaller than the electrical angle θb by an electrical angle of π.

According to this magnetic machine, when the magnetic machine is constructed, for example, as a rotating electric motor, by setting the first magnetic poles and/or the second magnetic poles to magnetic poles generated by the armatures, the magnetic machine becomes, as described hereinafter, equivalent to one formed by configuring the magnetic machine as recited in claim 2 as a rotating electric motor and setting m→∞, so that it is possible to obtain the same operating state as that of such a rotating electric motor, and it is possible to further reduce the torque ripple and cogging torque. Further, when the magnetic machine is constructed as a linear motor, the thrust ripple and the cogging thrust can be further reduced. On the other hand, when the magnetic machine is constructed as a magnetic power transmission system, the cogging of torque or thrust and the like can be further reduced.

The invention as recited in claim 10 is the magnetic machine as recited in claim 8 or 9, wherein at least one of the first magnetic pole member and the second magnetic pole member has a plurality of armatures 61, and wherein the plurality of armatures 61 are configured to be capable of generating at least ones of the plurality of first magnetic poles and the plurality of second magnetic poles, and be capable of generating a moving magnetic field that moves in the predetermined moving direction, by the generated at least ones of the plurality of first magnetic poles and the plurality of second magnetic poles, and wherein the three electrical angles θs, θa, and θb are set such that θs=2θb−θa holds during generation of the moving magnetic field.

When the magnetic machine is constructed as above, it is possible to obtain the same operating state as that of the magnetic machine as recited in claim 4, that is, the electric motor, as described hereinabove, and compared with the electric motor as recited in claim 4, it is possible to further reduce the ripple and cogging of torque or thrust. As a result, the ripple and cogging of torque or thrust can be reduced compared with the conventional electric motors.

The invention as recited in claim 11 is the magnetic machine as recited in claim 8 or 9, wherein the first magnetic pole member includes a plurality of first permanent magnets arranged side by side in the predetermined moving direction, the plurality of first magnetic poles being formed by magnetic poles of the plurality of first permanent magnets, and wherein the second magnetic pole member includes a plurality of second permanent magnets arranged side by side in the predetermined moving direction, the plurality of second magnetic poles being formed by magnetic poles of the plurality of second permanent magnets.

According to this magnetic machine, the plurality of first magnetic poles are formed by the magnetic poles of the plurality of first permanent magnets, and the plurality of second magnetic poles are formed by magnetic poles of the plurality of second permanent magnets. Therefore, the magnetic machine is constructed as a magnetic power transmission system. Further, this magnetic power transmission system corresponds to an electric motor obtained by replacing the armatures of the magnetic machine as claimed in claim 10, that is, the electric motor, by the permanent magnets, and hence by replacing the moving magnetic fields with the motions of the first magnetic pole member or the second magnetic pole member, it is possible to execute the above-described operation. Furthermore, when the magnetic machine is constructed e.g. as a magnetic power transmission system of a torque transmission type, it is possible to realize a magnetic power transmission system capable of further reducing the cogging torque and the like, compared with the magnetic power transmission system disclosed in Patent Literature 3.

The invention as recited in claim 12 is the magnetic machine as recited in claim 8, wherein the predetermined moving direction is a circumferential direction about a predetermined axis.

According to this magnetic machine, it is possible to realize a rotating electric motor which is capable of reducing the torque ripple and cogging torque, or a magnetic power transmission system of torque transmission type which is capable of reducing the cogging torque and so forth.

The invention as recited in claim 13 is the magnetic machine as recited in claim 8, wherein the predetermined moving direction is linear direction.

According to this magnetic machine, it is possible to realize a linear motor which is capable of reducing the thrust ripple and cogging thrust, or a magnetic power transmission system of a thrust transmission type which is capable of reducing the cogging thrust and the like.

A schematic cross-sectional view showing the arrangement of an electric motor as a magnetic machine according to a first embodiment of the present invention.

FIG. 2

Figure 1:
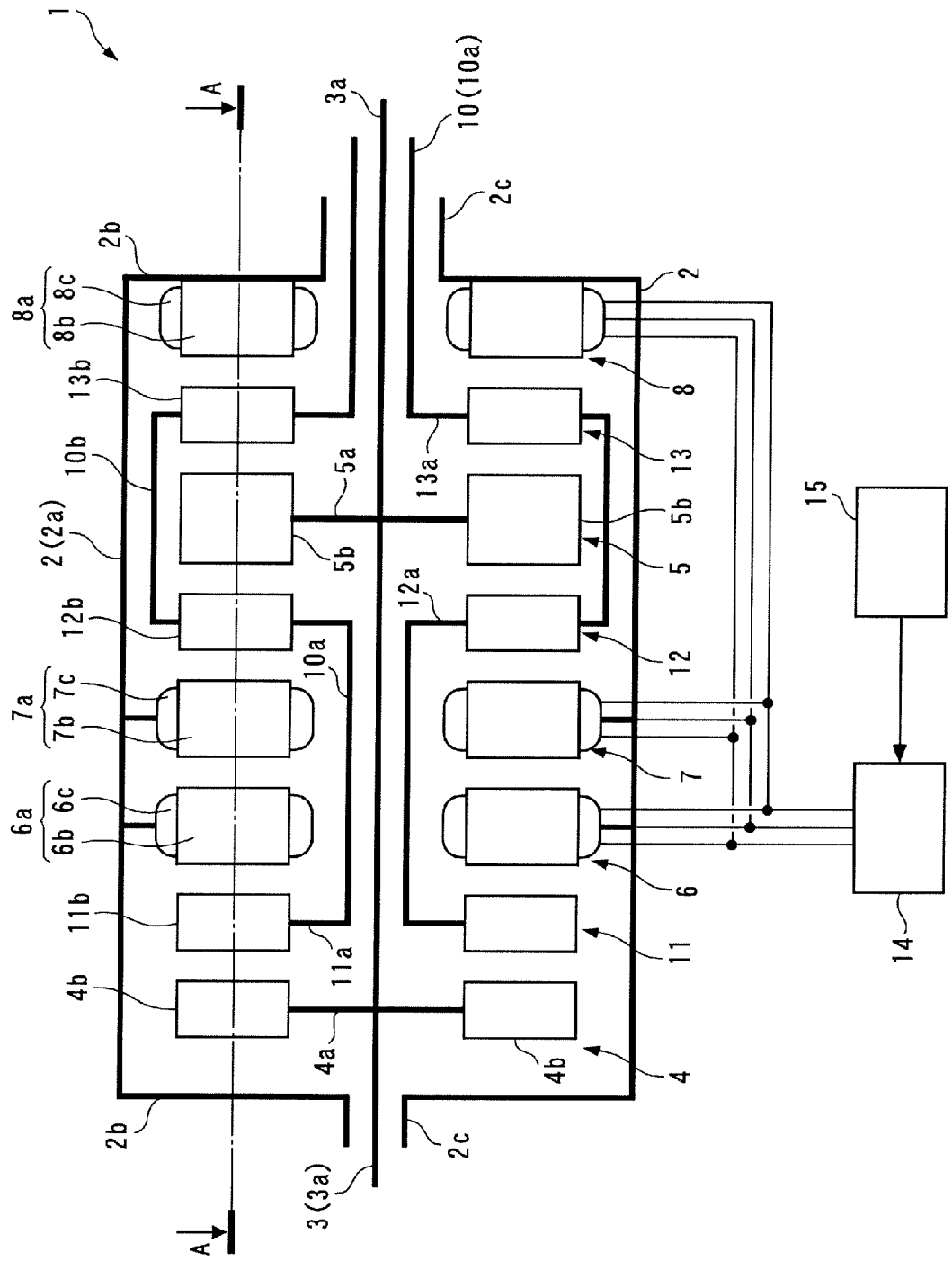
FIG. 1

A development view of part of a cross-section of the FIG. 1 electric motor taken on line A-A of FIG. 1 along the circumferential direction.

FIG. 3

A schematic cross-sectional view showing the arrangement of the electric motor, which is useful in explaining operations thereof.

FIG. 4

Figure 3:
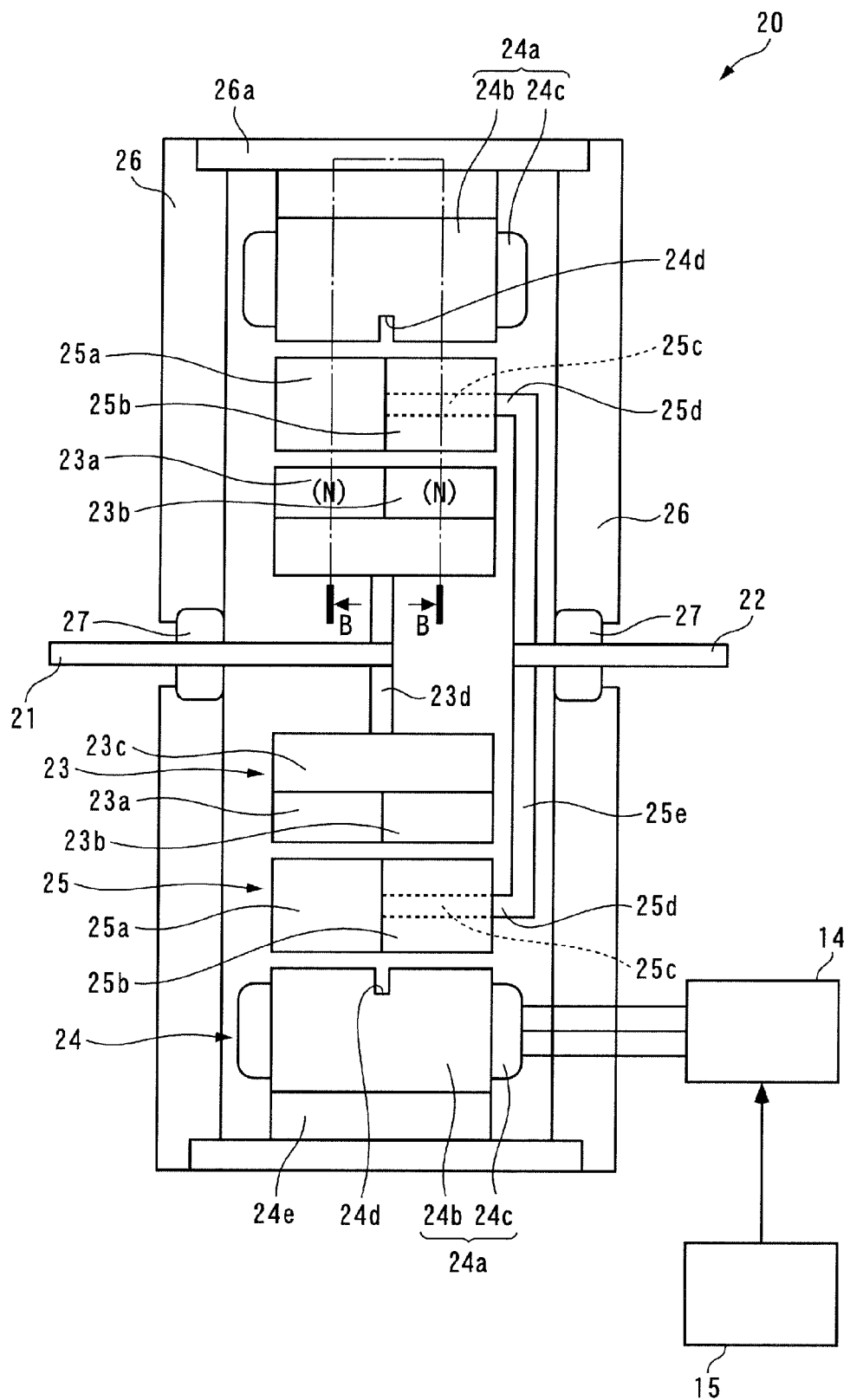

A schematic development view of part of a cross-section of the FIG. 3 electric motor taken on line B-B of FIG. 3 along the circumferential direction.

FIG. 5

Figure 4:
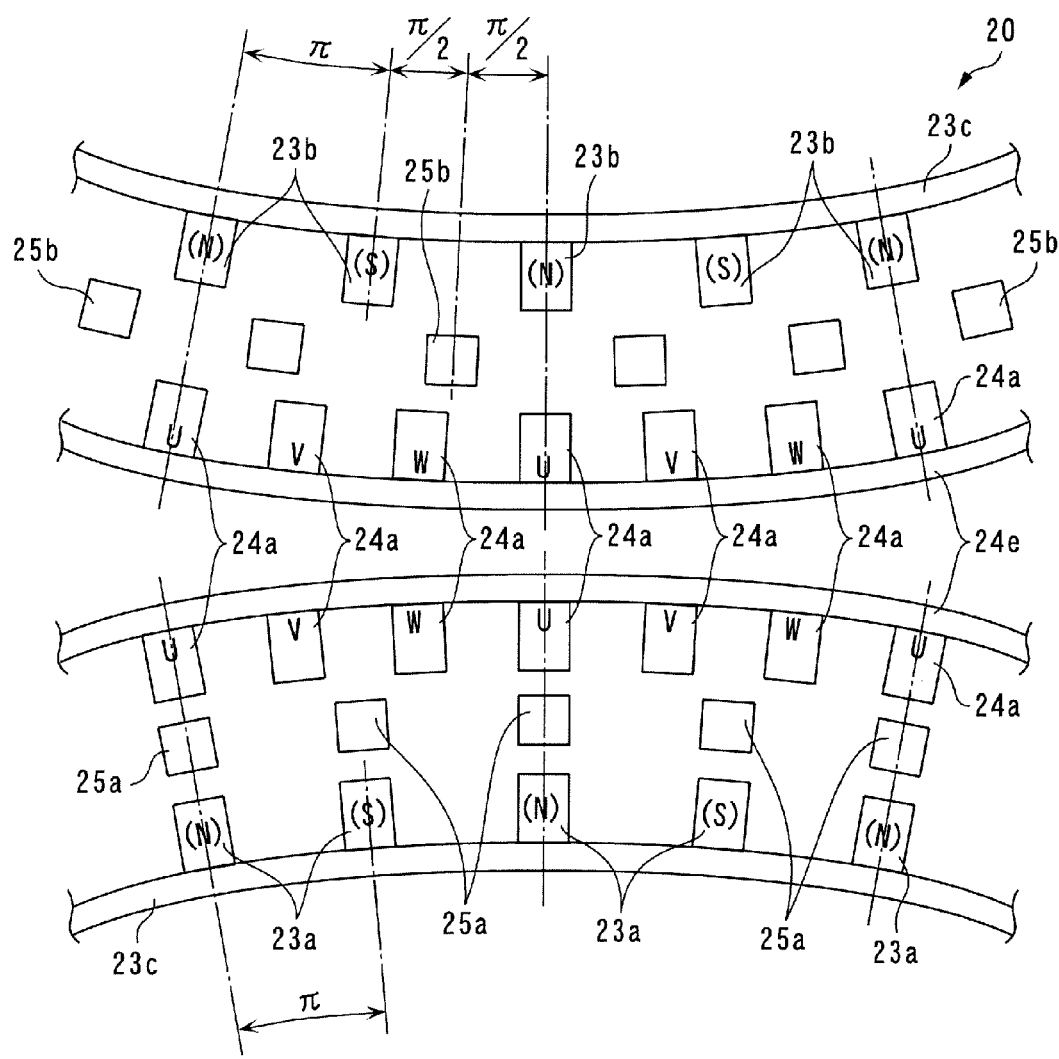

A diagram showing an arrangement functionally equivalent to the arrangement of the FIG. 4 development view.

FIG. 6

A diagram which is useful in explaining the operations of the FIG. 3 electric motor in a case where a first shaft is fixed.

FIG. 7

A diagram which is useful in explaining operations continued from FIG. 6.

FIG. 8

A diagram showing magnetic circuits formed during the operation of the electric motor shown in FIG. 3.

FIG. 9

A diagram which is useful in explaining the operation of the FIG. 3 electric motor in a case where a second shaft is fixed.

FIG. 10

A diagram which is useful in explaining the operation continued from FIG. 9.

FIG. 11

Speed diagrams representing the relationship between a magnetic field rotational speed, a first shaft rotational speed, and a second shaft rotational speed, in a state (a) in which the first shaft is fixed, a state (b) in which the second shaft is fixed, a state (c) in which the first shaft and the second shaft rotate in the same direction as first and second rotating magnetic fields, and a state (d) in which the first shaft is rotating in an opposite direction and the second shaft is rotating in the same direction with respect to the first and second rotating magnetic fields.

FIG. 12

A diagram of an equivalent circuit corresponding to an electric motor structure of the FIG. 3 electric motor comprising first permanent magnets, first cores, and a stator.

FIG. 13

A diagram of an equivalent circuit corresponding to an electric motor structure of the FIG. 3 electric motor comprising second permanent magnets, second cores, and the stator.

FIG. 14

A diagram which is useful in explaining the operation of the electric motor according to the first embodiment.

FIG. 15

Figure 14:
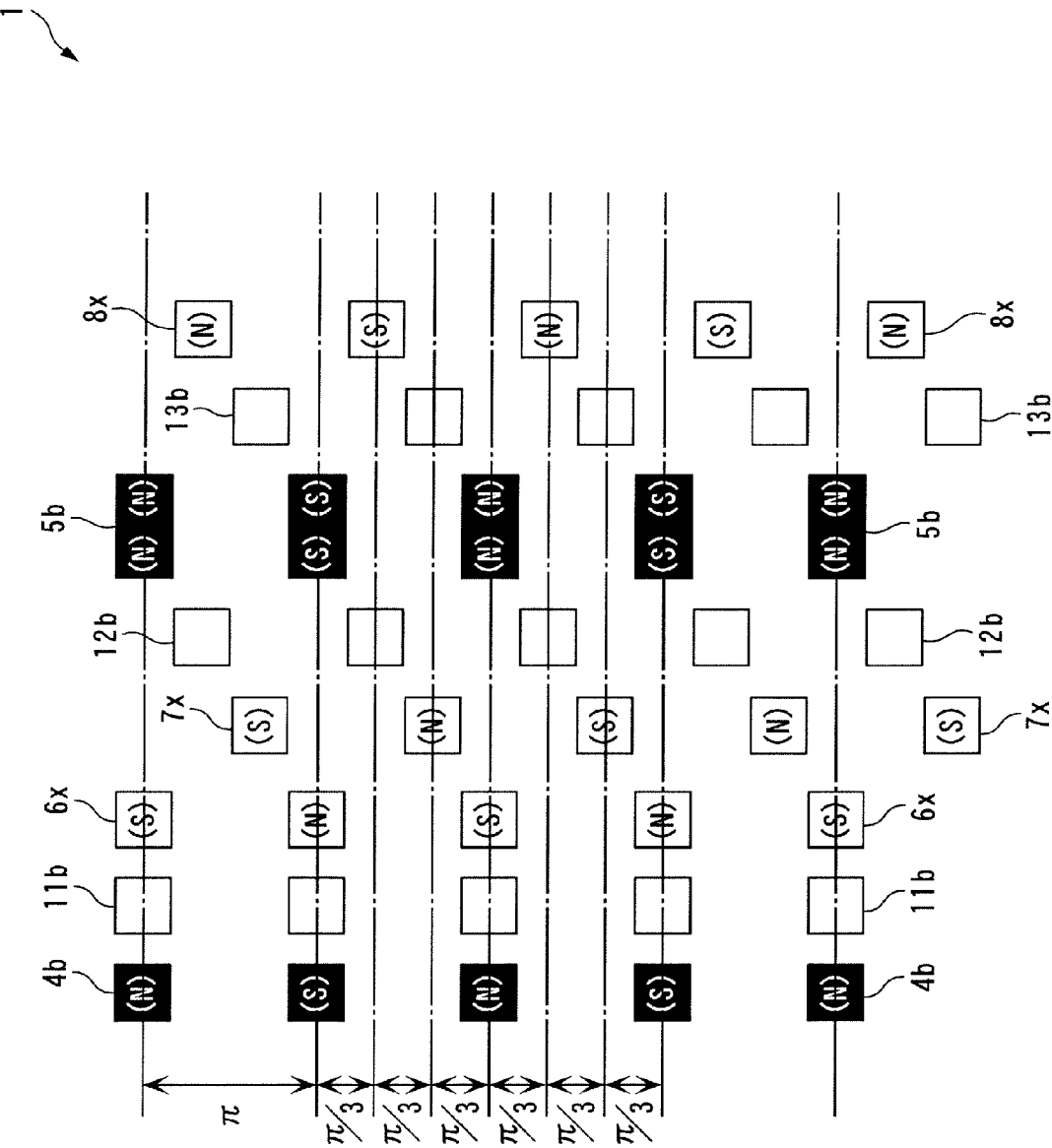

A diagram showing an arrangement equivalent to the FIG. 14 arrangement.

FIG. 16

A diagram of an equivalent circuit corresponding to a first electric motor structure.

FIG. 17

A diagram of an equivalent circuit corresponding to a second electric motor structure.

FIG. 18

A diagram of an equivalent circuit corresponding to a third electric motor structure.

FIG. 19

A diagram showing a variation of the arrangement of the first to third electric motor structures of the electric motor.

FIG. 20

A partially-cutaway exploded perspective view of an electric motor as a magnetic machine according to a second embodiment.

FIG. 21

A schematic view of the arrangement of an electric motor structure of the electric motor according to the second embodiment.

FIG. 22

Figure 19:
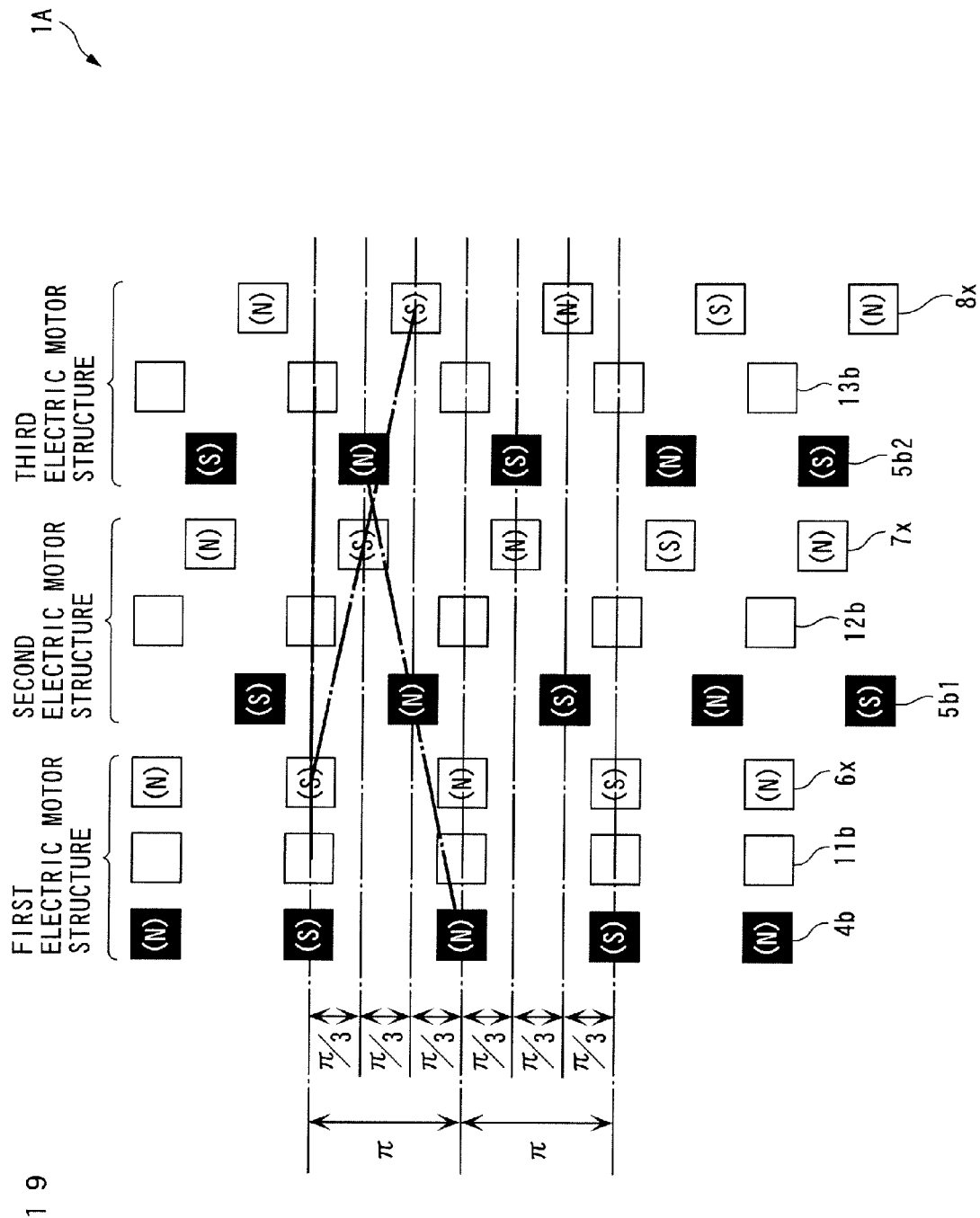

A diagram showing an example of a case where an imaginary electric motor structure is added to the FIG. 19 electric motor.

FIG. 23

A schematic view showing a variation of the arrangement of the electric motor structure of the electric motor according to the second embodiment.

FIG. 24

A schematic view showing another variation of the arrangement of the electric motor structure of the electric motor according to the second embodiment.

BEST MODE FOR CARRYING OUT THE INVENTION

Figure 2:
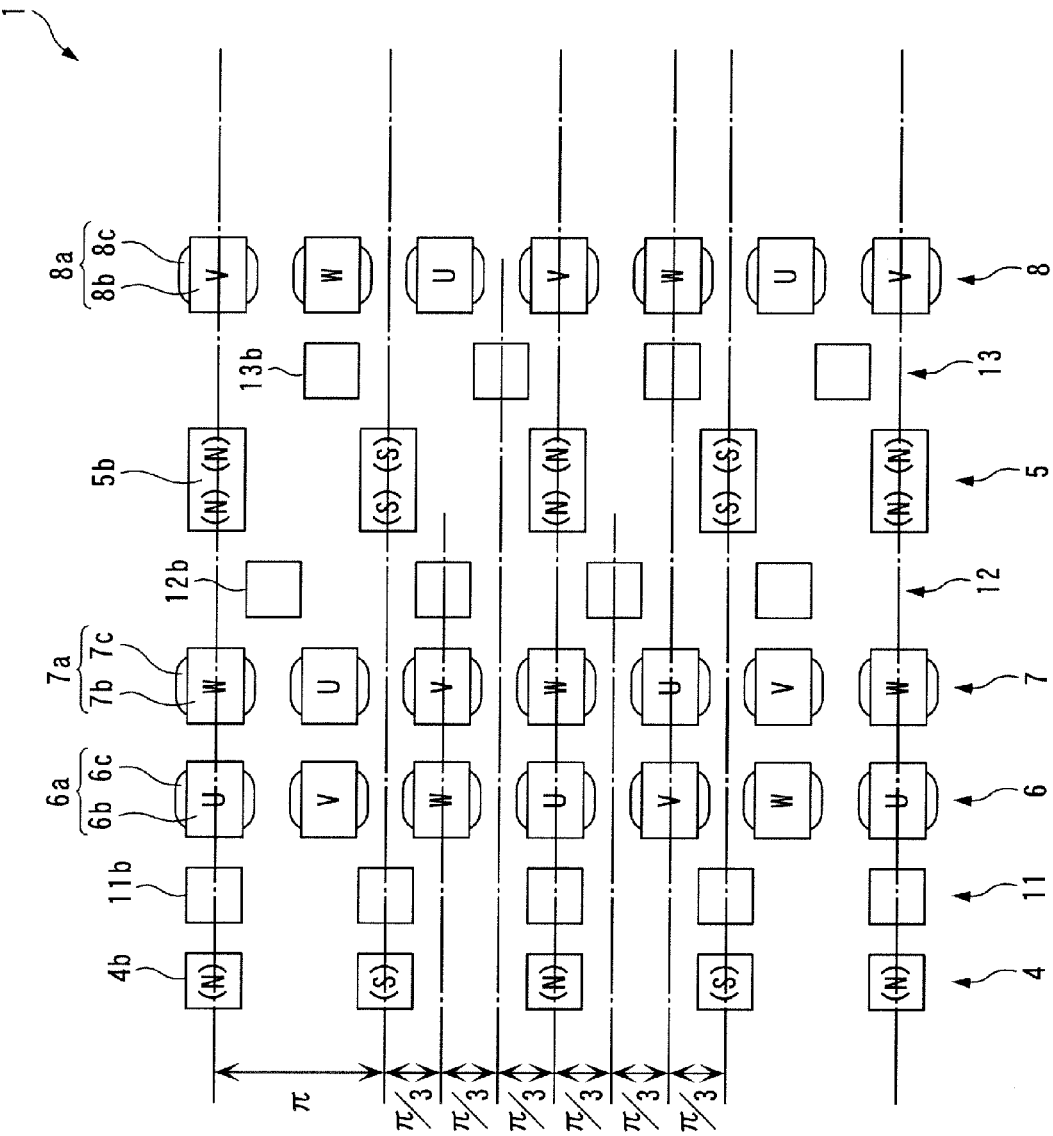

Hereafter, an electric motor as a magnetic machine according a first embodiment of the present invention will be described with reference to the drawings. FIG. 1 schematically shows the cross-sectional arrangement of the electric motor 1 according to the first embodiment, and FIG. 2 shows a state of planar development of part of a cross-section taken on line A-A of FIG. 1 along the circumferential direction. It should be noted that in FIGS. 1 and 2, hatching in cross-sectional portions are omitted for ease of understanding. This also applies to various figures, referred to hereinafter. Further, in the following description, the left and right sides as viewed in the two figures will be referred to as "left" and "right". Furthermore, in FIG. 2, side walls 2b, a rotating shaft 10a, and so forth, referred to hereinafter, are omitted for convenience.

As illustrated in FIGS. 1 and 2, the electric motor 1 comprises a casing 2, first and second rotors 3 and 10, and first to third stators 6 to 8. The casing 2 includes a hollow cylindrical main body 2a, and the left and right side walls 2b and 2b integrally formed with the main body 2a at opposite ends thereof in the axial direction. The left and right side walls 2b and 2b have central portions integrally formed with hollow cylindrical portions 2c and 2c, respectively. It should be noted that in the present embodiment, the casing 2 and the first to third stators 6 to 8 correspond to a first magnetic pole member, the first rotor 3 corresponds to a second magnetic pole member, and the second rotor 10 corresponds to a soft magnetic material member.

The first rotor 3 has a rotating shaft 3a, and first and second magnet rotor sections 4 and 5 that rotate in unison with the rotating shaft 3a. The rotating shaft 3a is supported by a bearing, not shown, in a manner rotatable about the axis thereof. Further, the first magnet rotor section 4 has a flange 4a concentrically provided on the rotating shaft 3a at a predetermined location thereof, and a first permanent magnet row formed of 2n (n is a natural number) first permanent magnets 4b fixed to an outer end of the flange 4a. These first permanent magnets 4b are provided at a pitch of an electrical angle of $\pi$ along the circumferential direction of the main body 2a, and the magnetic poles of each two adjacent first permanent magnets 4b and 4b are different in polarity from each other.

On the other hand, the second magnet rotor section 5 has a flange 5a integrally and concentrically provided on the rotating shaft 3a, and a second permanent magnet row formed of 2n second permanent magnets 5b fixed to an outer end of the flange 5a. These second permanent magnets 5b are arranged at a pitch of an electrical angle of $\pi$ along the circumferential direction of the main body 2a, and are disposed such that the center position thereof coincides with that of the first permanent magnets 4b in the left-right direction. The second permanent magnets 5b are set such that magnetic poles on opposite sides of each second permanent magnet 5b have the same polarities as those on opposite sides of each first permanent magnet 4b in alignment therewith in the left-right direction, and the magnetic poles of each two adjacent second permanent magnets 5b and 5b are different in polarity from each other. It should be noted that in the present embodiment, the magnetic poles of the first and second permanent magnets 4b and 5b correspond to second magnetic poles.

Further, the first stator 6 generates a rotating magnetic field in accordance with the supply of electric power thereto, and has a first armature row formed of 3n first armatures 6a. These first armatures 6a are mounted on respective predetermined portions of the inner wall of the main body 2a, and are arranged at a pitch of an electrical angle of $2\pi/3$ along the circumferential direction of the main body 2a. Each first armature 6a comprises an iron core 6b, and a coil 6c wound around the iron core 6b by concentrated winding. The 3n coils 6c form n sets of three-phase coils of U-phase coils, V-phase coils, and W-phase coils. Further, each first armature 6a having a U-phase coil 6c is disposed such that the electric position thereof coincides with that of a first permanent magnet 4b having an N pole in the left-right direction.

Further, the first armatures 6a are connected to a variable power supply 14. The variable power supply 14 is a combination of an electric circuit comprising an inverter, and a battery, and is connected to an ECU 15. Further, the first armatures 6a are configured to generate magnetic poles at respective ends of the iron cores 6b toward the first permanent magnets 4b when electric power is supplied from the variable power supply 14, and along with generation of these magnetic poles, a first rotating magnetic field is generated between the first armatures 6a and the first magnet rotor section 4 such that the first rotating magnetic field rotates along the first stator 6.

Hereafter, the magnetic poles generated at the ends of the iron cores 6b toward the first permanent magnets 4b are referred to as "the first armature magnetic poles". Further, the number of the first armature magnetic poles is set such that it is equal to the number of magnetic poles of the first permanent magnets 4a (i.e. 2n).

On the other hand, similarly to the first stator 6, the second stator 7 as well generates a rotating magnetic field in accordance with the supply of electric power thereto, and has a second armature row formed of second armatures 7a equal in number to the number of the first armatures 6a (i.e. 3n). These second armatures 7a are mounted on respective predetermined portions of the inner wall of the main body 2a, and are arranged at a pitch of an electrical angle of $2\pi/3$ along the circumferential direction of the main body 2a Each second armature 7a comprises an iron core 7b, and a coil 7c wound around the iron core 7b by concentrated winding. The 3n coils 7c form n sets or three-phase coils of U-phase coils, V-phase coils, and W-phase coils. Further, each second armature 7a having a W-phase coil 7c is disposed such that the electric position thereof coincides with that of each first armature 6a having the above-mentioned U-phase coil 6c in the left-right direction (see FIG. 2).

Further, the second armatures 7a are connected to the variable power supply 14, and are configured such that when electric power is supplied from the variable power supply 14, magnetic poles equal in number to the number of the second permanent magnets 5b (i.e. 2n) are generated at respective ends of the iron cores 7b toward the second permanent magnets 5b. Hereafter, the magnetic poles generated at the respective ends of the iron core 7b toward the second permanent magnets 5b are referred to as the "second armature magnetic poles". Along with generation of the second armature magnetic poles, a second rotating magnetic field is generated between the second armatures 7a and the second magnet rotor section 5 such that the second rotating magnetic field rotates along the second stator 7.

It should be noted that in the electric motor 1, a back yoke, not shown, is provided for each of the first and second stators 6 and 7 so as to prevent magnetic flux from leaking between the first and second stators 6 and 7, whereby the electric motor 1 is configured to prevent a magnetic short circuit from occurring between the first and second stators 6 and 7.

On the other hand, similarly to the above-mentioned first and second stators 6 and 7, the third stator 8 generates a rotating magnetic field in accordance with the supply of electric power thereto, and has a third armature row formed of third armatures 8a equal in number to the number of the first and second armatures 6a and 7a (i.e. 3n). These third armatures 8a are mounted on a right side wall 2b of the main body 2a, and are arranged at a pitch of an electrical angle of $2\pi/3$ along the circumferential direction of the main body 2a. Each third armature 8a comprises an iron core 8b, and a coil 8c wound around the iron core 8b by concentrated winding. The 3n coils 8c form n sets of three-phase coils of U-phase coils, V-phase coils, and W-phase coils. Further, each third armature 8a having a V-phase coil 8c is disposed such that the electric position thereof coincides with that of each first armature 6a having the above-mentioned U-phase coil 6c and each second armature 7a having the above-mentioned W-phase coil 7c in the left-right direction (see FIG. 2).

Further, the third armatures 8a are connected to the variable power supply 14, and are configured such that when electric power is supplied from the variable power supply 14, magnetic poles equal in number to the number of the magnetic poles of the second permanent magnets 5b (i.e. 2n) are generated at respective ends of the iron cores 8b toward the second permanent magnets 5b. Hereafter, the magnetic poles generated at the respective ends of the iron cores 8b toward the second permanent magnets 5b are referred to as "the third armature magnetic poles". Along with generation of the third armature magnetic poles, a third rotating magnetic field is generated between the third armatures 8a and the second magnet rotor section 5 such that the third rotating magnetic field rotates along the third stator 8. It should be noted that in the present embodiment, the first to third armature magnetic poles correspond to the second magnetic poles.

On the other hand, the second rotor 10 includes the hollow cylindrical rotating shaft 10a, and first to third soft magnetic material rotor sections 11 to 13 which are integral therewith. The rotating shaft 10a has an inner hole thereof fitted on the above-mentioned rotating shaft 3a, and an outer periphery thereof fitted in the inner hole of the hollow cylindrical portion 2c and 2c of the casing 2. Further, the rotating shaft 10a is supported by a bearing, not shown, whereby it is configured to be rotatable about the axis with respect to the rotating shaft 3a and the casing 2.

On the other hand, the first soft magnetic material rotor section 11 has a non-magnetic material flange 11a integrally and concentrically formed with the rotating shaft 10a, and a first soft magnetic material core row formed of 2n first soft magnetic material cores (hereinafter referred to as "the first cores") 11b fixed to an outer end of the flange 11a. These first cores 11b are formed by laminating a plurality of steel plates, and are provided at a pitch of an electrical angle of $\pi$ along the circumferential direction of the main body 2a. Further, the first cores 11b are arranged between the first permanent magnets 4b and the first armatures 6a, and rotate between the first permanent magnets 4b and the first armatures 6a along the circumferential direction of the main body 2a, when the second rotor 10 rotates.

Further, the second soft magnetic material rotor section 12 has a non-magnetic material flange 12a integrally and concentrically formed with the rotating shaft 10a, and a second soft magnetic material core row formed of 2n second soft magnetic material cores (hereinafter referred to as "the second cores") 12b fixed to an outer portion of the flange 12a. Similarly to the first cores 11b, these second cores 12b are formed by laminating a plurality of steel plates, and are provided at a pitch of an electrical angle of $\pi$ along the circumferential direction of the main body 2a. The second cores 12b are arranged such that they are displaced downward, as viewed in FIG. 2, from the first cores 11b by an electrical angle of $\pi/3$. Further, the second cores 12b are arranged between the second armatures 7a and the second permanent magnets 5b, and rotate between the second armatures 7a and the second permanent magnets 5b along the circumferential direction of the main body 2a, when the second rotor 10 rotates.

On the other hand, the third soft magnetic material rotor section 13 has a non-magnetic material flange 13a integrally and concentrically formed with the rotating shaft 10a, and a third soft magnetic material core row formed of 2n third soft magnetic material cores (hereinafter referred to as "the third cores") 13b fixed to an outer portion of the flange 13a. The flange 13a is integrally formed with the flange 12a via a hollow cylindrical portion 10b. Further, similarly to the first and second cores 11b and 12b, the 2n third cores 13b are formed by laminating a plurality of steel plates, and are provided at a pitch of an electrical angle of $\pi$ along the circumferential direction of the main body 2a. The third cores 13b are arranged such that they are displaced downward, as viewed in FIG. 2, from the second cores 12b by an electrical angle of $\pi/3$. As described above, the three cores 11b to 13b are arranged such that the phase difference between each adjacent two thereof is displaced downward, as viewed in FIG. 2, by an electrical angle of $\pi/3$.

Further, the third cores 13b are arranged between the second permanent magnets 5b and the third armatures 8a, and rotate between the second permanent magnets 5b and the third armatures 8a along the circumferential direction of the main body 2a, when the second rotor 10 rotates.

In the electric motor 1 constructed as above, the two permanent magnets 4b and 5b, the three cores 11b to 13b, the three iron cores 6b to 8b are all arranged such that they are at the same radial distance from the axis of the rotating shaft 3a and have the same cross-sectional area in the axial direction of the rotating shaft 3a. It should be noted that in the present embodiment, the three cores 11b to 13b correspond to soft magnetic material elements.

The ECU 15 is implemented by a microcomputer comprising a CPU, a RAM, a ROM and an I/O interface (none of which are specifically shown), and controls the operation of the electric motor 1 by controlling the respective electric powers supplied from the variable power supply 14 to the first to third armatures 6b to 8b.

Next, to explain the operating principles of the electric motor 1 according to the present embodiment constructed as above, an electric motor 20 will be described with reference to FIG. 3. This electric motor 20 has been proposed in Patent Literature 2, mentioned above, by the present applicant. In FIG. 3, component parts of the electric motor 20 similar to those of the above-described electric motor 1 are denoted by the same reference numerals, and detailed description thereof is omitted.

As shown in FIG. 3, the electric motor 20 comprises a casing 26, two bearings 27 and 27 fixed to the casing 26, a first shaft 21 and a second shaft 22 which are rotatably supported by the bearings 27 and 27, respectively, a first rotor 23 accommodated within the casing 26, a stator 24 disposed within the casing 26 in a manner opposed to the first rotor 23, and a second rotor 25 disposed between the first rotor 23 and the stator 24, with predetermined spacings therefrom. The first rotor 23, the second rotor 25, and the stator 24 are disposed in the direction of radius of the first shaft 21 from inside in the mentioned order. It should be noted that the first and second shafts 21 and 22 are arranged concentrically with each other.

The first rotor 23 has 2n first permanent magnets 23a and second permanent magnets 23b. The first and second permanent magnets 23a and 23b are arranged at equally spaced intervals in the circumferential direction of the first shaft 21 (hereinafter simply referred to as "circumferentially"), respectively. The first and second permanent magnets 23a and 23b are mounted on the outer peripheral surface of an annular fixing portion 23c, in a state arranged in the axial direction, side by side, and in contact with each other. With the above arrangement, the first and second permanent magnets 23a and 23b are rotatable in unison with the first shaft 21.

Further, as shown in FIG. 4, the respective pitches of each two first and second permanent magnets 23a and 23b circumferentially adjacent to each other about the first shaft 21 are set to an electrical angle of $\pi$. Further, ones of the first and second permanent magnets 23a and 23b positioned side by side in the axial direction are the same in polarity, while ones of the same circumferentially adjacent to each other are different from each other in polarity. Hereafter, the respective magnetic poles of the first and second permanent magnets 23a and 23b are referred to as "the first magnetic pole" and "the second magnetic pole", respectively.

The stator 24 generates the first and second rotating magnetic fields between the same and the first and second permanent magnets 23a and 23b respectively, and has 3n armatures 24a arranged at equally spaced intervals in the circumferential direction. Each armature 24a comprises an iron core 24b, and a coil 24c wound around the iron core 24b by concentrated winding. An axially central portion of the inner peripheral surface of the iron core 24b is formed with a circumferentially extending groove 24d. The 3n coils 24c form n sets of three-phase (U-phase, V-phase, and W-phase) coils (see FIG. 4). Further, the armatures 24a are mounted on the inner peripheral surface of the peripheral wall 26a of the casing 26 via an annular fixing portion 24e.

Furthermore, each armature 24a is connected to the variable power supply 14, and is configured such that when electric power is supplied, magnetic poles having different polarities from each other are generated at respective ends of the iron core 24b toward the first and second permanent magnets 23a and 23b. Further, in accordance with generation of these magnetic poles, first and second rotating magnetic fields are generated between the first permanent magnets 23a of the first rotor 23 and the iron core 24b, and between the second permanent magnets 23b of the first rotor 23 and the iron core 24b, in a circumferentially rotating manner, respectively. Hereinafter, the magnetic poles generated at the respective ends of the iron core 24b toward the first and second permanent magnets 23a and 23b are referred to as "the first armature magnetic pole" and "the second armature magnetic pole", respectively. Further, the number of the first armature magnetic poles and that of the second armature magnetic poles are set to be equal to the number of the magnetic poles of the first permanent magnet 23a (i.e. 2n).

The second rotor 25 has first soft magnetic material cores (hereinafter referred to as "the first cores") 25a and second soft magnetic material cores (hereinafter referred to as "the second cores") 25b, the numbers of which are equal to the number of the first permanent magnets 23a (i.e. 2n). These cores 25a and 25b are arranged at respective pitches of an electrical angle of n in the circumferential direction, and the phase difference is displaced by an electrical angle of π/2 between the cores 25a and 25b. Further, the first and second cores 25a and 25b are each formed by a soft magnetic material element (more specifically, a laminate of a plurality of steel plates).

The first and second cores 25a and 25b are mounted on an outer end of a disk-shaped flange 25e via bar-shaped connecting portions 25c and 25d slightly extending in the axial direction, respectively. The flange 25e is integrally concentrically provided on the second shaft 22. With this arrangement, the first and second cores 25a and 25b are rotatable in unison with the second shaft 22.

The electric motor 20 constructed as above is configured such that in a state in which one of the first and second shaft 21 and 22 is fixed, or power is input to one of them, the other of the same is caused to rotate.

Next, the operation of the above-described electric motor 20 will be described. Here, although in the case of the electric motor 20, the armatures 24a and the fixing portions 24e are shown in the FIG. 4 development view as if they were each divided into two parts, actually, they are a one-piece member, so that the arrangement in FIG. 4 can be regarded as equivalent to an arrangement in FIG. 5. Therefore, in the following, the operation of the electric motor 20 will be described based on FIG. 5.

First, referring to FIGS. 6 and 7, a description will be given of the operation of the electric motor 20 in the case of causing the second shaft 22 to rotate in a state in which the first shaft 21 is fixed. It should be noted that, for convenience of description, the operation of the electric motor 20 is described by replacing the motions of the first and second rotating magnetic fields by an equivalent physical motion of 2n imaginary permanent magnets (hereinafter referred to as "the imaginary magnets") 24x, equal in number to the respective numbers of the first and second permanent magnets 23a and 23b and the like. Further, the description will be given by regarding magnetic poles of each imaginary magnet 24x on respective sides toward the first and second permanent magnets 23a and 23b as the first and second armature magnetic poles, respectively, and rotating magnetic fields generated between the first permanent magnets 23a and the imaginary magnets 24x and between the second permanent magnets 23b and the imaginary magnets 24x as the first and second rotating magnetic fields, respectively.

Figure 6A:
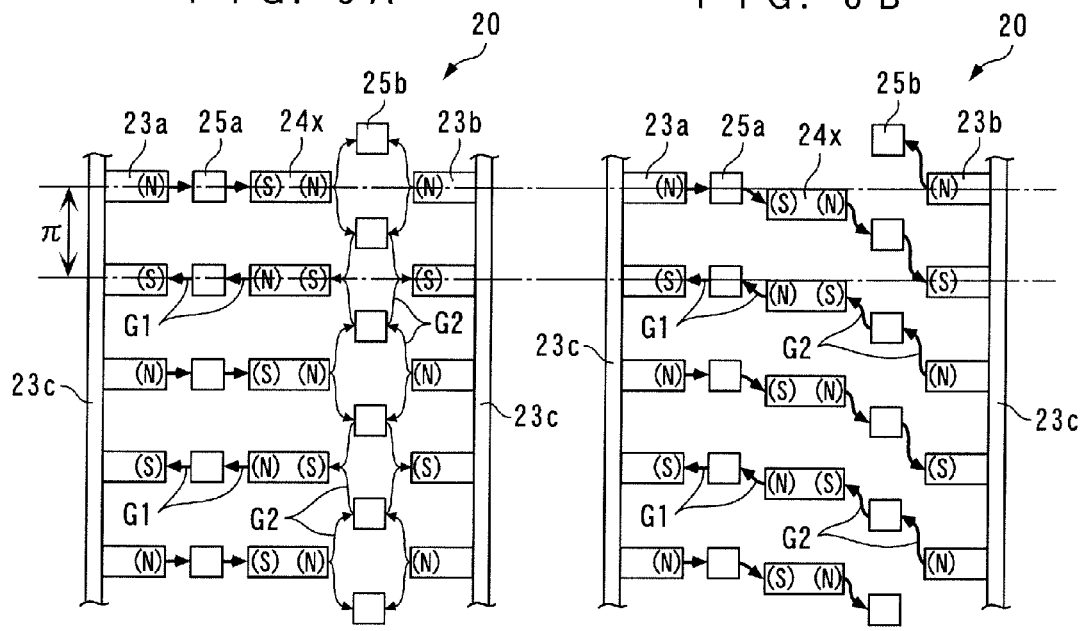

First, as shown in FIG. 6(a), the first and second rotating magnetic fields are generated in a manner rotated downward, as viewed in the figure, from a state in which each first core 25a is opposed to each first permanent magnet 23a, and each second core 25b is in a position between each adjacent two of the second permanent magnets 23b. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 25a are disposed between the first rotor 23 and the stator 24, they are magnetized by the first magnetic poles and the first armature magnetic poles, and magnetic lines of force (hereinafter referred to as "the first magnetic force lines") G1 are generated between the first magnetic poles, the first cores 25a, and the first armature magnetic poles. Similarly, since the second cores 25b are disposed between the first rotor 23 and the stator 24, they are magnetized by the second armature magnetic poles and the second magnetic poles, and magnetic lines of force (hereinafter referred to as "the second magnetic force lines") G2 are generated between the first armature magnetic poles, the second cores 25b, and the second magnetic poles.

Figure 8A:
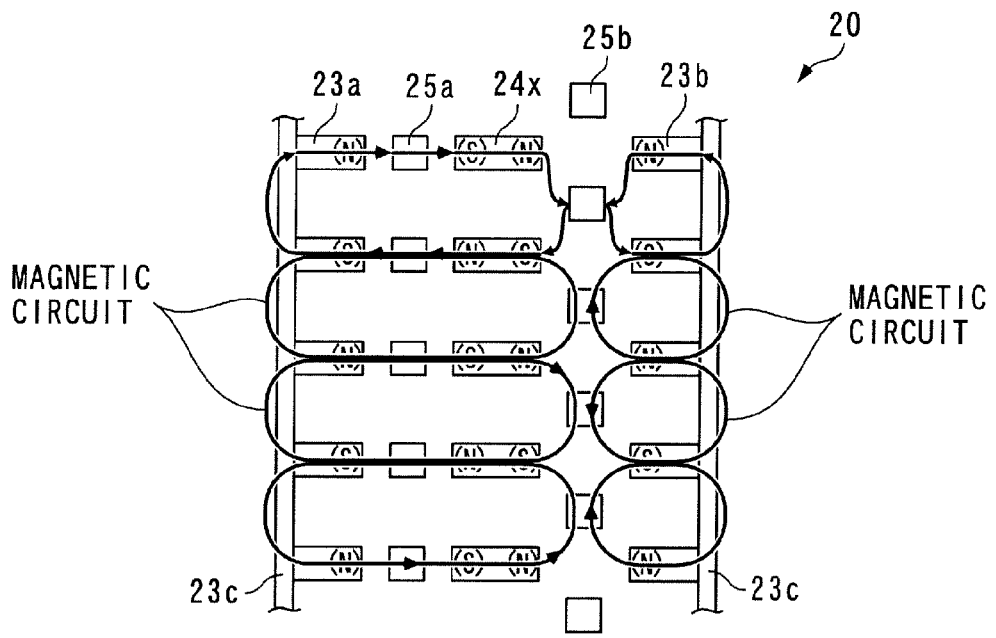

In the state shown in FIG. 6(a), the first magnetic force lines G1 are generated such that they each connect the first magnetic pole, the first core 25a, and the first armature magnetic pole, and the second magnetic force lines G2 are generated such that they connect each circumferentially adjacent two second armature magnetic poles and the second core 25b in a position therebetween, and connect each circumferentially adjacent two second magnetic poles and the second core 25b in a position therebetween. As a result, in this state, magnetic circuits as shown in FIG. 8(a) are formed. In this state, since the first magnetic force lines G1 are linear, no magnetic forces for circumferentially rotating the first cores 25a act on the first cores 25a. Further, the two second magnetic force lines G2 between each circumferentially adjacent two second armature magnetic poles and the second core 25b are equal to each other in the degree of bend thereof and in the total magnetic flux amount. Similarly, the two second magnetic force lines G2 between each circumferentially adjacent two second armature magnetic poles and the second core 25b are equal to each other in the degree of bend thereof and in the total magnetic flux amount, and are balanced. Therefore, no magnetic forces for circumferentially rotating the second cores 25b act on the second cores 25b, either.

Figure 6B:
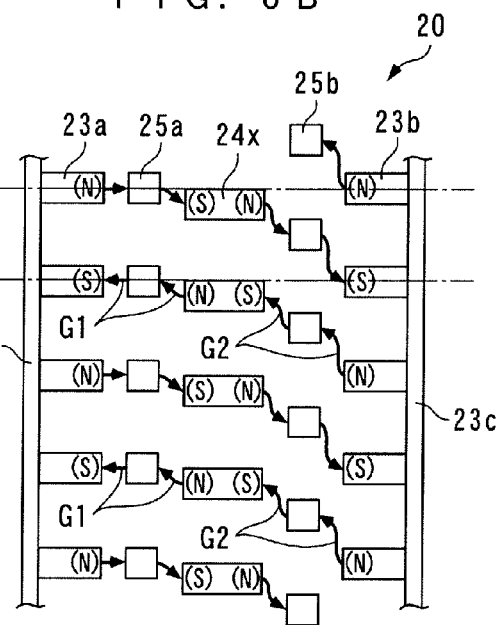
Figure 6C:
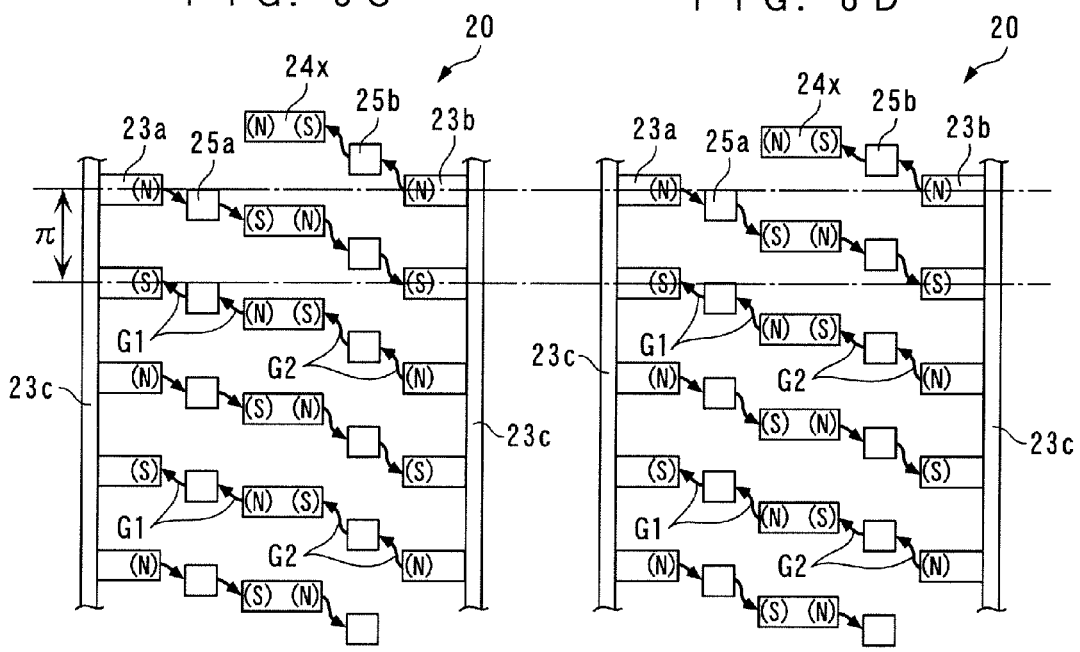
Figure 6D:
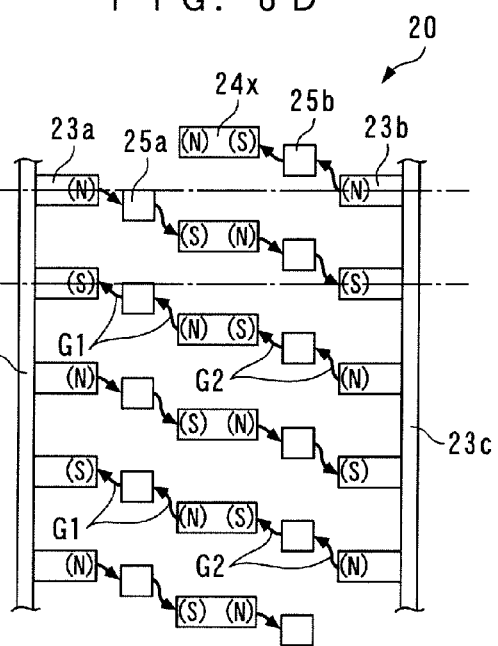
Figure 8B:
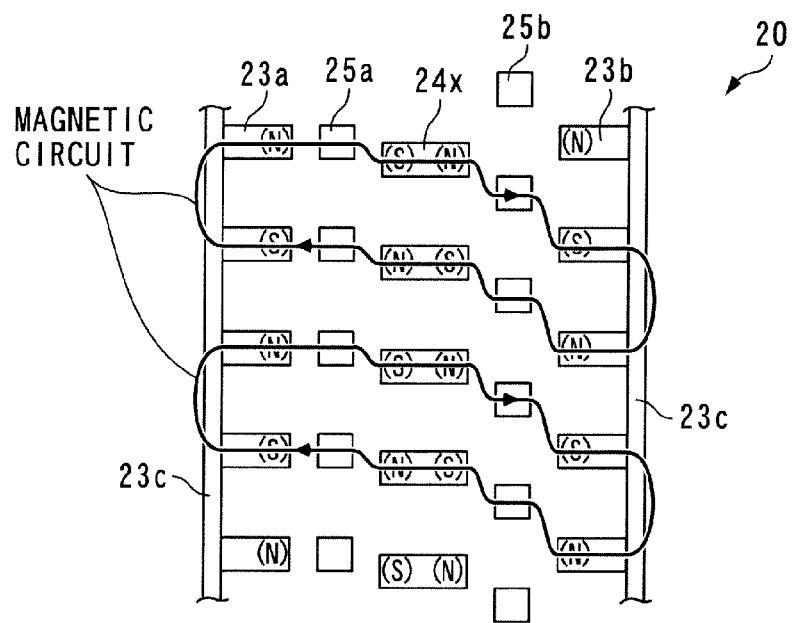

When the imaginary magnets 24x rotate from respective positions shown in FIG. 6(a) to respective positions shown in FIG. 6(b), the second magnetic force lines G2 are generated such that they each connect between a second armature magnetic pole, a second core 25b, and a second magnetic pole, and respective portions of the first magnetic force lines G1 between the first cores 25a and the first armature magnetic poles are bent. Further, accordingly, magnetic circuits are formed by the first magnetic force lines and the second magnetic force lines, as shown in FIG. 8(b).

In this state, since the degree of bend of each first magnetic force line G1 is small but the total magnetic flux amount thereof is large, a relatively large magnetic force acts on the first core 25a. This causes the first cores 25a to be driven by relatively large driving forces in the direction of rotation of the imaginary magnets 24x, that is, in the direction of rotations of the first and second rotating magnetic fields (hereinafter referred to as "the magnetic field rotation direction"), so that the second shaft 22 rotates in the magnetic field rotation direction. Further, although the degree of bend of the second magnetic force line G2 is large, the total magnetic flux amount thereof is small, so that a relatively small magnetic force acts on the second core 25b. This causes the second cores 25b to be driven by relatively small driving forces in the magnetic field rotation direction, so that the second shaft 22 rotates in the magnetic field rotation direction.

Then, when the imaginary magnets 24x rotate from the position shown in FIG. 6(b) to respective positions shown in FIGS. 6(c) and 6(d), and FIGS. 7(a) and 7(b), in the mentioned order, the first cores 25a and the second cores 25b are driven in the magnetic field rotation direction by magnetic forces caused by the first and second magnetic force lines G1 and G2, so that the second shaft 22 rotates in the magnetic field rotation direction. During the time, the first magnetic force lines G1 increase in the degree of bend thereof but decrease in the total magnetic flux amount thereof, whereby the magnetic forces acting on the first cores 25a progressively decrease to progressively reduce the driving forces for driving the first cores 25a in the magnetic field rotation direction. Further, the second magnetic force lines G2 decrease in the degree of bend thereof but increase in the total magnetic flux amount thereof, whereby the magnetic forces acting on the second cores 25b progressively increase to progressively increase the driving forces for driving the second cores 25b in the magnetic field rotation direction.

Then, during rotation of the imaginary magnets 24x from the position shown in FIG. 7(b) to the position shown FIG. 7(c), the second magnetic force lines G2 are bent, and the total magnetic flux amounts thereof become close to their maximum, so that the strongest magnetic forces act on the second cores 25b to maximize the driving forces acting on the second cores 25b. After that, as shown in FIG. 7(c), when the imaginary magnets 24x each move to a position opposed to the first and second permanent magnets 23a and 23b by rotation through an electrical angle of n, the respective polarities of the first armature magnetic pole and the first magnetic pole opposed to each other become identical to each other, and the first core 25a is in a position between circumferentially adjacent two pairs of first armature magnetic poles and first magnetic poles, each pair having the same polarity. In this state, since the degree of bend of the first magnetic force line is large but the total magnetic flux amount thereof is small, no magnetic force for rotating the first core 25a in the magnetic field rotation direction acts on the first core 25a. Further, second armature magnetic poles and second magnetic poles opposed to each other come to have polarities different from each other.

From this state, when the imaginary magnets 24x further rotate, the first cores 25a and the second cores 25b are driven in the magnetic field rotation direction by the magnetic forces caused by the first and second magnetic force lines G1 and G2, so that the second shaft 22 rotates in the magnetic field rotation direction. At this time, during rotation of the imaginary magnets 24x to the position shown in FIG. 6(a), inversely to the above, although the degree of bend of the first magnetic force lines G1 decreases, the total magnetic flux amount thereof increases, so that the magnetic forces acting on the first cores 25a increase to increase the driving forces acing on the first cores 25a. On the other hand, although the degree of bend of the second magnetic force lines G2 increases, the total magnetic flux amount thereof decreases, so that the magnetic forces acting on the second cores 25b decrease to reduce the driving forces acing on the second cores 25b.

As described above, the second shaft 22 rotates in the magnetic field rotation direction, while the driving forces acting on the respective first and second cores 25a and 25b repeatedly increase and decrease by turns in accordance with the rotations of the imaginary magnets 24x, i.e. the rotations of the first and second rotating magnetic fields. That is, when the second shaft 22 is caused to rotate with the first shaft 21 being fixed, the electric motor 20 operates as described above.

Further, as is clear from comparison between FIGS. 6(a) and 7(c), as the imaginary magnets 24x rotate through an electrical angle of n, the first cores 25a and the second cores 25b rotate through only an electrical angle of π/2, and hence the second shaft 22 rotates at half of the rotational speed of the first and second rotating magnetic fields. This is because the magnetic forces caused by the first and second magnetic force lines G1 and G2 cause the first and second cores 25a and 25b to rotate while maintaining the respective states positioned at a mid point between the first magnetic pole and the first armature magnetic pole connected by the first magnetic force line G1 and at a mid point between the second magnetic pole and the second armature magnetic pole connected by the second magnetic force line G2.

Figure 11A:
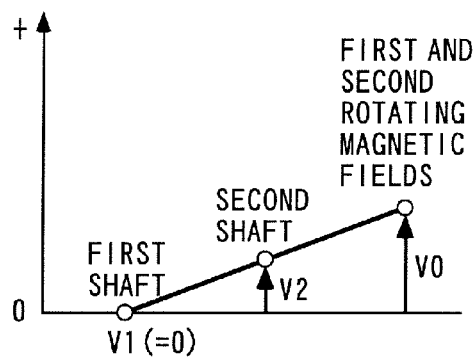
Figure 11B:
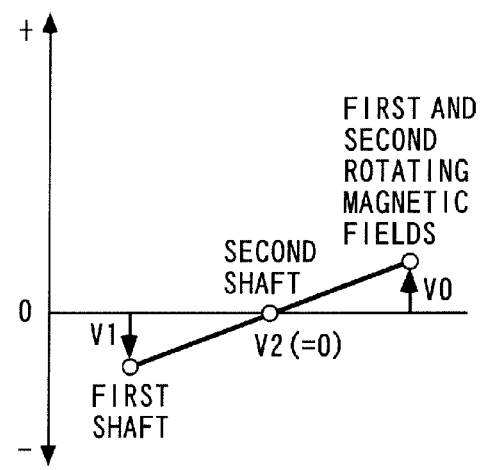
Figure 11C:
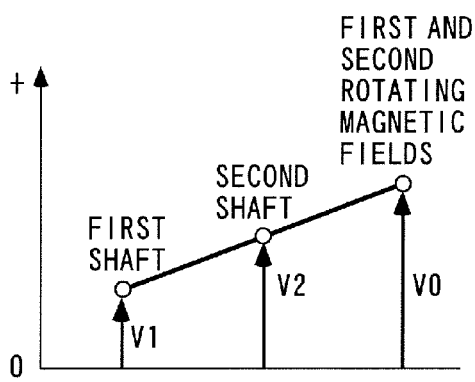
Figure 11D:
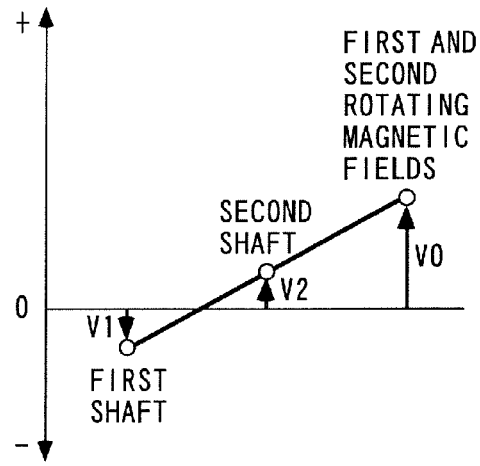

In this case, the rotational speed of the second shaft 22 (hereinafter referred to as "the second shaft rotational speed") V2 is equal to half of the rotational speed of the first and second rotating magnetic fields (hereinafter referred to as "the magnetic field rotational speed") V0, i.e. V2=V0/2 holds. That is, in this case, the relationship between the rotational speed of the first shaft 21 (hereinafter referred to as "the first shaft rotational speed") V1, the second shaft rotational speed V2, and the magnetic field rotational speed V0 is represented as shown in FIG. 11(a).

Next, referring to FIGS. 9 and 10, a description will be given of the operation of the electric motor 20 in the case of causing the first shaft 21 to rotate in a state in which the second shaft 22 is fixed. Since the first cores 25a are disposed as described above, they are magnetized by the first magnetic poles and the first armature magnetic poles, and magnetic lines of force (hereinafter referred to as "the first magnetic force lines") G1' are generated between the first magnetic poles, the first cores 25a, and the first armature magnetic poles. Similarly, since the second cores 25b are disposed as described above, they are magnetized by the second armature magnetic poles and the second magnetic poles, and magnetic lines of force (hereinafter referred to as "the second magnetic force lines") G2' are generated between the second armature magnetic poles, the second cores 25b, and the second magnetic poles.

Figure 9A:
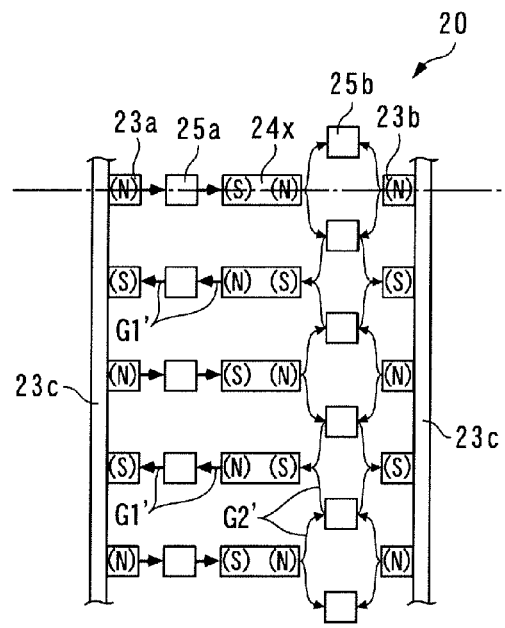

First, as shown in FIG. 9(a), the first and second rotating magnetic fields are generated in a manner rotated downward, as viewed in the figure, from a state in which each first core 25a is opposed to each first permanent magnet 23a, and each second core 25a is in a position between each adjacent two of the second permanent magnets 23b. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles.

Figure 9B:
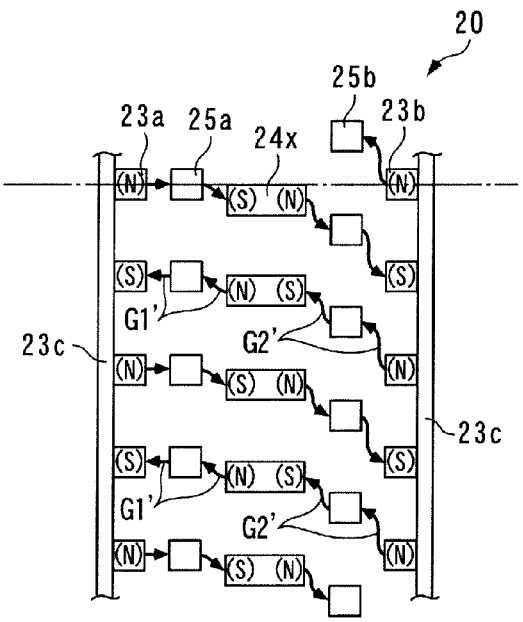

From this state, when the imaginary magnet 24x rotates to a position shown in FIG. 9(b), the first magnetic force line G1' between the first core 25a and the first armature magnetic pole is bent, and accordingly, the second armature magnetic pole becomes closer to the second core 25b, whereby the second magnetic force line G2' connecting between the second armature magnetic pole, the second core 25b and the second magnetic pole is generated. As a result, the magnetic circuit as shown in FIG. 8(b) is formed in the first and second permanent magnets 23a and 23b, the imaginary magnet 24x, and the first and second cores 25a and 25b.

In this state, although the total magnetic flux amount of the first magnetic force line G1' between the first magnetic pole and the first core 25a is large, the first magnetic force line G1' is straight, and hence no magnetic forces are generated which cause the first permanent magnet 23a to rotate with respect to the first core 25a. Further, since the distance from the second magnetic pole to the second armature magnetic pole having a different polarity than that of the second magnetic pole is relatively large, the total magnetic flux amount of the second magnetic force line G2' between the second core 25b and the second magnetic pole is relatively small. However, the degree of bend of the second magnetic force lines G2' is large, whereby magnetic forces act on the second permanent magnet 23b, so as to make the second permanent magnet 23b closer to the second core 25b. This causes the second permanent magnet 23b, together with the first permanent magnet 23a, to be driven in the direction of rotation of the imaginary magnets 24x, that is, in a direction (upward, as viewed in FIG. 9) opposite to the magnetic field rotation direction, and be rotated toward a position shown in FIG. 9(c). Further, in accordance with this, the first shaft 21 rotates in an direction opposite to the magnetic field rotation direction.

Figure 9C:
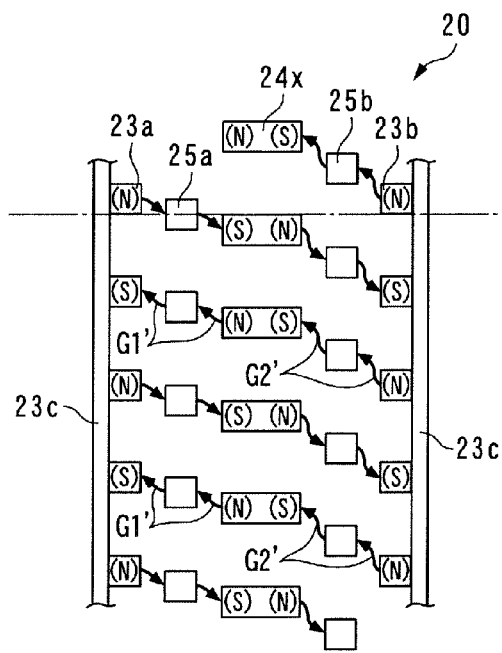
Figure 9D:
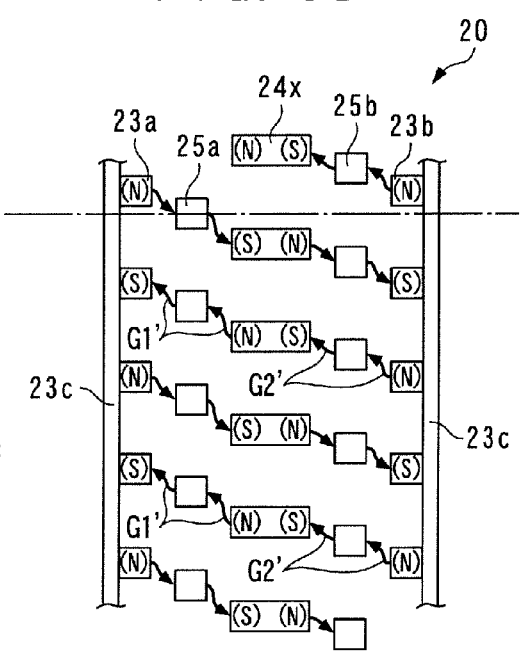

Then, during rotation of the first and second permanent magnets 23a and 23b from the position shown in FIG. 9(b) to the position shown in FIG. 9(c), the imaginary magnets 24x rotate toward a position shown in FIG. 9(d). As described above, although the second permanent magnets 23b become closer to the second cores 25b to make the degree of bend of the second magnetic force lines G2' between the second cores 25b and the second magnetic poles smaller, the imaginary magnets 24x become further closer to the second cores 25b, which increases the total magnetic flux amounts of the second magnetic force lines G2'. As a result, in this case as well, the magnetic forces act on the second permanent magnets 23b so as to make the second permanent magnets 23b closer to the second cores 25b, whereby the second permanent magnets 23b are driven, together with the first permanent magnets 23a, in the direction opposite to the magnetic field rotation direction.

Further, as the first permanent magnets 23a rotate in the direction opposite to the magnetic field rotation direction, the first magnetic force lines G1' between the first magnetic poles and the first cores 25a are bent, whereby magnetic forces act on the first permanent magnet 23a so as to make the first permanent magnet 23a closer to the first cores 25a. In this state, however, a magnetic force caused by the first magnetic force line G1' is smaller than the aforementioned magnetic force caused by the second magnetic force line G2', since the degree of bend of the first magnetic force line G1' is smaller than that of the second magnetic force line G2'. As a result, a magnetic force corresponding to the difference between the two magnetic forces drives the second permanent magnet 23b, together with the first permanent magnet 23a, in the direction opposite to the magnetic field rotation direction.

Then, as shown in FIG. 9(d), when the distance between the first magnetic pole and the first core 25a, and the distance between the second core 25b and the second magnetic pole have become approximately equal to each other, the total magnetic flux amount and the degree of bend of the first magnetic force line G1' between the first magnetic pole and the first core 25a become approximately equal to the total magnetic flux amount and the degree of bend of the second magnetic force line G2' between the second core 25b and the second magnetic pole, respectively. As a result, the magnetic forces caused by the first and second magnetic force lines G1' and G2' are approximately balanced, whereby the first and second permanent magnets 23a and 23b are temporarily placed in an undriven state.

From this state, when the imaginary magnets 24x rotate to respective positions shown in FIG. 10(a), the state of generation of the first magnetic force lines G1' is changed to form magnetic circuits as shown in FIG. 10(b). Accordingly, the magnetic forces caused by the first magnetic force lines G1' come to hardly act on the first permanent magnets 23a such that the magnetic forces make the first permanent magnets 23a closer to the first cores 25a, and therefore the second permanent magnets 23b are driven, together with the first permanent magnets 23a, by the magnetic forces caused by the second magnetic force lines G2', to respective positions shown in FIG. 10(c), in the direction opposite to the magnetic field rotation direction.

Then, when the imaginary magnets 24x slightly rotate from the position shown in FIG. 10(c), inversely to the above, the magnetic forces caused by the first magnetic force lines G1' between the first magnetic poles and the first cores 25a act on the first permanent magnets 23a so as to make the first permanent magnets 23a closer to the first cores 25a, whereby the first permanent magnets 23a are driven, together with the second permanent magnets 23b, in the direction opposite to the magnetic field rotation direction, to rotate the first shaft 21 in the direction opposite to the magnetic field rotation direction. Then, when the imaginary magnets 24x further rotate, the first permanent magnets 23a are driven, together with the second permanent magnets 23b, in the direction opposite to the magnetic field rotation direction, by respective magnetic forces corresponding to the differences between the magnetic forces caused by the first magnetic force lines G1' between the first magnetic poles and the first cores 25a, and the magnetic forces caused by the second magnetic force lines G2' between the second cores 25b and the second magnetic poles. After that, when the magnetic forces caused by the second magnetic force lines G2' come to hardly act on the second permanent magnets 23b such that the magnetic forces make the second permanent magnets 23b closer to the second cores 25b, the first permanent magnets 23a are driven, together with the second permanent magnets 23b, by the magnetic forces caused by the first magnetic force lines G1'.

As described hereinabove, in accordance with the rotations of the first and second rotating magnetic fields, the magnetic forces caused by the first magnetic force lines G1' between the first magnetic poles and the first cores 25a, the magnetic forces caused by the second magnetic force lines G2' between the second cores 25b and the second magnetic poles, and the magnetic forces corresponding to the differences between these magnetic forces alternately act on the first and second permanent magnets 23a and 23b, i.e. on the first shaft 21, whereby the first shaft 21 is rotated in the direction opposite to the magnetic field rotation direction. Further, the magnetic forces, that is, the driving forces thus act on the first shaft 21 alternately, whereby the torque of the first shaft 21 is made approximately constant.

In this case, as shown in FIG. 11(*b*), the first shaft 21 rotates at the same speed as that of the first and second rotating magnetic fields, in the opposite direction, and the relationship of V1=−V0 holds. This is because the magnetic forces caused by the first and second magnetic force lines G1' and G2' act to cause the first and second permanent magnets 23*a* and 23*b* to rotate while the first and second cores 25*a* and 25*b* maintain the respective states positioned at a mid point between the first magnetic pole and the first armature magnetic pole and a mid point between the second magnetic pole and the second armature magnetic pole.

It should be noted that assuming that in a state where the first shaft 21 and the second shaft 22 are made rotatable and power is input to one of the two shafts 21 and 22, the other is caused to rotate, the magnetic field rotational speed V0, the first shaft rotational speed V1, and the second shaft rotational speed V2 satisfy the following relationship: As described above, due to the actions of the magnetic forces caused by the first and second magnetic force lines G1 and G2, the first and second cores 7*a* and 8*a* rotate, while maintaining the respective states positioned at a mid point between the first magnetic poles and the first armature magnetic poles and at a mid point between the second magnetic poles and the second armature magnetic poles. This also applies to the first and second cores 25*a* and 25*b*, similarly. Since the first and second cores 25*a* and 25*b* rotate as such, the rotational angle of the second shaft 22 integral with the both 25*a* and 25*b* is an average value of the rotational angle of the first and second rotating magnetic fields, and the rotational angle of the first and second magnetic poles, i.e. the rotational angle of the first shaft 21.

Therefore, when power is input to one of the first and second shafts 21 and 22, and the other is caused to rotate, the magnetic field rotational speed V0, and the first and second shaft rotational speeds V1 and V2 satisfy the relationship of V2=(V0+V1)/2. In this case, by controlling the magnetic field rotational speed V0 and the rotational speed of one of the first and second shafts 21 and 22, it is possible to control the other. FIG. 11(*c*) shows an example of the case in which both of the first and second shafts 21 and 22 are rotated in the magnetic field rotation direction, and FIG. 11(*d*) shows an example of the case in which the first shaft 21 is rotated in the opposite direction.

Next, a description will be given of a method of deriving a voltage equation of the electric motor 20 constructed as above. As compared with a general brushless DC motor of a one-rotor type, the electric motor 20 is identical in the arrangement of the stator 24, but is different in that it has not only the first rotor 23 comprising permanent magnets but also the second rotor 25 comprising soft magnetic material elements. From this, the voltages of the U-phase to W-phase currents Iu, Iv, and Iw are approximately the same as those of the general brushless DC motor, but counter-electromotive force voltages (induced voltages) generated in the U-phase to W-phase coils 24*c* according to the rotations of the first and second rotors 23 and 25 are different from those of the general brushless DC motor.

Figure 12:
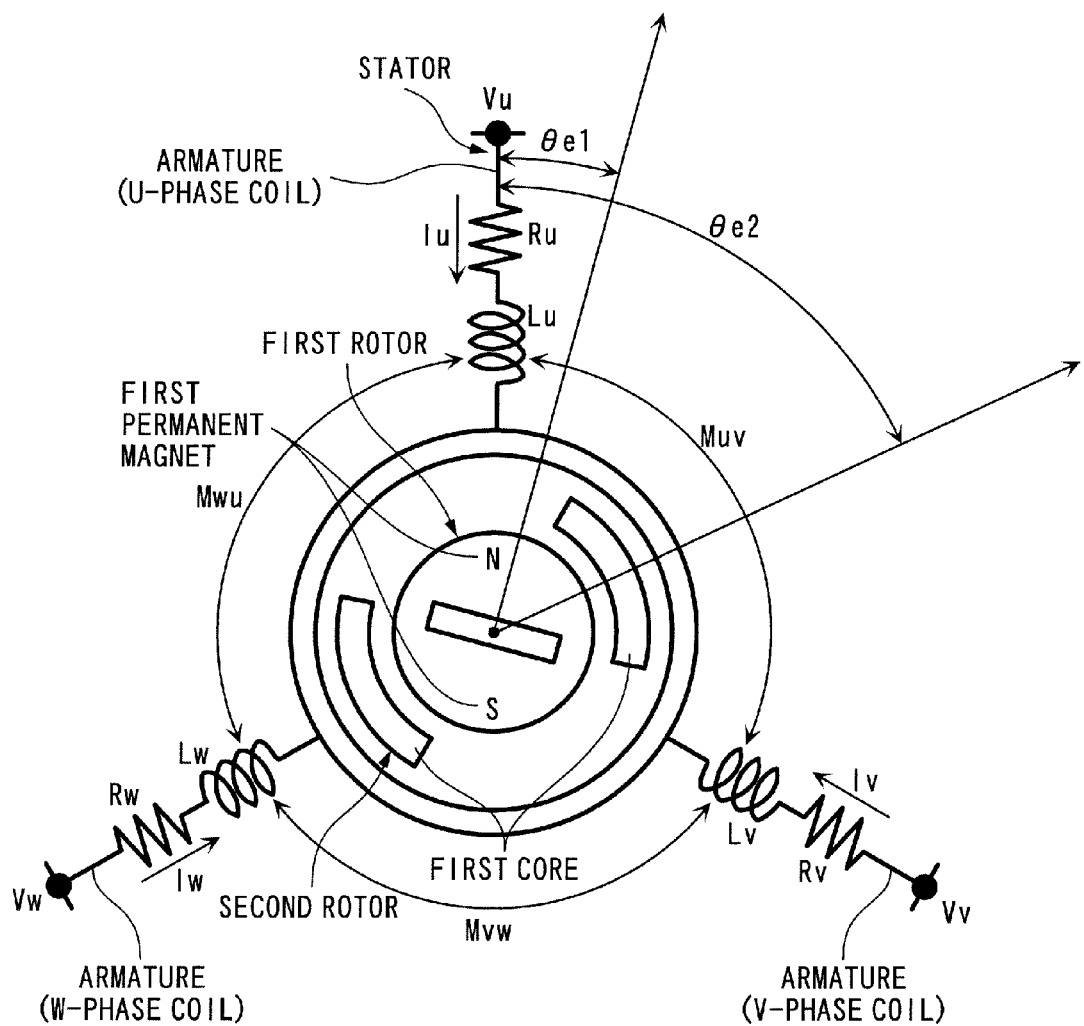

The counter-electromotive force voltage is determined as described hereafter. Assuming that 2n first permanent magnets 23*a*, 2n first cores 25*a*, and 3n armatures 24*a* form a single electric motor structure, FIG. 12 shows an example of an equivalent circuit corresponding to the electric motor structure. It should be noted that the figure shows a case of the number of poles being equal to 2, for convenience's sake, but the number of poles of the electric motor 20 is 2n, as described hereinabove. In this case, the magnetic fluxes $\Psi ua1$, $\Psi va1$, and $\Psi wa1$ of the first permanent magnet 23*a* directly passing through the respective ti-phase to W-phase coils 24*c* without via the first cores 25*a* are represented by the following equations (1) to (3):

$$\Psi ua1 = \Psi fb \cdot \cos(\theta e1) \quad (1)$$

$$\Psi va1 = \Psi fb \cdot \cos\left(\theta e1 - \frac{2}{3}\pi\right) \quad (2)$$

$$\Psi wa1 = \Psi fb \cdot \cos\left(\theta e1 + \frac{2}{3}\pi\right) \quad (3)$$

Here, $\Psi fb$ represents the maximum value of magnetic flux of the first permanent magnet 23*a* directly passing through the coil 24*c* of each phase. Further, $\theta e1$ represents a first rotor electrical angle which is the rotational angle of the first rotor 23 with respect to the armature 24*a* of the stator 24 serving as a reference (hereinafter referred to as "the reference armature") in terms of an electrical angle.

Further, the magnetic fluxes $\Psi ua2$, $\Psi va2$, and $\Psi wa2$ of the first permanent magnets 23*a* passing through the U-phase to W-phase coils 24*c* via the first cores 25*a* are represented by the following equations (4) to (6):

$$\Psi ua2 = \Psi fa \cdot \cos(\theta e2 - \theta e1)\cos(\theta e2) \quad (4)$$

$$\Psi va2 = \Psi fa \cdot \cos(\theta e2 - \theta e1)\cos\left(\theta e2 - \frac{2}{3}\pi\right) \quad (5)$$

$$\Psi wa2 = \Psi fa \cdot \cos(\theta e2 - \theta e1)\cos\left(\theta e2 + \frac{2}{3}\pi\right) \quad (6)$$

Here, $\Psi fa$ represents the maximum value of magnetic flux of the first permanent magnet 23*a* passing through the coil 24*c* of each phase via the first core 25*a*. Further, $\theta e2$ represents a second rotor electrical angle which is the rotational angle of the second rotor 25 with respect to the above-mentioned reference armature in terms of an electrical angle.

The magnetic fluxes $\Psi ua$, $\Psi va$, and $\Psi wa$ of the first permanent magnets 23*a* passing though the U-phase to W-phase coils 24*c*, respectively, are represented by the respective sums of the magnetic fluxes $\Psi ua1$, $\Psi va1$, and $\Psi wa1$ directly passing though the above-mentioned U-phase to W-phase coils 24*c*, respectively, and the magnetic fluxes $\Psi ua2$, $\Psi va2$, and $\Psi wa2$ passing though the U-phase to W-phase coils 24*c*, respectively, via the first cores 25*a*, i.e. ($\Psi ua1+\Psi ua2$), ($\Psi va1+\Psi va2$), and ($\Psi wa1+\Psi wa2$), respectively. Therefore, from the aforementioned equations (1) to (6), these magnetic fluxes $\Psi ua$, $\Psi va$, and $\Psi wa$ are represented by the following equations (7) to (9):

$$\Psi ua = \Psi fa \cdot \cos(\theta e2 - \theta e1)\cos(\theta e2) + \Psi fb \cdot \cos(\theta e1) \quad (7)$$

$$\Psi va = \Psi fa \cdot \cos(\theta e2 - \theta e1)\cos\left(\theta e2 - \frac{2}{3}\pi\right) + \Psi fb \cdot \cos\left(\theta e1 - \frac{2}{3}\pi\right) \quad (8)$$

$$\Psi wa = \Psi fa \cdot \cos(\theta e2 - \theta e1)\cos\left(\theta e2 + \frac{2}{3}\pi\right) + \Psi fb \cdot \cos\left(\theta e1 + \frac{2}{3}\pi\right) \quad (9)$$

Further, the transformation of these equations (7) to (9) gives the following equations (10) to (12):

$$\Psi ua = \frac{\Psi fa}{2}[\cos(2\theta e2 - \theta e1) + \cos(-\theta e1)] + \Psi fb \cdot \cos(\theta e1) \quad (10)$$

$$\Psi va = \frac{\Psi fa}{2}\begin{bmatrix} \cos\left(2\theta e2 - \theta e1 - \frac{2}{3}\pi\right) + \\ \cos\left(-\theta e1 + \frac{2}{3}\pi\right) \end{bmatrix} + \Psi fb \cdot \cos\left(\theta e1 - \frac{2}{3}\pi\right) \quad (11)$$

$$\Psi wa = \frac{\Psi fa}{2}\begin{bmatrix} \cos\left(2\theta e2 - \theta e1 + \frac{2}{3}\pi\right) + \\ \cos\left(-\theta e1 - \frac{2}{3}\pi\right) \end{bmatrix} + \Psi fb \cdot \cos\left(\theta e1 + \frac{2}{3}\pi\right) \quad (12)$$

Further, by differentiating the magnetic fluxes Ψua, Ψva, and Ψwa of the first permanent magnets 23a passing through the U-phase to W-phase coils 24c with respect to time, it is possible to obtain the counter-electromotive force voltages generated in the U-phase to W-phase coils 24c according to the rotation of the first permanent magnets 23a and/or the first cores 25a (hereinafter respectively referred to as "the first U-phase counter-electromotive force voltage Vcu1", "the first V-phase counter-electromotive force voltage Vcv1" and "the first W-phase counter-electromotive force voltage Vcw1"), respectively. Therefore, the first U-phase to W-phase counter-electromotive force voltages Vcu1, Vcv1, and Vcw1 can be expressed by the following equations (13) to (15) obtained by differentiating the equations (10) to (12) with respect to time, respectively.

$$Vcu1 = \quad (13)$$
$$-(2\omega e2 - \omega e1)\frac{\Psi fa}{2} \cdot \sin(2\theta e2 - \theta e1) - \omega e1\left(\frac{\Psi fa}{2} + \Psi fb\right)\sin(\theta e1)$$

$$Vcv1 = -(2\omega e2 - \omega e1)\frac{\Psi fa}{2} \cdot \sin\left(2\theta e2 - \theta e1 - \frac{2}{3}\pi\right) - \quad (14)$$
$$\omega e1\left(\frac{\Psi fa}{2} + \Psi fb\right)\sin\left(\theta e1 - \frac{2}{3}\pi\right)$$

$$Vcw1 = -(2\omega e2 - \omega e1)\frac{\Psi fa}{2} \cdot \sin\left(2\theta e2 - \theta e1 + \frac{2}{3}\pi\right) - \quad (15)$$
$$\omega e1\left(\frac{\Psi fa}{2} + \Psi fb\right)\sin\left(\theta e1 + \frac{2}{3}\pi\right)$$

Here, ωe2 represents a value obtained by differentiating θe2 with respect to time, i.e. a value obtained by converting the angular velocity of the second rotor 25 to an electrical angular velocity (hereinafter referred to as "the second rotor electrical angular velocity"), and ωe1 represents a value obtained by differentiating θe1 with respect to time, i.e. a value obtained by converting the angular velocity of the first rotor 23 to an electrical angular velocity (hereinafter referred to as "the first rotor electrical angular velocity").

Figure 13:
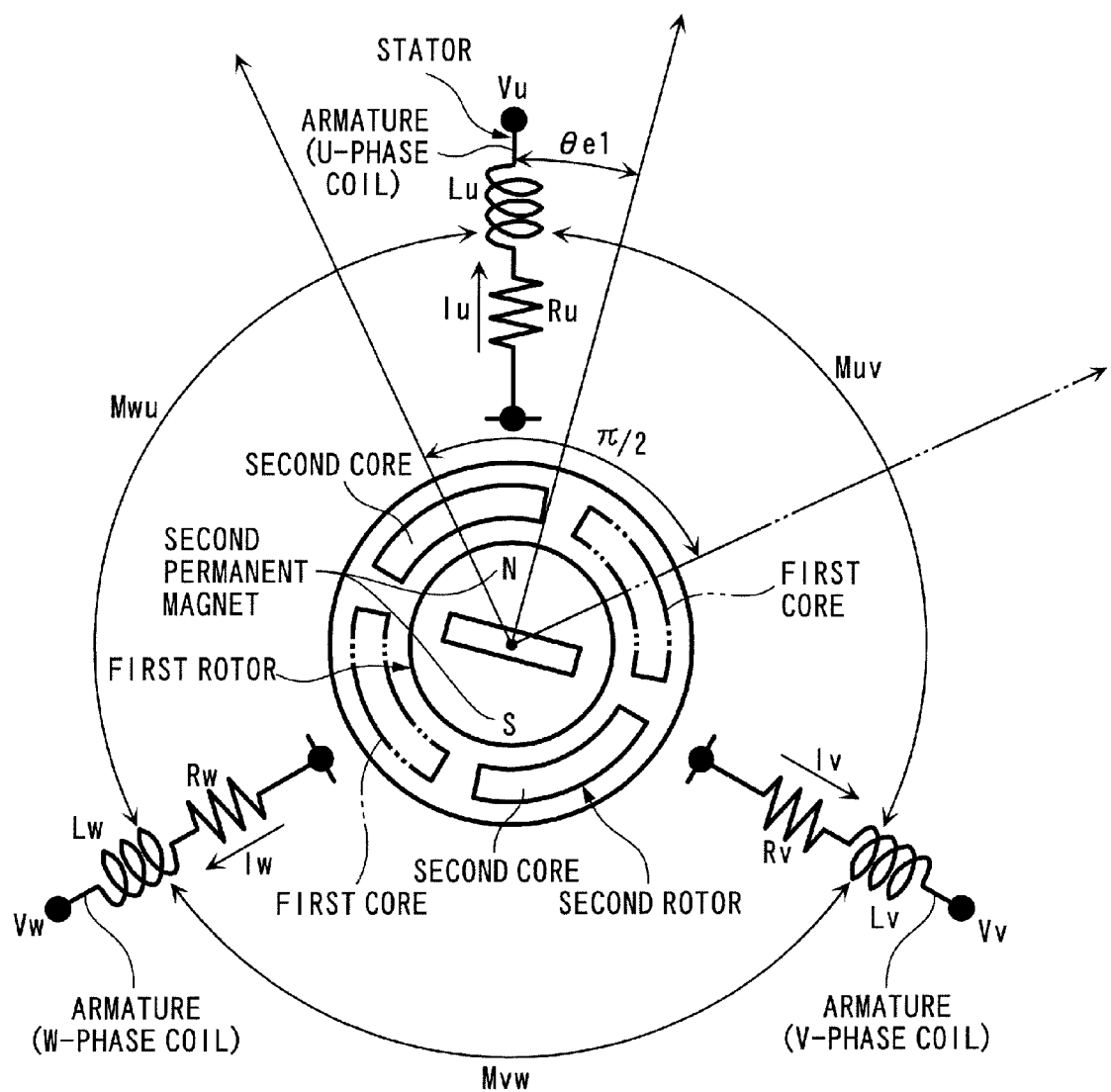

Assuming that 2n second permanent magnets 23b, 2n second cores 25a, and 3n armatures 24a form a single electric motor structure, FIG. 13 shows an example of an equivalent circuit corresponding to the electric motor structure. In this case, the counter-electromotive force voltage generated in the U-phase to W-phase coils 24c according to the rotation of the second permanent magnet 23b and/or the second core 25b can be determined, similarly to the case of the first permanent magnet 23a and the first core 25a, in the following manner: Hereinafter, the counter-electromotive force voltages generated in the U-phase to W-phase coils 24c are referred to as "the second U-phase counter-electromotive force voltage Vcu2", "the second V-phase counter-electromotive force voltage Vcv2", and "the second W-phase counter-electromotive force voltage Vcw2", respectively.

More specifically, the first permanent magnet 23a and the second permanent magnet 23b are a one-piece member, as mentioned hereinabove, and hence the maximum value of the magnetic flux of the second permanent magnet 23b directly passing through the coil 24c of each phase is equal to the maximum value of the magnetic flux of the first permanent magnet 23a directly passing through the coil 24c of each phase, and at the same time, the maximum value of the magnetic flux of the second permanent magnet 23b passing through the coil 24c of each phase via the second core 25b is equal to the maximum value of the magnetic flux of the first permanent magnet 23a passing through the coil 24c of each phase via the first core 25a. Further, as described hereinabove, the respective electrical angles of the first and second cores 25a and 25b are different from each other by an electrical angle of π/2 (see FIG. 13). From the above, the magnetic fluxes Ψub, Ψvb, and Ψwb of the second permanent magnet 23b passing through the U-phase to W-phase coils 24c (i.e. the respective sums of magnetic fluxes passing via the second cores 25b and magnetic fluxes passing without via the second cores 25b) can be expressed by the following equations (16) to (18), respectively:

$$\Psi ub = \Psi fa \cdot \sin(\theta e2 - \theta e1)\sin(\theta e2) + \Psi fb \cdot \cos(\theta e1) \quad (16)$$

$$\Psi vb = \Psi fa \cdot \sin(\theta e2 - \theta e1)\sin\left(\theta e2 - \frac{2}{3}\pi\right) + \Psi fb \cdot \cos\left(\theta e1 - \frac{2}{3}\pi\right) \quad (17)$$

$$\Psi wb = \Psi fa \cdot \sin(\theta e2 - \theta e1)\sin\left(\theta e2 + \frac{2}{3}\pi\right) + \Psi fb \cdot \cos\left(\theta e1 + \frac{2}{3}\pi\right) \quad (18)$$

Changes of these equations (16) to (18) give the following equations (19) to (21):

$$\Psi ub = -\frac{\Psi fa}{2}[\cos(2\theta e2 - \theta e1) - \cos(-\theta e1)] + \Psi fb \cdot \cos(\theta e1) \quad (19)$$

$$\Psi vb = -\frac{\Psi fa}{2}\begin{bmatrix} \cos\left(2\theta e2 - \theta e1 - \frac{2}{3}\pi\right) - \\ \cos\left(-\theta e1 + \frac{2}{3}\pi\right) \end{bmatrix} + \Psi fb \cdot \cos\left(\theta e1 - \frac{2}{3}\pi\right) \quad (20)$$

$$\Psi wb = -\frac{\Psi fa}{2}\begin{bmatrix} \cos\left(2\theta e2 - \theta e1 + \frac{2}{3}\pi\right) - \\ \cos\left(-\theta e1 - \frac{2}{3}\pi\right) \end{bmatrix} + \Psi fb \cdot \cos\left(\theta e1 + \frac{2}{3}\pi\right) \quad (21)$$

Further, by differentiating the magnetic fluxes Ψub, Ψvb, and Ψwb of the second permanent magnets 23b passing through the respective U-phase to W-phase coils 24c with respect to time, it is possible to obtain the aforementioned second U-phase to W-phase counter-electromotive force voltages Vcu2, Vcv2 and Vcw2. Therefore, these counter-electromotive force voltages Vcu2, Vcv2 and Vcw2 can be expressed by the following equations (22) to (24) obtained by differentiating the equations (19) to (21) with respect to time, respectively:

$$Vcu2 = (2\omega e2 - \omega e1)\frac{\Psi fa}{2} \cdot \sin(2\theta e2 - \theta e1) - \omega e1\left(\frac{\Psi fa}{2} + \Psi fb\right)\sin(\theta e1) \quad (22)$$

$$Vcv2 = (2\omega e2 - \omega e1)\frac{\Psi fa}{2} \cdot \sin\left(2\theta e2 - \theta e1 - \frac{2}{3}\pi\right) - \omega e1\left(\frac{\Psi fa}{2} + \Psi fb\right)\sin\left(\theta e1 - \frac{2}{3}\pi\right) \quad (23)$$

$$Vcw2 = (2\omega e2 - \omega e1)\frac{\Psi fa}{2} \cdot \sin\left(2\theta e2 - \theta e1 + \frac{2}{3}\pi\right) - \omega e1\left(\frac{\Psi fa}{2} + \Psi fb\right)\sin\left(\theta e1 + \frac{2}{3}\pi\right) \quad (24)$$

Further, as described above, the stator 24 is configured such that magnetic poles having different polarities from each other are generated at ends of each iron core 24b toward the first and second permanent magnets 23a and 23b. Further, out of the first and second permanent magnets 23a and 23b, ones disposed side by side in the axial direction have the same polarity. As is clear from the above, the electrical angles of the first and second permanent magnets 23a and 23b in the side-by-side axial arrangement are displaced from each other by an electrical angle of π. Therefore, the counter-electromotive force voltages Vcu, Vcv, and Vcw generated at the U-phase to W-phase coils 24c according to the rotations of the first and/or second rotors 23 and 25 are equal to the respective differences between the aforementioned first U-phase to W-phase counter-electromotive force voltages Vcu1, Vcv1, and Vcw1 and the second U-phase to W-phase counter-electromotive force voltages Vcu2, Vcv2 and Vcw2, i.e. (Vcu1−Vcu2), (Vcv1−Vcv2) and (Vcw1−Vcw2), respectively. Therefore, from the equations (13) to (15) and the equations (22) to (24), these counter-electromotive force voltages Vcu, Vcv, and Vcw can be represented by the following equations (25) to (27):

$$Vcu = -(2\omega e2 - \omega e1)\Psi fa \cdot \sin(2\theta e2 - \theta e1) \quad (25)$$

$$Vcv = -(2\omega e2 - \omega e1)\Psi fa \cdot \sin\left(2\theta e2 - \theta e1 - \frac{2}{3}\pi\right) \quad (26)$$

$$Vcw = -(2\omega e2 - \omega e1)\Psi fa \cdot \sin\left(2\theta e2 - \theta e1 + \frac{2}{3}\pi\right) \quad (27)$$

Here, assuming that the total magnetic flux amount in the whole electric motor 20 is represented by Ψ, Ψ=2·Ψfa holds, and hence when this is applied to the aforementioned equations (25) to (27), it is possible to obtain the following equations (28) to (30):

$$Vcu = -(2\omega e2 - \omega e1)\frac{\Psi}{2} \cdot \sin(2\theta e2 - \theta e1) \quad (28)$$

$$Vcv = -(2\omega e2 - \omega e1)\frac{\Psi}{2} \cdot \sin\left(2\theta e2 - \theta e1 - \frac{2}{3}\pi\right) \quad (29)$$

$$Vcw = -(2\omega e2 - \omega e1)\frac{\Psi}{2} \cdot \sin\left(2\theta e2 - \theta e1 + \frac{2}{3}\pi\right) \quad (30)$$

Further, the voltages of the U-phase to W-phase coils 24c (hereinafter referred to as "the U-phase voltage Vu", "the V-phase voltage Vu", and "the W-phase voltage Vw") are represented by the respective sums of the voltages of the U-phase to W-phase currents Iu, Iv, and Iw, and the counter-electromotive force voltages Vcu, Vcv, and Vcw of the U-phase to W-phase coils 24c. Therefore, the voltage equation of the electric motor 20 is represented by the following equation (31):

$$\begin{bmatrix} Vu \\ Vv \\ Vw \end{bmatrix} = \begin{bmatrix} Ru + s \cdot Lu & s \cdot Muv & s \cdot Mwu \\ s \cdot Muv & Rv + s \cdot Lv & s \cdot Mvw \\ s \cdot Mwu & s \cdot Mvw & Rw + s \cdot Lw \end{bmatrix} \begin{bmatrix} Iu \\ Iv \\ Iw \end{bmatrix} - \begin{bmatrix} (2\omega e2 - \omega e1)\frac{\Psi}{2} \cdot \sin(2\theta e2 - \theta e1) \\ (2\omega e2 - \omega e1)\frac{\Psi}{2} \cdot \sin\left(2\theta e2 - \theta e1 - \frac{2}{3}\pi\right) \\ (2\omega e2 - \omega e1)\frac{\Psi}{2} \cdot \sin\left(2\theta e2 - \theta e1 + \frac{2}{3}\pi\right) \end{bmatrix} \quad (31)$$

Here, as described above, Ru, Rv, and Rw represent respective resistances of the U-phase to W-phase coils 24c, and Lu, Lv, and Lw represent respective self-inductances of the U-phase to W-phase coils 24c, each having a predetermined value. Further, Muv, Mvw, and Mwu represent respective mutual inductances between the U-phase coil 24c and the V-phase coil 24c, between the V-phase coil 24c and the W-phase coil 24c, and between the W-phase coil 24c and the U-phase coil 24c, each having a predetermined value. Further, s represents a differential operator.

Further, as is clear from the above equation (31), the voltage equation of the electric motor 20 becomes the same as that of the general brushless DC motor, when (2θe2−θe1) and (2ωe2−ωe1) of the voltage equation of the electric motor 20 are replaced by the electrical angles θe and electrical angular velocities we of the rotor of the general brushless DC motor, respectively. From this, it is understood that to cause the electric motor 20 to operate, it is only required to control an electrical angle θx of the vectors of the above-described first and second rotating magnetic fields such that θx=(2θe2−θe1) holds. Further, this holds true irrespective of the number of poles and the number of phases of the coils 24c.

On the other hand, in the case of the electric motor 1 according to the present embodiment, as described hereinabove, during operation of the electric motor 1, electric power supplied to the first to third stators 6 to 8 is controlled by the ECU 15, whereby the first to third rotating magnetic fields are generated. At this time, as shown in FIG. 14, the electric power supplied to the first to third stators 6 to 8 is controlled such that when the first to third rotating magnetic fields are replaced by the rotations of three imaginary magnets 6x to 8x, the relationship shown in the figure is satisfied between the polarities of the magnetic poles of the imaginary magnets 6x to 8x (i.e. the first to third armature magnetic poles) and respective phases thereof. It should be noted that for ease of understanding, the figure shows a state in which the phases of the two permanent magnets 4b and 5b of the first rotor and that of the first core 11b of the second rotor 10 are in the same position. Further, magnetic poles indicated by respective portions illustrated in solid black in the figure represent the magnetic poles of the permanent magnets, and this also applies to figures, referred to hereinafter.

Figure 15:
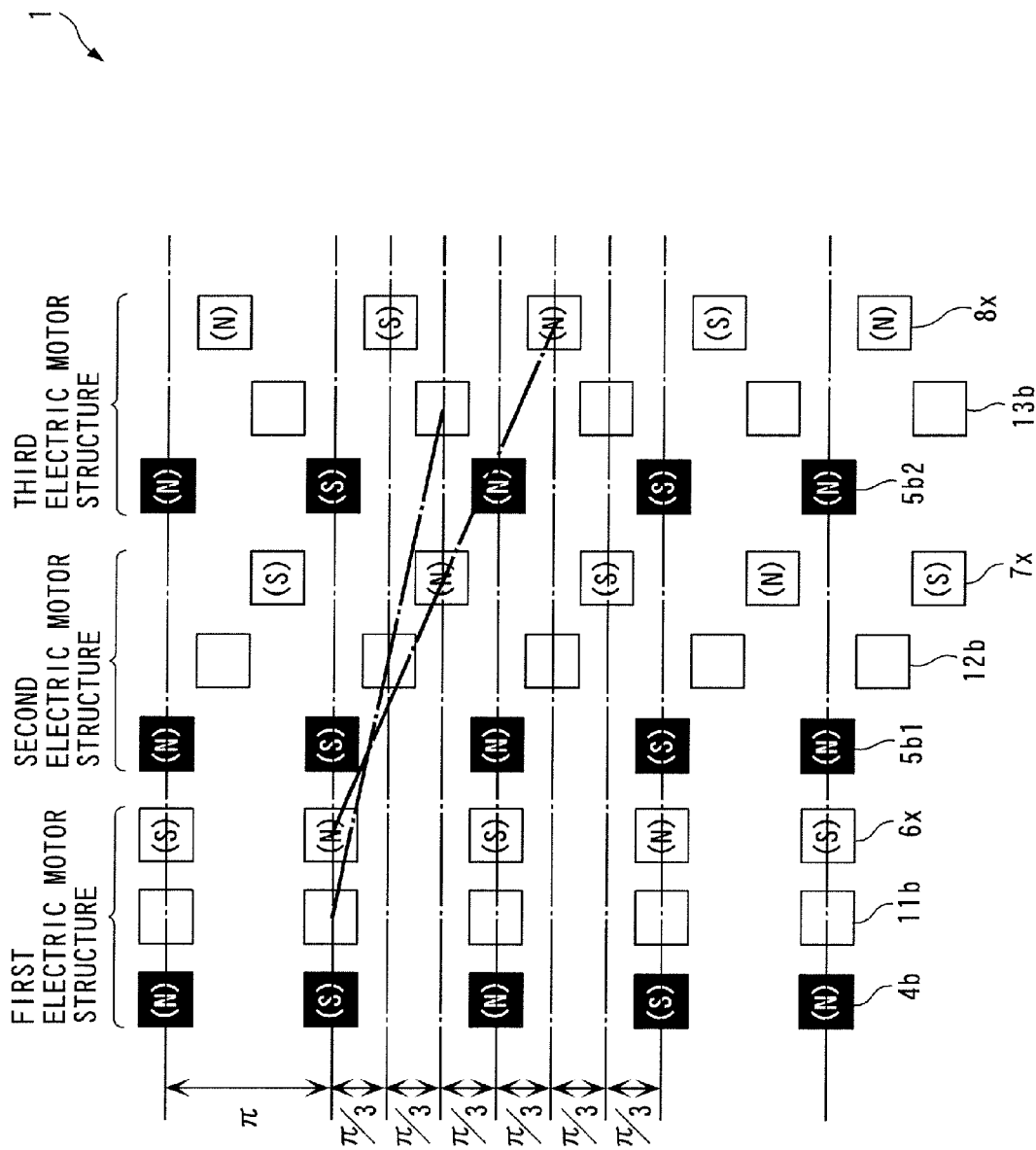

Assuming that each second permanent magnet 5b appearing in the figure is formed by integrally combining two second permanent magnets 5b1 and 5b2, when the second permanent magnet 5b is divided into the two second permanent magnets 5b1 and 5b2 and the positional relationships between the second permanent magnets 5b1 and the imaginary magnets 7x with respect to the second cores 12b are exchanged, an arrangement shown in FIG. 15 is obtained.

That is, the FIG. 15 arrangement can be regarded as equivalent to the FIG. 14 arrangement.

As is clear from FIG. 15, the three permanent magnets 4b, 5b1 and 5b2 having the same magnetic polarity are arranged side by side in the left-right direction, as viewed in the figure, and are in the same phase. Further, in the case of the first to third cores 11b to 13b, each adjacent two of them are displaced downward one from the other, as viewed in the figure, by an electrical angle of π/3. That is, the first to third cores 11b to 13b are in a skewed arrangement. Furthermore, in the case of the magnetic poles of the imaginary magnets 6x to 8x, i.e. the first to third armature magnetic poles, each adjacent two of the magnetic poles are displaced downward one from the other, as viewed in the figure, by an electrical angle of 2π/3.

Figure 16:
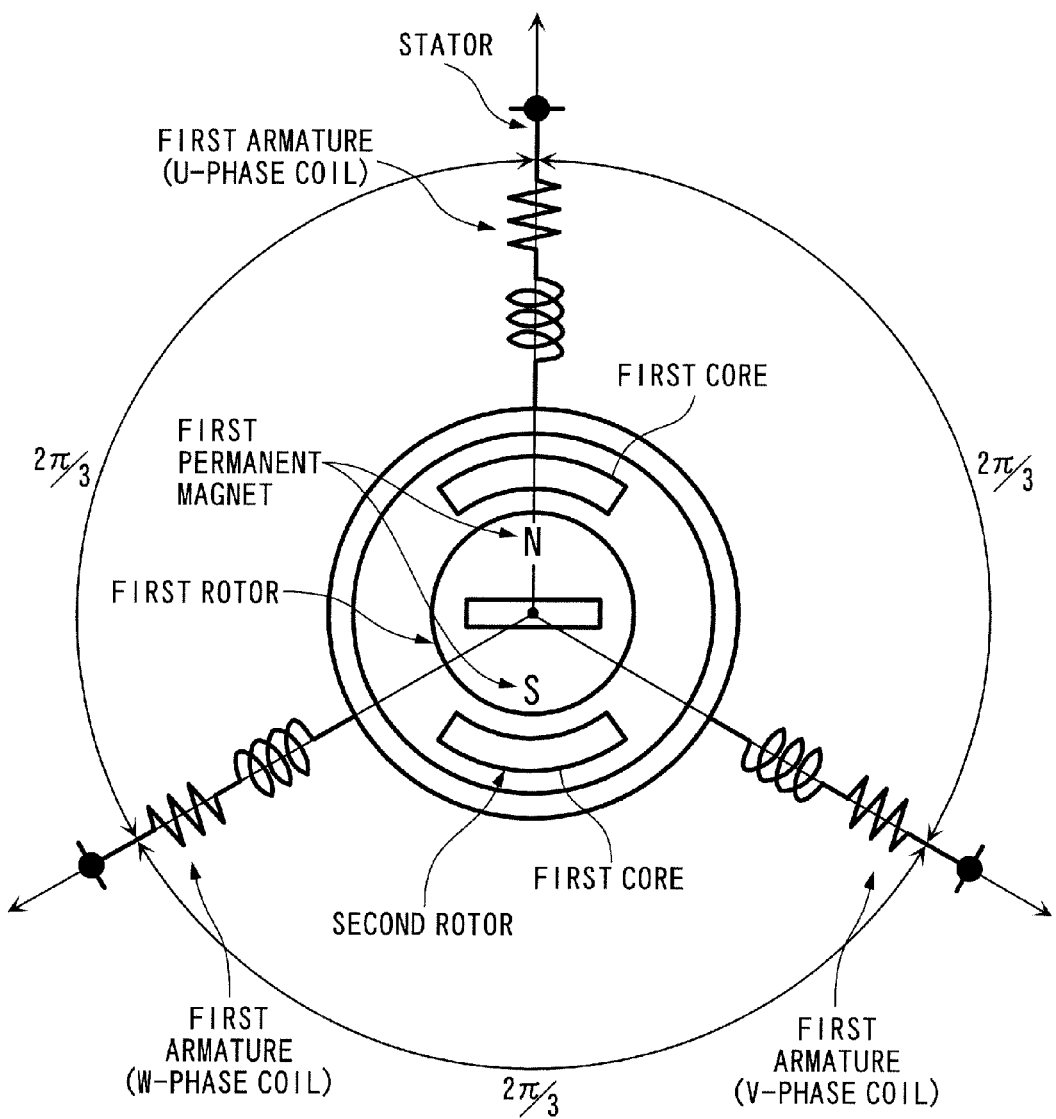
Figure 17:
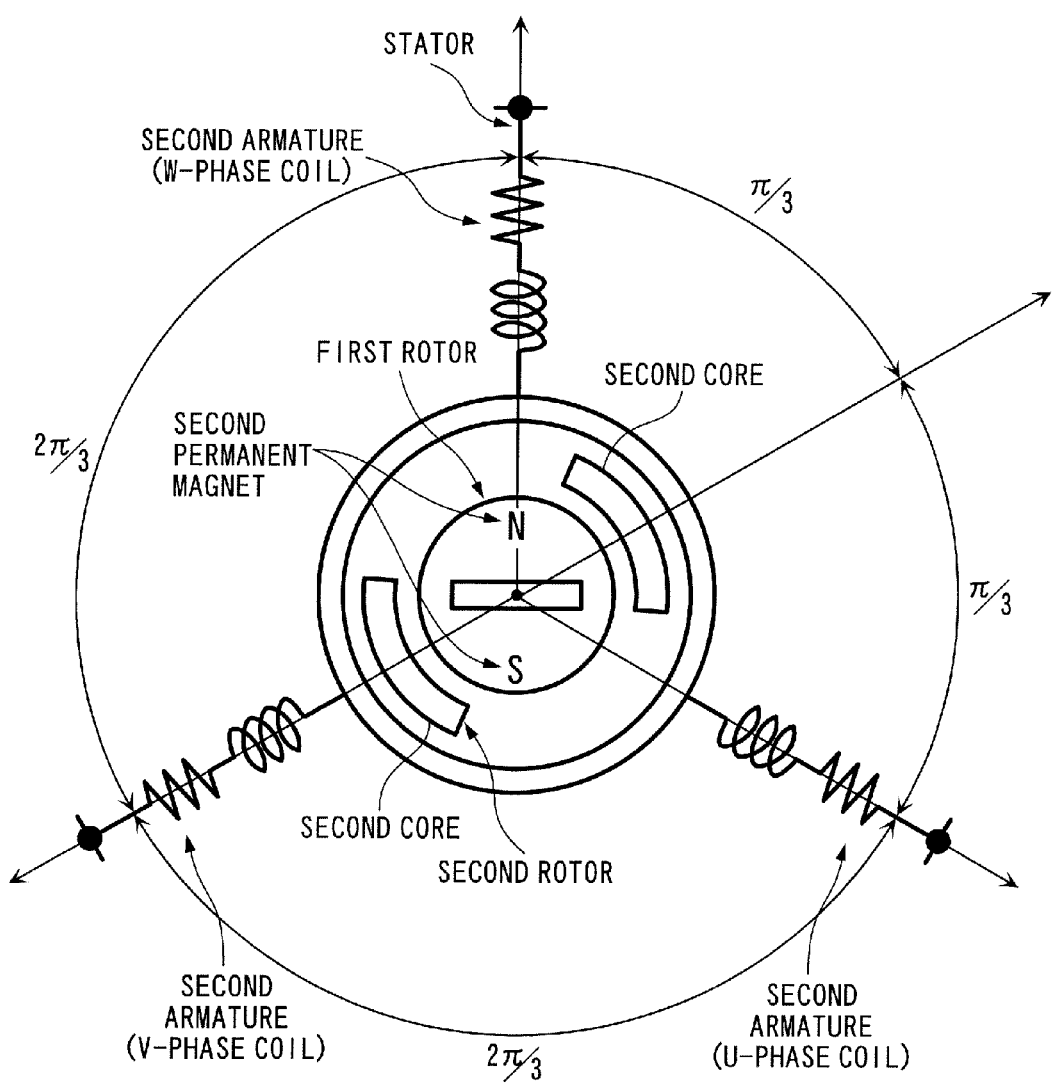

Here, assuming that the first permanent magnet row, the first soft magnetic material core row, and the first armature row, described hereinabove, form a single electric motor structure (hereinafter referred to as "the first electric motor structure"), an example of an equivalent circuit corresponding to the first electric motor structure is shown in FIG. 16. Further, assuming that the second permanent magnet row formed of the second permanent magnets 5b1 (i.e. the second permanent magnets 5b), the second soft magnetic material core row, and the second armature row form a single electric motor structure (hereinafter referred to as "the second electric motor structure"), an example of an equivalent circuit corresponding to the second electric motor structure is shown in FIG. 17.

Figure 18:
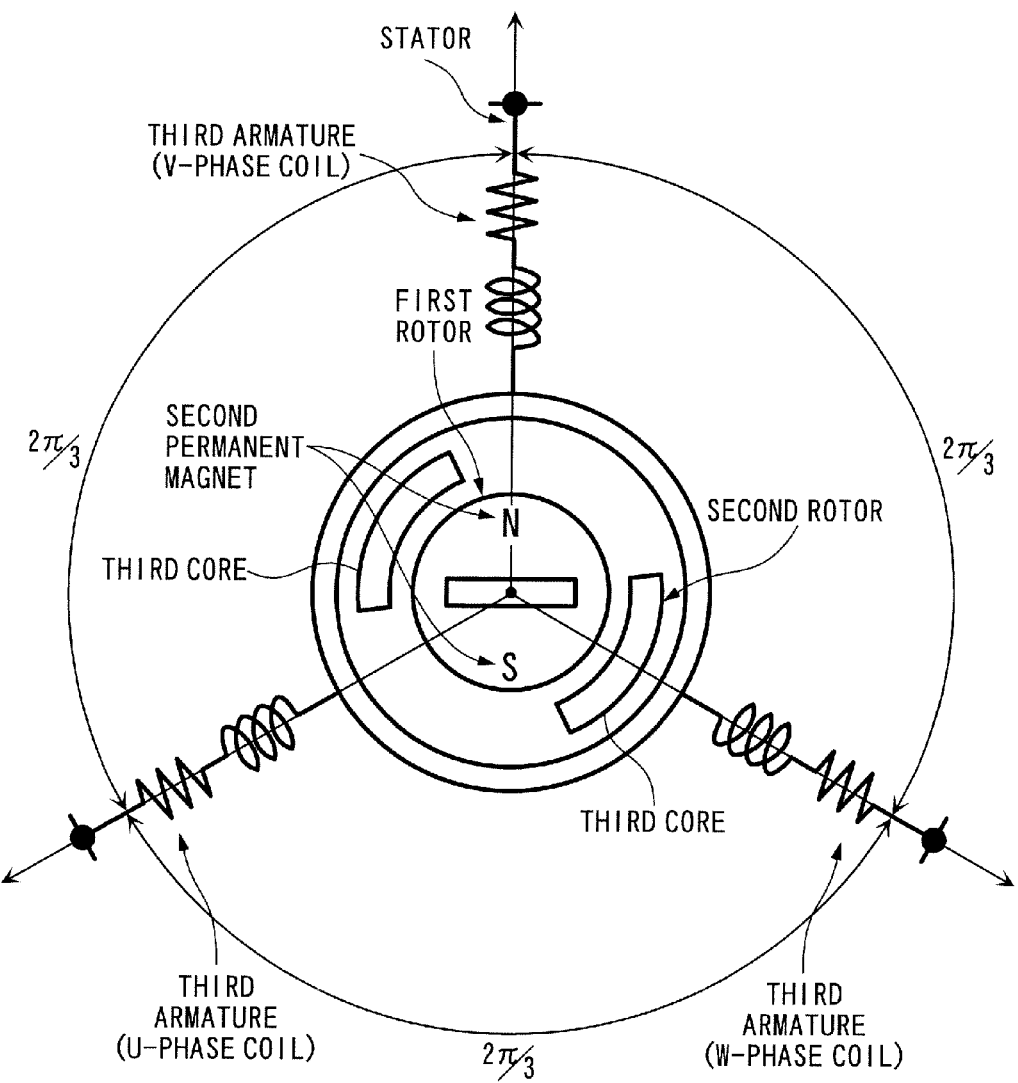

Furthermore, assuming that the second permanent magnet row formed of the second permanent magnets 5b2 (i.e. the second permanent magnets 5b), the third soft magnetic material core row, and the third armature row form a single electric motor structure (hereinafter referred to as "the third electric motor structure"), an example of an equivalent circuit corresponding to the third electric motor structure is shown in FIG. 18. It should be noted that FIGS. 16 to 18 illustrate the case of the number of poles=2, for convenience's sake. In each of the above-described three electric motor structures, when a rotating magnetic field is generated, magnetic circuits (not shown) are formed between the permanent magnets, the soft magnetic material cores, and the armatures of the respective electric motor structures. It should be noted that in the present embodiment, the electric motor structure corresponds to a magnetic machine structure.

Next, a description will be given of the counter-electromotive force voltages in the electric motor 1 having the three electric motor structures, described above. When the first and second rotors 3 and 10 rotate, magnetic fluxes $\Psi u1$ to $\Psi u3$ appearing in the respective U phases of the three electric motor structures are expressed by the following equations (32) to (34):

$$\Psi u1 = \psi f \cdot \cos(\theta 2 - \theta 1)\cos(\theta 2) \tag{32}$$

$$\Psi u2 = \psi f \cdot \cos\left\{\left(\theta 2 - \frac{1}{3}\pi\right) - \left(\theta 1 - \frac{2}{3}\pi\right)\right\}\cos\left(\theta 2 - \frac{1}{3}\pi\right) \tag{33}$$

$$= \psi f \cdot \cos\left(\theta 2 - \theta 1 + \frac{1}{3}\pi\right)\cos\left(\theta 2 - \frac{1}{3}\pi\right)$$

$$\Psi u3 = \psi f \cdot \cos\left\{\left(\theta 2 + \frac{1}{3}\pi\right) - \left(\theta 1 + \frac{2}{3}\pi\right)\right\}\cos\left(\theta 2 + \frac{1}{3}\pi\right) \tag{34}$$

$$= \psi f \cdot \cos\left(\theta 2 - \theta 1 - \frac{1}{3}\pi\right)\cos\left(\theta 2 + \frac{1}{3}\pi\right)$$

Here, φf represents the maximum value of the magnetic flux of the first and second permanent magnets 4b and 5b passing through the three U-phase coils 6c to 8c via the three cores 11b to 13b. Further, θ1 represents the first rotor electrical angle which is the rotational angle of the first rotor 3 with respect to a reference position in terms of an electrical angle. Furthermore, θ2 represents the second rotor electrical angle which is the rotational angle of the second rotor 10 with respect to a reference position in terms of an electrical angle. In addition, ω1 and ω2 represent values obtained by differentiating the two electrical angles θ1 and θ2 with respect to time, respectively.

Next, when the trigonometric product-to-sum formula cos α cos β=(½){cos(α+β)+cos(α−β)} is applied to the aforementioned equations (32) to (34), it is possible to obtain the following equations (35) to (37):

$$\Psi u1 = \frac{\psi f}{2}\{\cos(2\theta 2 - \theta 1) + \cos(-\theta 1)\} \tag{35}$$

$$\Psi u2 = \frac{\psi f}{2}\left\{\cos(2\theta 2 - \theta 1) + \cos\left(-\theta 1 + \frac{2}{3}\pi\right)\right\} \tag{36}$$

$$\Psi u3 = \frac{\psi f}{2}\left\{\cos(2\theta 2 - \theta 1) + \cos\left(-\theta 1 - \frac{2}{3}\pi\right)\right\} \tag{37}$$

Here, a magnetic flux $\Psi u$ appearing in all the U phases of the electric motor 1 becomes equal to the sum of the three magnetic fluxes $\Psi u1$ to $\Psi u3$, and hence it is possible to obtain the following equation (38) as an equation for calculating the magnetic flux $\Psi u$.

$$\Psi u = \Psi u1 + \Psi u2 + \Psi u3 \tag{38}$$

$$= \frac{\psi f}{2}\left\{\begin{array}{l}3\cos(2\theta 2 - \theta 1) + \cos(-\theta 1) + \\ \cos\left(-\theta 1 + \frac{2}{3}\pi\right) + \cos\left(-\theta 1 - \frac{2}{3}\pi\right)\end{array}\right\}$$

$$= \frac{3}{2}\psi f \cdot \cos(2\theta 2 - \theta 1) + \left\{\begin{array}{l}\cos(-\theta 1) + \cos\left(-\theta 1 + \frac{2}{3}\pi\right) + \\ \cos\left(-\theta 1 - \frac{2}{3}\pi\right)\end{array}\right\}$$

$$= \frac{3}{2}\psi f \cdot \cos(2\theta 2 - \theta 1)$$

When equations for calculating magnetic fluxes $\Psi v$ and $\Psi w$ appearing in all the V phases and all the W phases of the electric motor 1 are derived by the same method as the above method of deriving the equation for calculating the magnetic flux $\Psi u$, it is possible to obtain the following equations (39) and (40):

$$\Psi v = \frac{3}{2}\psi f \cdot \cos\left(2\theta 2 - \theta 1 - \frac{2}{3}\pi\right) \tag{39}$$

$$\Psi w = \frac{3}{2}\psi f \cdot \cos\left(2\theta 2 - \theta 1 + \frac{2}{3}\pi\right) \tag{40}$$

Here, the magnetic fluxes of the first and second permanent magnets 4b and 5b that directly pass through the three U-phase coils 6c to 8c without via the three cores 11b to 13b are very small, and hence influence thereof is negligible. Similarly, the magnetic fluxes of the first and second permanent magnets 4b and 5b that directly pass through the V-phase coils 6c to 8c and W-phase coils 6c to 8c respectively without via the three cores 11b to 13b are also very small, and hence influence thereof is negligible. For the above reason, the U-phase, V-phase, and W-phase counter-electromotive force voltages correspond to values dΨu/dt, dΨv/dt, and dΨw/dt which are obtained by differentiating the magnetic fluxes Ψu, Ψv, and Ψw with respect to time, respectively, and hence equations for calculating the U-phase, V-phase, and W-phase counter-electromotive force voltages are derived by differentiating the above-mentioned equations (38) to (40) with respect to time, as the following equations (41) to (43).

$$\frac{d\Psi u}{dt} = -(2\omega 2 - \omega 1)\frac{3}{2}\psi f \cdot \sin(2\theta 2 - \theta 1) \tag{41}$$

$$\frac{d\Psi v}{dt} = -(2\omega 2 - \omega 1)\frac{3}{2}\psi f \cdot \sin\left(2\theta 2 - \theta 1 - \frac{2}{3}\pi\right) \tag{42}$$

$$\frac{d\Psi w}{dt} = -(2\omega 2 - \omega 1)\frac{3}{2}\psi f \cdot \sin\left(2\theta 2 - \theta 1 + \frac{2}{3}\pi\right) \tag{43}$$

Here, assuming that the total magnetic flux amount in the whole electric motor 1 is represented by Ψ, Ψ=3·φf holds, so that when this is applied to the equations (41) to (43), it is possible to obtain the following equations (44) to (46).

$$\frac{d\Psi u}{dt} = -(2\omega 2 - \omega 1)\frac{\Psi}{2} \cdot \sin(2\theta 2 - \theta 1) \tag{44}$$

$$\frac{d\Psi v}{dt} = -(2\omega 2 - \omega 1)\frac{\Psi}{2} \cdot \sin\left(2\theta 2 - \theta 1 - \frac{2}{3}\pi\right) \tag{45}$$

$$\frac{d\Psi w}{dt} = -(2\omega 2 - \omega 1)\frac{\Psi}{2} \cdot \sin\left(2\theta 2 - \theta 1 + \frac{2}{3}\pi\right) \tag{46}$$

When the above equations (44) to (46) for calculating the counter-electromotive force voltages dΨu/dt, dΨv/dt, and dΨw/dt are compared with the above-mentioned equations (28) to (30) for calculating the counter-electromotive force voltages Vcu, Vcv and Vcw of the electric motor 20, it is understood that they are the same equations.

Therefore, in the case of this electric motor 1 as well, by controlling an electrical angle θy of the vectors of the above-described first to third rotating magnetic fields such that θy= (2θ2−θ1) holds, it is possible to cause the electric motor 1 to operate similarly to the electric motor 20. More specifically, when one of the first rotor 3 and the second rotor 10 and the casing 2 are fixed, the other of the first rotor 3 and the second rotor 10 can be caused to rotate.

Further, since the electric motor 1 is provided with three electric motor structures, compared with the electric motor 20 provided with only two electric motor structures, it is possible to more finely set the phase difference in electrical angle between the magnetic poles generated at the armatures 6a and the magnetic poles of the permanent magnets 4b, and the phase difference in electrical angle between the magnetic poles generated at the armatures 6a and the first cores 11b of the second rotor 10. This makes it possible to further reduce torque ripple and cogging torque.

It should be noted that although in the first embodiment, the electric motor 1 as a magnetic machine is constructed as a rotating electric motor, by way of example, this is not limitative, but the electric motor 1 may be constructed as a linear motor or a like electric motor. For example, when the electric motor according to the present invention is constructed as a linear motor, it is only required to arrange two permanent magnets, three armatures, and three soft magnetic material cores in a planar fashion as in FIG. 2, referred to hereinabove, and control electric power supplied to the three armatures such that the three permanent magnets, the three soft magnetic material cores, and the magnetic poles of the rotating magnetic fields generated from the three armatures are in the positional relationship in FIG. 14, referred to hereinabove.

Further, although in the first embodiment, the electric motor 1 is constructed by arranging the first and second permanent magnets 4b and 5b, the first to third armatures 6a to 8a, and the first to third cores 11b to 13b side by side in the axial direction, as shown in FIG. 1, these may be radially arranged as in the electric motor 20 described hereinabove with reference to FIG. 3. In this case, it is only required to mount the first and second permanent magnets 4b and 5b on the outer peripheral surface of the FIG. 3 fixing portion 23c, mount the first to third armatures 6a to 8a on the inner peripheral surface of the FIG. 3 peripheral wall 26a, and mount the first to third cores 11b to 13b on the outer end of the disk-shaped flange 25e via the bar-shaped connecting portions.

Furthermore, although in the first embodiment, the first and second magnet rotor sections 4 and 5 are formed integrally with each other as the first rotor 3, by way of example, the two rotor sections 4 and 5 may be formed as separate members and be mechanically connected to each other such that they operate in an interlocked manner. Similarly, the first to third soft magnetic material rotor sections 11 to 13 may be formed as separate members and be connected to each other such that they operate in an interlocked manner.

Further, in the first rotor 3 of the electric motor 1 according to the first embodiment, the rows of the permanent magnets 4b and 5b of the first and second magnet rotor sections 4 and 5 may be replaced by armature rows, and electric power supplied to the armature rows may be controlled such that the magnetic poles generated at the armature rows become the same as the magnetic poles of the permanent magnets 4b and 5b.

On the other hand, the first embodiment is an example in which in the first to third electric motor structures, electric power supplied to the first to third armatures 6a to 8a is controlled during operation of the electric motor 1 such that the positional relationship between the magnetic poles of the two permanent magnets 4b and 5b (i.e. the second magnetic poles), the three cores 11b to 13b, and the magnetic poles generated at the three armatures 6a to 8a (i.e. the first magnetic poles) becomes the aforementioned positional relationship shown in FIG. 14 (or the positional relationship shown in FIG. 15 in the case where the second permanent magnets 5b are regarded as ones formed by the two permanent magnets 5b1 and 5b2). However, the positional relationship between the first magnetic poles, the second magnetic poles, and the soft magnetic material elements of the soft magnetic material member is not limited to this, but any suitable positional relationship may be employed insofar as electric power supplied to the three armatures is controlled during operation of the electric motor such that the first to third electric motor structures are each displaced in the phase difference in electrical angle between the first magnetic poles and the second magnetic poles by an electrical angle of 2π/3 in the direction of the arrangement of the armatures, and in the phase difference in electrical angle between the first magnetic poles and the soft magnetic material elements of the soft magnetic material member by an electrical angle of π/3 in the direction of the arrangement of the armatures.

For example, the above-described electric motor 1 may be constructed as an electric motor 1A shown in FIG. 19. In the electric motor 1A, the first to third cores 11b to 13b of the second rotor 10 are arranged such that they are at the same position in the left-right direction as viewed in the figure, and in the first to third electric motor structures, during operation of the electric motor 1A, electric power supplied to the first to third armatures 6a to 8a is controlled such that the respective phase differences in electrical angle between the magnetic poles generated at the respective three armatures 6a to 8a, i.e. the magnetic poles of the imaginary magnets 6x to 8x, and the magnetic poles of the respective three permanent magnets 4b, 5b1 and 5b2, are each displaced by an electrical angle of $2\pi/3$ in the direction of the arrangement of the armatures 6a to 8a, and the respective phase differences in electrical angle between the magnetic poles of the respective imaginary magnets 6x to 8x and the first to third cores 11b to 13b are each displaced by an electrical angle of $\pi/3$ in the direction of the arrangement of the armatures 6a to 8a. In the case of this arrangement as well, the relationship of $\theta y=(2\theta 2-\theta 1)$ holds between the three electrical angles $\theta y$, $\theta 1$, and $\theta 2$, whereby it is possible to obtain the same advantageous effects as provided by the electric motor 1 of the first embodiment.

Further, in the three electric motor structures illustrated in FIG. 15, the three permanent magnets 4b, 5b1 and 5b2, and the magnetic poles of the three armatures may be arranged in a manner exchanged in the left-right direction. In addition to this, the three permanent magnets 4b, 5b1 and 5b2 may be disposed in a skewed arrangement along the direction of rotation of the electric motor 1 instead of being disposed in the same position in the left-right direction as viewed in FIG. 15. In these cases as well, in the three electric motor structures, by controlling electric power supplied to the first to third armatures 6a to 8a such that the above-mentioned relationships of the electrical angular displacement are satisfied, it is possible to obtain the same advantageous effects as provided by the electric motor 1 provided with the three electric motor structures shown in FIG. 15, that is, the three electric motor structures shown in FIG. 14.

Further, although in the first embodiment, the first to third electric motor structures are arranged as shown in FIG. 15, by way of example, the first to third electric motor structures may be arranged in a different fashion. For example, the casing 2 is divided into three casing members, and the three casing members are provided with the first to third stators 6 to 8, respectively. The first rotor 3 is divided into three first rotor members, and the three first rotor members are provided with the three permanent magnets 4b, 5b1 and 5b2, respectively. The second rotor 10 is divided into three second rotor members, and the three second rotor members are provided with the three soft magnetic material cores 11b to 13b, respectively. Then, when the three casing members are connected to each other, the three first rotor members are connected to each other, and the three second rotor members are connected to each other, it is possible to arrange the first to third electric motor structures in the order of the second electric motor structure $\Rightarrow$ the third electric motor structure $\Rightarrow$ the first electric motor structure, or in the order of the first electric motor structure $\Rightarrow$ the third electric motor structure $\Rightarrow$ the second electric motor structure, while ensuring the same operating state as that of the electric motor according to the first embodiment. This makes it possible to arrange them freely.

Furthermore, although in the first embodiment, a single magnetic pole of the first rotor 3 is formed by the magnetic pole of a single permanent magnet, by way of example, a single magnetic pole may be formed by magnetic poles of a plurality of permanent magnets. For example, when a single magnetic pole is formed by disposing magnetic poles of two permanent magnets in a V shaped arrangement, it is possible to improve the directivity of a magnetic force line.

Further, although in the first embodiment, the coils of the armatures 6a to 8a of the first to third stators 6 to 8 are wound by concentrated winding, by way of example, the coils of the above armatures may be wound by another winding method, such as distributed winding.

On the other hand, although in the first embodiment, the electric motor of the present invention is constructed to include three electric motor structures, by way of example, the electric motor of the present invention is not limited to this, but it may be constructed to include four or more electric motor structures. Hereinafter, a description will be given of equations for calculating counter-electromotive force voltages in an electric motor (not shown) including m (m is an integer not smaller than 3) electric motor structures.

According to this electric motor, during operation thereof, in the m electric motor structures, the respective phase differences in electrical angle between magnetic poles generated at armatures and the magnetic poles of respective permanent magnets are set such that they are each displaced by an electrical angle of $2\pi/m$ in the direction of the arrangement of the armatures, and electric power supplied to the armatures is controlled such that the respective phase differences in electrical angle between the magnetic poles generated at the armatures and soft magnetic material cores are each displaced by an electrical angle of $\pi/m$ in the direction of the arrangement of the armatures. Further, it is assumed that m permanent magnet rows are provided on a single first rotor (not shown), and m soft magnetic material core rows on a single second rotor (not shown). Furthermore, in the following description, electrical angles corresponding to the rotational angles of the first and second rotors with respect to a reference position are represented by first and second rotor electrical angles $\theta 1$ and $\theta 2$, for convenience' sake.

In the case of the electric motor, an equation for calculating a magnetic flux $\Psi u\gamma$ appearing in the U phase of a $\gamma$th ($1 \leq \gamma \leq m$) electric motor structure of the m electric motor structures is expressed by the following equation (47):

$$\Psi u\gamma = \psi f \cdot \cos\left\{\left(\theta 2 - \frac{\gamma-1}{m}\pi\right) - \left(\theta 1 - \frac{2\gamma-2}{m}\pi\right)\right\}\cos\left(\theta 2 - \frac{\gamma-1}{m}\pi\right) \quad (47)$$
$$= \psi f \cdot \cos\left(\theta 2 - \theta 1 + \frac{\gamma-1}{m}\pi\right)\cos\left(\theta 2 - \frac{\gamma-1}{m}\pi\right)$$

Here, $\phi f$ represents a maximum value of the magnetic flux of a permanent magnet passing through a U-phase coil via a soft magnetic material core.

When $\gamma$ of the above equation (47) is replaced by 1 to m in respective cases, it is possible to obtain the following equations (48) to (50):

$$\Psi u1 = \psi f \cdot \cos(\theta 2 - \theta 1)\cos(\theta 2) \quad (48)$$

$$\Psi u2 = \psi f \cdot \cos\left(\theta 2 - \theta 1 + \frac{1}{m}\pi\right)\cos\left(\theta 2 - \frac{1}{m}\pi\right) \quad (49)$$

$$\vdots$$

$$\Psi um = \psi f \cdot \cos\left(\theta 2 - \theta 1 + \frac{m-1}{m}\pi\right)\cos\left(\theta 2 - \frac{m-1}{m}\pi\right) \quad (50)$$

Next, when the trigonometric product-to-sum formula $\cos \alpha \cos \beta = (\frac{1}{2})\{\cos(\alpha+\beta)+\cos(\alpha-\beta)\}$ is applied to the above equations (48) to (50), it is possible to obtain the following equations (51) to (53):

$$\Psi u1 = \frac{\psi f}{2}\{\cos(2\theta2 - \theta1) + \cos(-\theta1)\} \quad (51)$$

$$\Psi u2 = \frac{\psi f}{2}\left\{\cos(2\theta2 - \theta1) + \cos\left(-\theta1 + \frac{2}{m}\pi\right)\right\} \quad (52)$$

$$\vdots$$

$$\Psi um = \frac{\psi f}{2}\left\{\cos(2\theta2 - \theta1) + \cos\left(-\theta1 + \frac{2m-2}{m}\pi\right)\right\} \quad (53)$$

A magnetic flux $\Psi u$ appearing in all the U phases of the electric motor becomes equal to the sum of the m magnetic fluxes $\Psi u1$ to $\Psi um$, and hence it is possible to obtain the following equation (54):

$$\Psi u = \Psi u1 + \Psi u2 + \ldots + \Psi um \quad (54)$$

$$= \frac{\psi f}{2}m\cdot\cos(2\theta2 - \theta1) + \frac{\psi f}{2}\left\{\begin{array}{l}\cos(-\theta1) + \\ \cos\left(-\theta1 + \frac{2m-2}{m}\pi\right)\end{array}\right\}$$

Here, when attention is paid to a computing equation within curly braces { } in the second term on the right side of the above equation (54), the computing equation can be rewritten as the following equation (55):

$$\cos(-\theta1) + \cos\left(-\theta1 + \frac{2}{m}\pi\right) + \ldots + \cos\left(-\theta1 + \frac{2m-2}{m}\pi\right) = \quad (55)$$

$$\cos\theta1 + \cos\left(\theta1 - \frac{2}{m}\pi\right) + \ldots + \cos\left(\theta1 - \frac{2m-2}{m}\pi\right) =$$

$$\cos\theta1 + \cos\theta1\cdot\cos\frac{2}{m}\pi + \sin\theta1\cdot\sin\frac{2}{m}\pi + \ldots +$$

$$\cos\theta1\cdot\cos\frac{2m-2}{m}\pi + \sin\theta1\cdot\sin\frac{2m-2}{m}\pi =$$

$$\cos\theta1\left(1 + \cos\frac{2}{m}\pi + \cos\frac{4}{m}\pi + \ldots + \cos\frac{2m-2}{m}\pi\right) +$$

$$\sin\theta1\left(\sin\frac{2}{m}\pi + \sin\frac{4}{m}\pi + \ldots + \sin\frac{2m-2}{m}\pi\right) =$$

$$\cos\theta1\sum_{i=1}^{m}\cos\frac{2i}{m}\pi + \sin\theta1\sum_{i=1}^{m}\sin\frac{2i}{m}\pi$$

Next, when the first term on the right side of the above equation (55) is changed using the series summation formula and the Euler's formula, it is possible to derive the following equation (56):

$$\sum_{i=1}^{m}\cos\frac{2i}{m}\pi = \sum_{i=1}^{m}\frac{1}{2}\left(e^{j\frac{2\pi}{m}i} + e^{-j\frac{2\pi}{m}i}\right) \quad (56)$$

$$= \frac{1}{2}\left(\frac{e^{j\frac{2\pi}{m}m} - 1}{e^{j\frac{2\pi}{m}} - 1} + \frac{e^{-j\frac{2\pi}{m}m} - 1}{e^{-j\frac{2\pi}{m}} - 1}\right)$$

$$= \frac{1}{2}\left(\frac{e^{j2\pi} - 1}{e^{j\frac{2\pi}{m}} - 1} + \frac{e^{-j2\pi} - 1}{e^{-j\frac{2\pi}{m}} - 1}\right)$$

$$= \frac{1}{2}\left(\frac{0}{e^{j\frac{2\pi}{m}} - 1} + \frac{0}{e^{-j\frac{2\pi}{m}} - 1}\right)$$

$$= 0$$

Further, when the second term on the right side of the above equation (55) is changed using the series summation formula and the Euler's formula, it is possible to obtain the following equation (57):

$$\sum_{i=1}^{m}\sin\frac{2i}{m}\pi = \sum_{i=1}^{m}\frac{1}{2}\left(e^{j\frac{2\pi}{m}i} - e^{-j\frac{2\pi}{m}i}\right) \quad (57)$$

$$= \frac{1}{2}\left(\frac{e^{j\frac{2\pi}{m}m} - 1}{e^{j\frac{2\pi}{m}} - 1} - \frac{e^{-j\frac{2\pi}{m}m} - 1}{e^{-j\frac{2\pi}{m}} - 1}\right)$$

$$= \frac{1}{2}\left(\frac{e^{j2\pi} - 1}{e^{j\frac{2\pi}{m}} - 1} - \frac{e^{-j2\pi} - 1}{e^{-j\frac{2\pi}{m}} - 1}\right)$$

$$= \frac{1}{2}\left(\frac{0}{e^{j\frac{2\pi}{m}} - 1} + \frac{0}{e^{-j\frac{2\pi}{m}} - 1}\right)$$

$$= 0$$

From the above equations (56) and (57), it is possible to obtain the following equation (58):

$$\cos(-\theta1) + \cos\left(-\theta1 + \frac{2}{m}\pi\right) + \ldots + \cos\left(-\theta1 + \frac{2m-2}{m}\pi\right) = 0 \quad (58)$$

Therefore, when the above equation (58) is applied to the aforementioned equation (54), it is possible to finally derive the following equation (59):

$$\Psi u = \frac{m}{2}\psi f\cdot\cos(2\theta2 - \theta1) \quad (59)$$

Further, when equations for calculating magnetic fluxes $\Psi v$ and $\Psi w$ appearing in all the V and W phases of the electric motor are derived by the same method as described above, it is possible to obtain the following equations (60) and (61):

$$\Psi v = \frac{m}{2}\psi f\cdot\cos\left(2\theta2 - \theta1 - \frac{2}{3}\pi\right) \quad (60)$$

$$\Psi w = \frac{m}{2}\psi f\cdot\cos\left(2\theta2 - \theta1 + \frac{2}{3}\pi\right) \quad (61)$$

Then, when the left sides and the right sides of the above equations (59) to (61) are differentiated with respect to time, it is possible to obtain, as the equations for calculating the counter-electromotive force voltages, the following equations (62) to (64):

$$\frac{d\Psi u}{dt} = -(2\omega2 - \omega1)\frac{m}{2}\psi f\cdot\sin(2\theta2 - \theta1) \quad (62)$$

$$\frac{d\Psi v}{dt} = -(2\omega2 - \omega1)\frac{m}{2}\psi f\cdot\sin\left(2\theta2 - \theta1 - \frac{2}{3}\pi\right) \quad (63)$$

$$\frac{d\Psi w}{dt} = -(2\omega2 - \omega1)\frac{m}{2}\psi f\cdot\sin\left(2\theta2 - \theta1 + \frac{2}{3}\pi\right) \quad (64)$$

Here, assuming that the total magnetic flux amount in the whole electric motor including the m electric motor structures is represented by $\Psi$, $\Psi f = \Psi/m$ holds, and hence when this is applied to the aforementioned equations (62) to (64), it is possible to obtain the following equations (65) to (67):

$$\frac{d\Psi u}{dt} = -(2\omega 2 - \omega 1)\frac{\Psi}{2} \cdot \sin(2\theta 2 - \theta 1) \quad (65)$$

$$\frac{d\Psi v}{dt} = -(2\omega 2 - \omega 1)\frac{\Psi}{2} \cdot \sin\left(2\theta 2 - \theta 1 - \frac{2}{3}\pi\right) \quad (66)$$

$$\frac{d\Psi w}{dt} = -(2\omega 2 - \omega 1)\frac{\Psi}{2} \cdot \sin\left(2\theta 2 - \theta 1 + \frac{2}{3}\pi\right) \quad (67)$$

These equations (65) to (67) are the same as the equations (44) to (46) for calculating the counter-electromotive force voltages in the above-described electric motor 1 (that is, they are also the same as the equations (28) to (30) for calculating the counter-electromotive force voltages in the aforementioned electric motor 20). Therefore, also in the electric motor including the m electric motor structures, by controlling an electrical angle θz of the vectors of the m rotating magnetic fields such that θz=(2θ2−θ1) holds, it is possible to cause the electric motor to operate similarly to the electric motor 1, thereby making it possible to obtain the same advantageous effects as provided by the electric motor 1. Particularly, in this case, as the value of m is larger, it is possible to further reduce torque ripple and cogging torque.

It should be noted that the above-described electric motor including the m electric motor structures may be constructed such that the m permanent magnet rows and the m soft magnetic material core rows are arranged on m first rotors and m second rotors, respectively, the m first rotors are mechanically connected to each other such that they operate in an interlocked manner, and the m second rotors are mechanically connected to each other such that they operate in an interlocked manner.

On the other hand, although in the first embodiment, the ECU 15 is used as control means for controlling the electric motor 1, by way of example, the ECU 15 may be replaced e.g. by an electric circuit other than the ECU.

Figure 20:
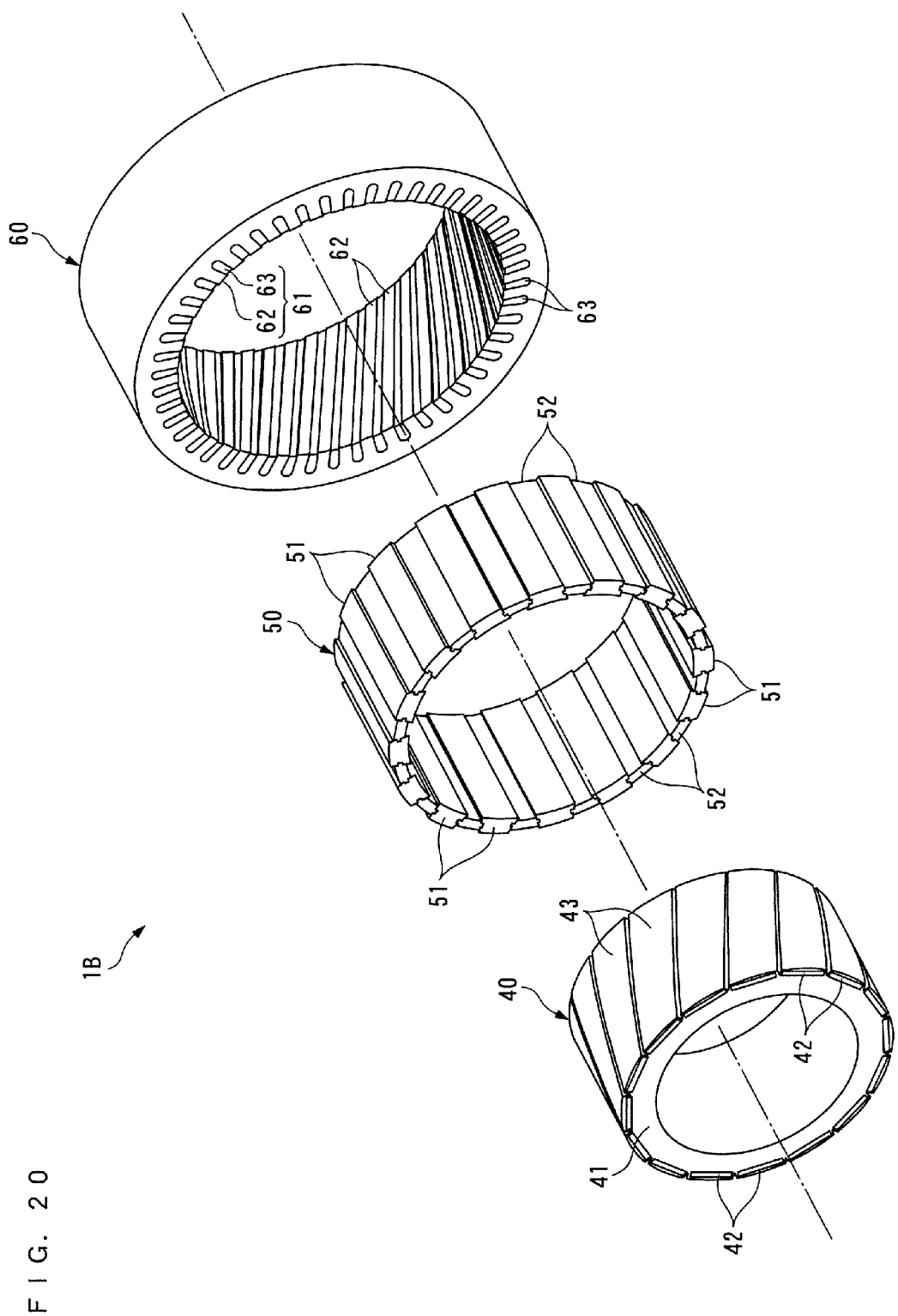
Figure 21:
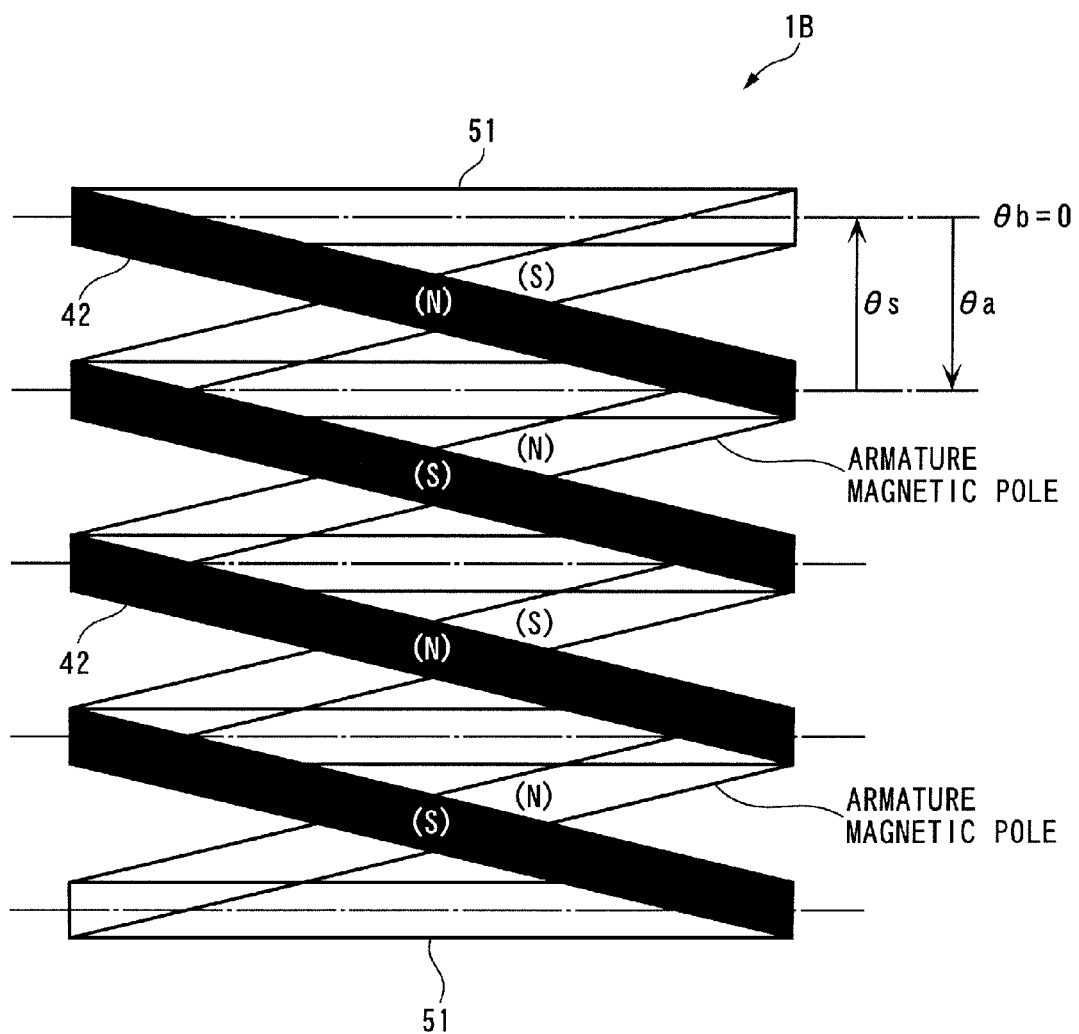

Next, an electric motor 1B as a magnetic machine according to a second embodiment of the present invention will be described with reference to FIGS. 20 and 21. FIG. 20 is a partially-cutaway exploded perspective view of the electric motor 1B, and FIG. 21 is a schematic planar view of the arrangement of an electric motor structure of the electric motor 1B, as viewed through from the diametrical outside of the electric motor 1B toward the center thereof. It should be noted that in the following description of FIG. 21, a downward electrical angle, as viewed in the figure, is represented by a positive value, and an upward electrical angle, as viewed in the figure, is represented by a negative value, for convenience's sake.

This electric motor 1B is a rotating electric motor, and includes a first rotor 40, a second rotor 50, and a stator 60 from the radially inner side in the mentioned order. The first rotor 40, the second rotor 50, and the stator 60, all of which have a hollow cylindrical shape, are arranged concentrically with each other, and are accommodated in a casing, not shown. It should be noted that in the present embodiment, the first rotor 40 corresponds to the second magnetic pole member, the second rotor 50 to the soft magnetic material member, and the stator 60 to the first magnetic pole member.

The first rotor 40 comprises a base 41, and 2f (f is a natural number) permanent magnets 42 fixed to the outer peripheral surface of the base 41. The base 41 is formed by a laminate of steel plates, and is supported by a bearing, not shown, in a manner rotatable about the axis of rotation of the electric motor 1B.

Further, the 2f permanent magnets 42 are disposed at equally spaced intervals in the circumferential direction of the outer peripheral surface of the base 41, and are in such a skewed arrangement that opposite ends of each permanent magnet 42 are in a positional relationship in which they are displaced from each other in the direction of rotation of the permanent magnet 42 (see FIG. 21). Furthermore, each permanent magnet 42 is covered with a steel plate 43. It should be noted that in the present embodiment, the magnetic poles of the permanent magnets 42 correspond to the second magnetic poles.

On the other hand, the second rotor 50 is formed such that it has an inner peripheral surface spaced from the outer peripheral surface of the first rotor 40 to form a predetermined gap therebetween, and is supported by a bearing, not shown, in a manner rotatable about the axis of rotation of the electric motor 1B. The second rotor 50 is formed by integrally fixing soft magnetic material cores 51, the number of which is equal to the number of the permanent magnets (i.e. 2f), with holding members 52 made of nonmagnetic material elements (such as stainless steel or synthetic resin). The soft magnetic material cores 51 (soft magnetic material elements) extend in the axial direction by a predetermined length, and are arranged at equally spaced intervals in parallel with each other in the circumferential direction of the second rotor 50.

Further, the stator 60 generates a rotating magnetic field in accordance with the supply of electric power thereto, and has 3f armatures 61. The armatures 61 comprise 3f iron cores 62 protruding inward from a hollow cylindrical root portion, and coils 63 wound around the iron cores 62. The coils 63 form f sets of three-phase coils. Further, the 3f iron cores 62 are arranged at equally spaced intervals in the circumferential direction of the inner peripheral surface of the stator 60, and are in such a skewed-arrangement that opposite ends of each iron core 62 are in a positional relationship displaced from each other in a direction opposite to the displacement between the opposite ends of the permanent magnet 42.

Furthermore, the armatures 61 are connected to a variable power supply, not shown, and are configured such that when electric power is supplied from the variable power supply, magnetic poles equal in number to the number of the magnetic poles of the permanent magnets 42 (i.e. 2f) are generated at the foremost ends of the iron cores 62. Hereafter, the magnetic poles generated at the foremost ends of the iron cores 62 are referred to as "the armature magnetic poles". Along with generation of the armature magnetic poles, the rotating magnetic field is generated such that it rotates along the stator 60, and magnetic circuits (not shown) are formed between the armature magnetic poles, the soft magnetic material cores 51, and the permanent magnets 42. It should be noted that in the present embodiment, the armature magnetic poles correspond to the first magnetic poles.

In the electric motor 1B constructed as above, assuming that an electrical angle between the opposite ends of each armature magnetic pole (i.e. an electrical angle between the opposite ends of each iron core 62) is represented by θs, an electrical angle between the opposite ends of each permanent magnet 42 is represented by θa, and an electrical angle between the opposite ends of each soft magnetic material core 51 is represented by θb, θs=2θb−θa holds. Further, in the electric motor 1B, during operation thereof, electric power supplied from the variable power supply to the stator 60 is controlled by an ECU (not shown) such that the armature magnetic poles are generated in the state shown in FIG. 21. Specifically, electric power supplied to the stator 60 is controlled such that one of the two electrical angles θs and θa becomes larger than the electrical angle θb by an electrical angle of π, and the other of the two electrical angles θs and θa becomes smaller than the electrical angle θb by an electrical angle of π. That is, in the electric motor 1B, since θb=0, and θa=π hold, electric power supplied to the stator 60 is controlled such that θs=−π holds.

Further, in the FIG. 19 electric motor 1A, described above, the first to third cores 11b to 13b in the three electric motor structures are arranged such that they are aligned on the same straight line extending in the left-right direction and the respective phase differences in electrical angle between the magnetic poles of the respective three permanent magnets 4b, 5b1 and 5b2 and the first to third cores 11b to 13b increase from one to another by an electrical angle of π/3, whereby in the electric motor structure at the right end, as viewed in the figure, the phase difference in electrical angle between the magnetic pole of the permanent magnet 5b2 and the core 13b is equal to 2π/3. Therefore, when considering the above-described electric motor including the m electric motor structures, a maximum value of the respective phase differences in electrical angle between the magnetic poles of the respective permanent magnets and the soft magnetic material cores (hereinafter referred to as "the maximum phase difference") is equal to $(m-1)\pi/m$. This maximum phase difference $(m-1)\pi/m$ becomes closer to π as m is larger, and hence assuming that m→∞, it is possible to approximate the maximum phase difference $(m-1)\pi/m=\pi$.

Figure 22:
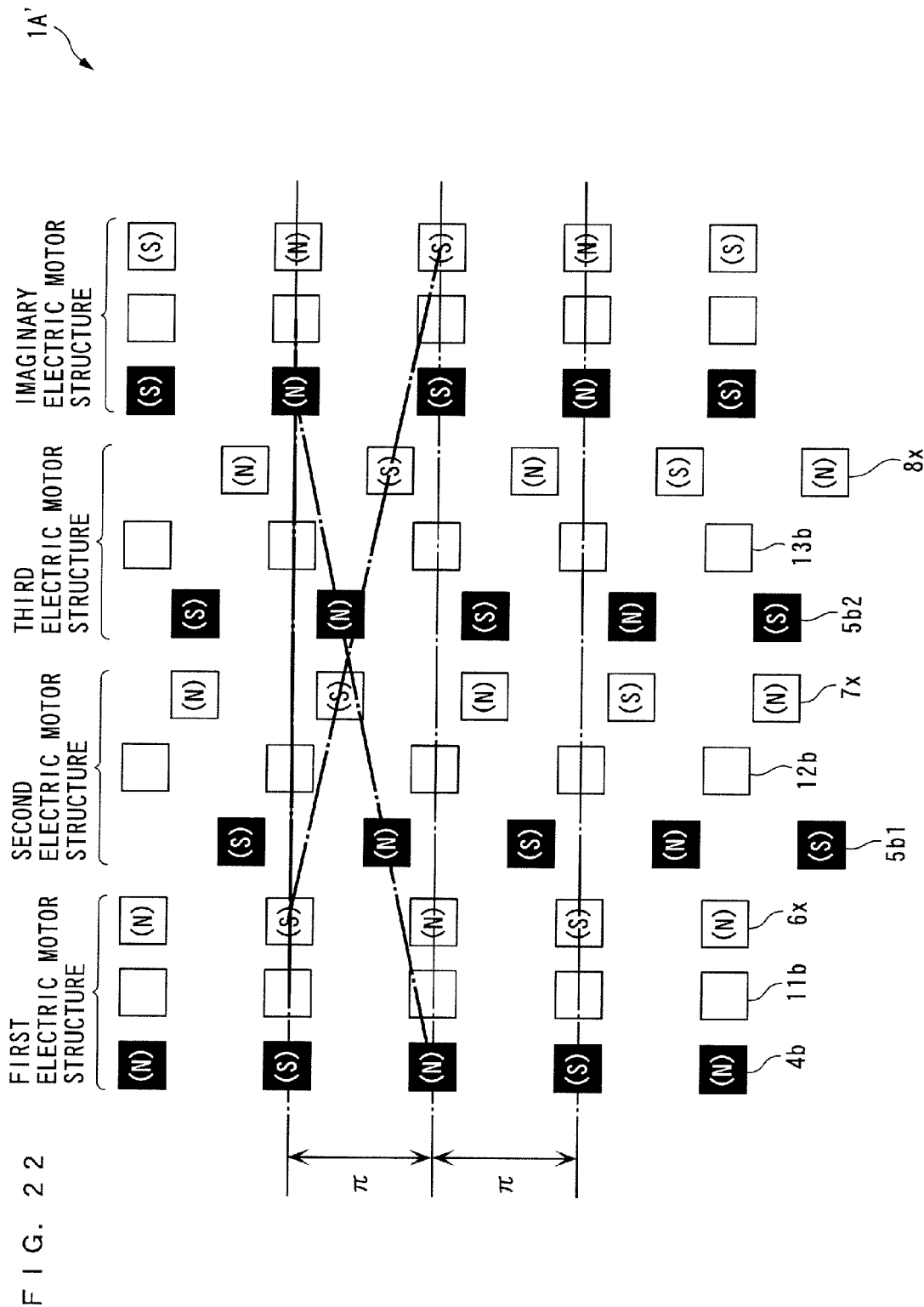

Assuming that the electric motor structures in which the maximum phase difference=π holds are imaginary electric motor structures, e.g. when one of the imaginary electric motor structures is added to the FIG. 19 electric motor 1A, an electric motor 1A' shown in FIG. 22 is obtained. In this electric motor 1A', when a line segment connecting between the centers of the four permanent magnets, a line segment connecting between the centers of the four soft magnetic material cores, and a line segment connecting between the centers of the four armature magnetic poles are formed, the positional relationship between the three line segments obtained when aligned in the left-right direction becomes equal to the positional relationship between the permanent magnets 42, the soft magnetic material cores 51 and the armature magnetic poles in FIG. 21.

More specifically, the arrangement of the permanent magnets 42, the soft magnetic material cores 51 and the armature magnetic poles of the electric motor 1B, shown in FIG. 21, is equivalent to the arrangement of the electric motor including the m electric motor structures, in which m→∞ is assumed, so that it is understood that the electric motor 1B as well operates similarly to the electric motor including the m electric motor structures. Further, as described heretofore, the three electrical angles θs, θa, and θb are set such that θs=2θb−θa holds, and if the permanent magnets 42, the soft magnetic material cores 51 and the armature magnetic poles are arranged such that the relationship of θs=2θb−θa is satisfied, it is possible to ensure the same operating state as that of the electric motor including the m electric motor structures. In addition, since the electric motor 1B corresponds to the above-mentioned electric motor including the m electric motor structures, in which m→∞ is assumed, it is possible to further reduce torque ripple and cogging torque compared with the electric motors 1 and 1A. Furthermore, it is possible to prevent occurrence of a magnetic short circuit between the electric motor structures in the axial direction, which makes it possible to reduce the size of the electric motor 1B in the axial direction.

It should be noted that although the electric motor 1B of the second embodiment is an example in which the arrangement of the electric motor structures is set as shown in FIG. 21, the arrangement of the electric motor structures in the electric motor as the magnetic machine of the present invention is not limited to this, but any suitable arrangement may be employed insofar it satisfies the above-mentioned relationship of θs=(2θ−θa). For example, the arrangement of electric motor structures as in an electric motor 1C illustrated in FIG. 23 and that of an electric motor 1D illustrated in FIG. 24 may be employed. In these cases as well, it is only required to control electric power supplied to the stator such that one of the two electrical angles θs and θa becomes larger than the electrical angle θb by an electrical angle of π, and the other of the two electrical angles θs and θa becomes smaller than the electrical angle θb by an electrical angle of π. It should be noted that in FIGS. 23 and 24, component elements of the electric motors, identical to those of the electric motor 1B, are denoted by identical reference numerals, for convenience's sake.

Figure 23:
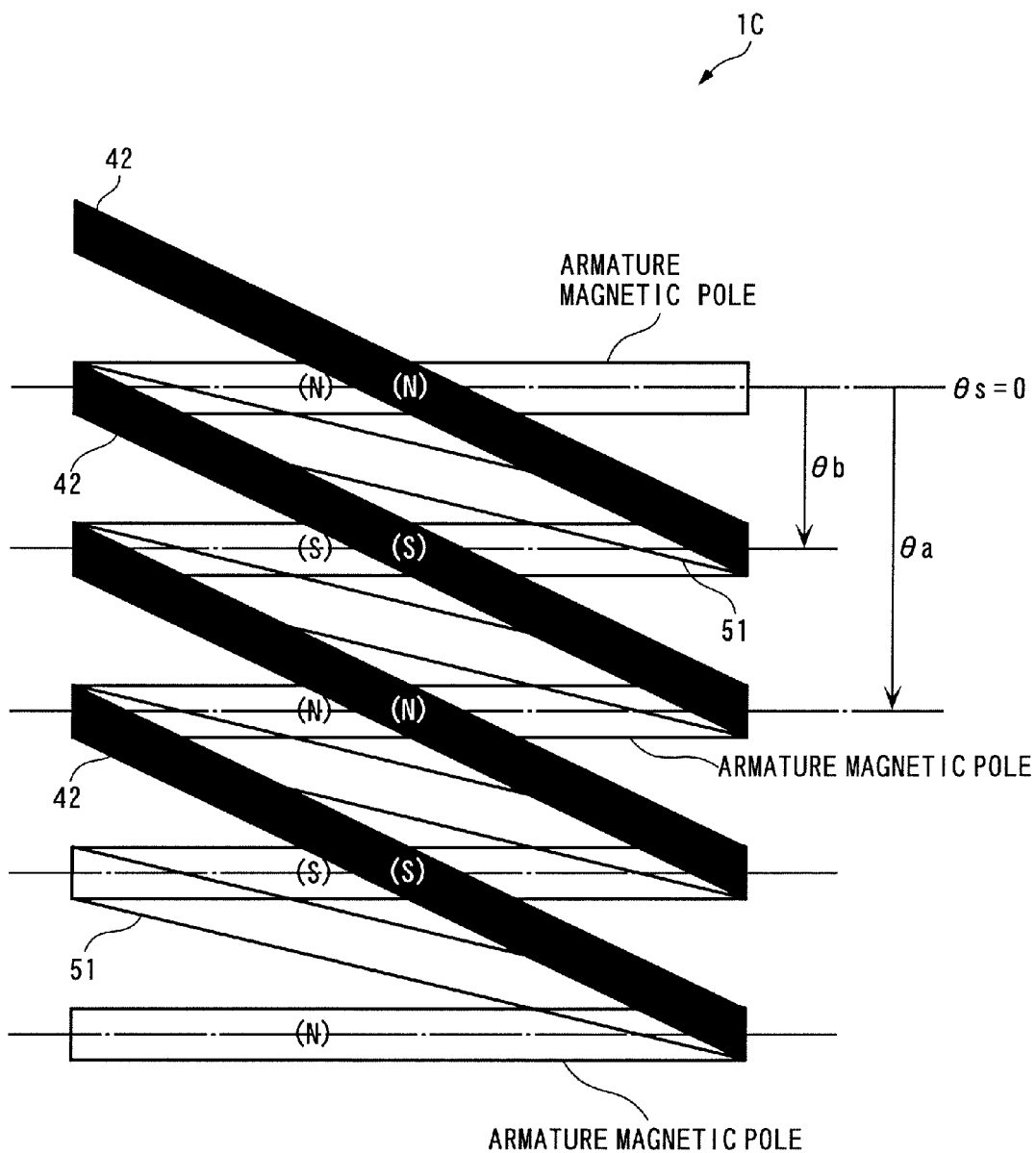

In the case of the electric motor 1C shown in FIG. 23, the 3f armatures of the stator 60 are arranged such that they extend in parallel with each other in the axial direction, and hence it is possible to enhance the space factor of coils and facilitate work for winding coils around iron cores compared with the electric motor 1B. However, the degree of torsion of the permanent magnets becomes larger than in the electric motor 1B, which makes it difficult to manufacture the electric motor 1C, so that the manufacturing costs are increased accordingly.

Figure 24:
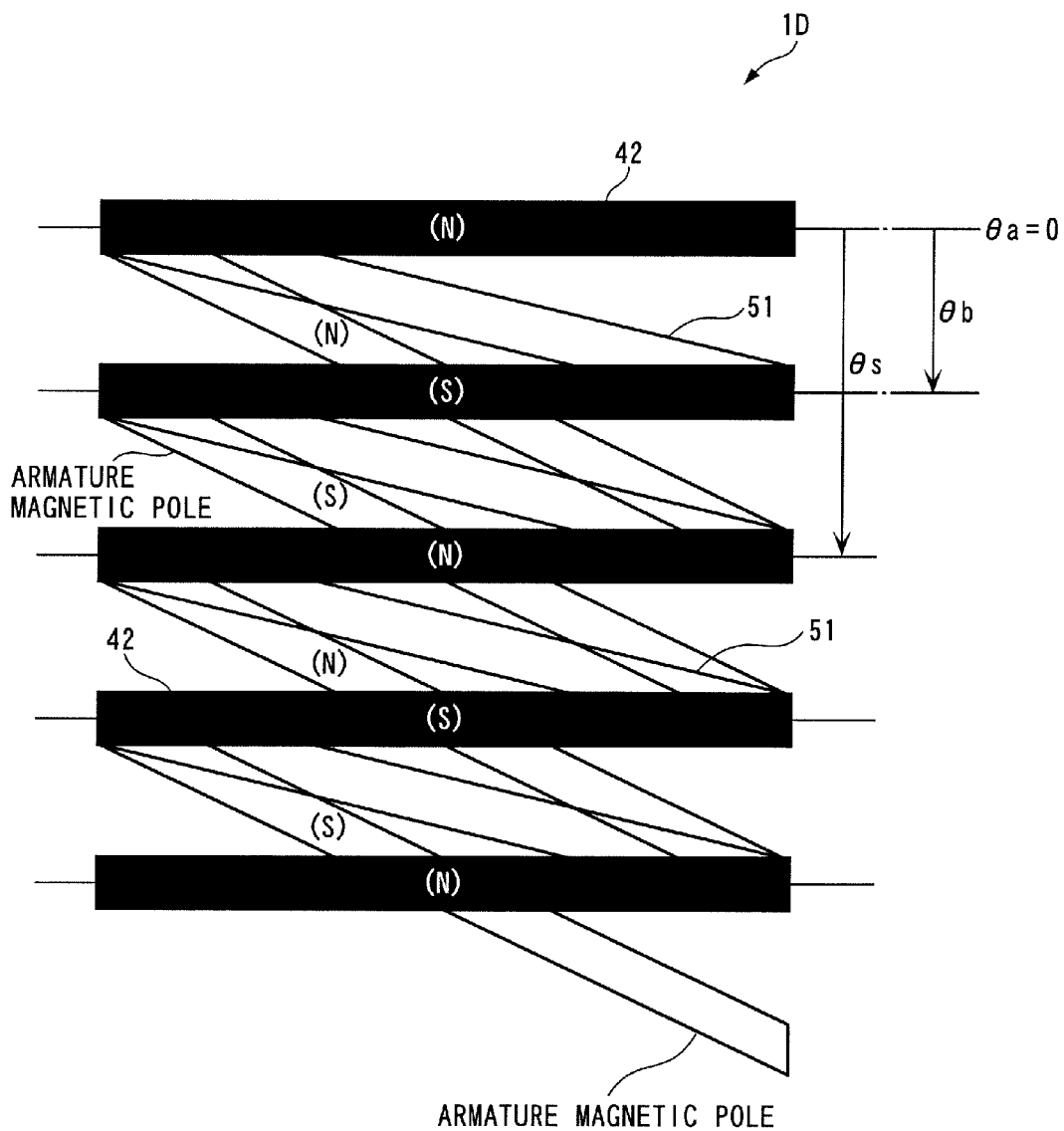

On the other hand, in the case of the electric motor 1D shown in FIG. 24, the 2f permanent magnets of the first rotor 40 are arranged such that they extend in parallel with each other in the axial direction, and hence it is easier to manufacture the first rotor 40 than in the case of the electric motor 1B, so that the manufacturing costs of the electric motor 1D can be reduced. However, the degree of torsion of the iron cores becomes larger than in the case of the electric motor 1B, which makes it difficult to manufacture the electric motor 1D, so that the manufacturing costs are increased accordingly.

Further, although in the above electric motor structures shown in FIGS. 21, 23, and 24, the permanent magnets, the armatures or the soft magnetic material cores are arranged in a manner extending in the axial direction, by way of example, the arrangement of the permanent magnets, the armatures and the soft magnetic material cores is not limited to this, but any suitable arrangement may be employed insofar it satisfies the above-mentioned relationship of θs=(2θb−θa). For example, all of the permanent magnets, the armatures and the soft magnetic material cores may be in a skewed arrangement. Alternatively, the armatures may be arranged in a manner extending in the axial direction, and be configured such that the magnetic poles generated are generated thereat obliquely (i.e. in a skewed state) with respect to the direction of rotation of the electric motor.

Furthermore, in the electric motor 1B according to the second embodiment, the first rotor 40, the second rotor 50, and the stator 60 are disposed from the radially inner side in the mentioned order, by way of example, but instead of this, the first rotor 40, the second rotor 50, and the stator 60 may be disposed from the radially outer side in the mentioned order.

On the other hand, although the second embodiment is an example in which the electric motor 1B is constructed as a rotating electric motor, the electric motor as the magnetic machine of the present invention is not limited to this, but it may be constructed as an electric motor, such as a linear motor. For example, when the electric motor of the present invention is constructed as a linear motor, it is only required to arrange the permanent magnets, the armatures, and the soft magnetic material cores in a planar fashion as in FIGS. 21, 23, and 24, referred to heretofore, and control electric power supplied to the armatures such that θs=2θb−θa holds.

Further, although in the above-described first and second embodiments, the magnetic machine of the present invention is constructed as an electric motor, by way of example, the magnetic machine of the present invention may be constructed as a magnetic power transmission system that transmits a driving force via magnetism. For example, the magnetic power transmission system may be constructed by replacing the respective rows of the three armatures 6a to 8a of the electric motor 1 according to the first embodiment with rows of permanent magnets, and arranging the magnetic poles of the permanent magnets such that they are in the same positional relationship as that between the magnetic poles generated at the three armatures 6a to 8a during generation of moving magnetic fields. That is, the magnetic power transmission system may be constructed by replacing the imaginary magnets 6x to 8x shown in FIG. 14 or 15 by permanent magnets. When the magnetic power transmission system is thus constructed, the permanent magnets are arranged within a casing, and the rotation of the casing corresponds to the motion of the moving magnetic fields generated from the three armatures 6a to 8a, and hence it is possible to execute the same operation as that of the above-described electric motor 1, using the magnetic power transmission system. That is, the same operation as illustrated in the above-described FIG. 11 speed diagrams can be executed. Furthermore, the magnetic power transmission system includes three magnetic machine structures each of which is formed by a set of two permanent magnet rows and a soft magnetic material row, and hence compared with the magnetic power transmission system disclosed in Patent Literature 3, which includes only two magnetic machine structures, it is possible to reduce cogging torque and the like.

Furthermore, also in the above-described electric motor including the m electric motor structures, the magnetic power transmission system may be constructed by replacing the armatures with permanent magnets. That is, the magnetic power transmission system may be constructed such that it includes m magnetic machine structures. Also when the magnetic power transmission system is thus constructed, it is possible to execute the same operation as that of the above-described magnetic power transmission system, and reduce cogging torque and the like compared with the magnetic power transmission system disclosed in Patent Literature 3. Particularly, as the number of magnetic machine structures is larger, it is possible to further reduce cogging torque and the like.

Furthermore, for example, the magnetic power transmission system may be constructed by replacing the row of the armatures 61 of the electric motor 1B of the second embodiment by the row of permanent magnets, and arranging the magnetic poles of the permanent magnets such that they are in the same positional relationship as that between the magnetic poles generated at the armatures 60 during generation of moving magnetic fields. Also when the magnetic power transmission system is thus constructed, it is possible to execute the same operation as that of the above-mentioned magnetic power transmission system, and compared with the magnetic power transmission system disclosed in Patent Literature 3 and the above-mentioned magnetic power transmission system, it is possible to further reduce cogging torque and the like.

Further, the magnetic power transmission system may be constructed not as a torque transmission type but as a thrust transmission type. In this case, it is only required to replace, for example, the imaginary magnets 6x to 8x appearing in FIG. 14 (or FIG. 15) with permanent magnets, and arrange the permanent magnets, the permanent magnets 4b and 5b (or the permanent magnets 4b, 5b1 and 5b2), and the cores 11b to 13b, such that they are in such a planar positional relationship as shown in FIG. 14 (or FIG. 15). Alternatively, it is only required to replace the armature magnetic poles appearing in FIG. 21, 23, or 24 with the magnet poles of permanent magnets, and arrange the magnet poles of permanent magnets, the permanent magnets 42, and the soft magnetic material cores 51 such that they are in such a planar positional relationship as shown in FIG. 21, 23, or 24.

INDUSTRIAL APPLICABILITY

The present invention is effective in reducing the ripple and cogging of torque or thrust in magnetic machines, such as magnetic power transmission systems and electric motors.

The invention claimed is:

1. A magnetic machine comprising:
    a first magnetic pole member having a first magnetic pole row formed of a plurality of first magnetic poles arranged side by side in a predetermined direction, said first magnetic pole row being arranged such that each adjacent two of said first magnetic poles are different in polarity from each other;
    a second magnetic pole member having a second magnetic pole row formed of a plurality of second magnetic poles arranged side by side in the predetermined direction, said second magnetic pole row being arranged such that each adjacent two of said second magnetic poles are different in polarity from each other and said second magnetic pole row is opposed to said first magnetic pole row; and
    a soft magnetic material member having a soft magnetic material row formed of a plurality of soft magnetic material elements arranged side by side in a manner spaced from each other in the predetermined direction, said soft magnetic material row being arranged between said first magnetic pole row and said second magnetic pole row,
    wherein during operation of the magnetic machine, magnetic circuits are formed between at least two of said first magnetic pole row, said second magnetic pole row, and said soft magnetic material row,
    the magnetic machine further comprising m (m is an integer not smaller than 3) magnetic machine structures, each of said magnetic machine structures being formed by a set of said first magnetic pole row, said second magnetic pole row, and said soft magnetic material row,
    wherein each adjacent two of said magnetic machine structures are configured to be different from each other in a phase difference in electrical angle between said first magnetic poles of said first magnetic pole row and said second magnetic poles of said second magnetic pole row in the predetermined direction, and are configured to be different from each other in a phase difference in electrical angle between said first magnetic poles of said first magnetic pole row and said soft magnetic material elements of said soft magnetic material row in the predetermined direction, and
    wherein in said m magnetic machine structures, said first magnetic pole row, said second magnetic pole row, and said soft magnetic material row are configured to be relatively movable with respect to each other in the predetermined direction.

2. The magnetic machine as claimed in claim 1, wherein said m magnetic machine structures are configured to be each displaced from each other in the phase difference in electrical angle between said first magnetic poles of said first magnetic pole row and said second magnetic poles of said second magnetic pole row in the predetermined direction by an electrical angle of 2π/m, and are configured to be each displaced from each other in the phase difference in electrical angle between said first magnetic poles of said respective first magnetic pole row and said soft magnetic material elements of said respective soft magnetic material row in the predetermined direction by an electrical angle of π/m.

3. The magnetic machine as claimed in claim 1, wherein said first magnetic pole member includes m first magnetic pole rows in said m magnetic machine structures,
wherein said second magnetic pole member includes m second magnetic pole rows in said m magnetic machine structures, and
wherein said soft magnetic material member includes m soft magnetic material rows in said m magnetic machine structures.

4. The magnetic machine as claimed in claim 1, wherein at least one of said first magnetic pole member and said second magnetic pole member includes a plurality of armatures, and said plurality of armatures are configured to be capable of generating at least ones of said plurality of first magnetic poles and said plurality of second magnetic poles, and be capable of generating a moving magnetic field that moves in the predetermined direction, by the generated at least ones of said plurality of first magnetic poles and said plurality of second magnetic poles.

5. The magnetic machine as claimed in claim 1, wherein said first magnetic pole member includes a plurality of first permanent magnets arranged side by side in the predetermined direction, and said plurality of first magnetic poles are formed by magnetic poles of said plurality of first permanent magnets, and
wherein said second magnetic pole member includes a plurality of second permanent magnets arranged side by side in the predetermined direction, and said plurality of second magnetic poles are formed by magnetic poles of said plurality of second permanent magnets.

6. The magnetic machine as claimed in claim 1, wherein the predetermined direction is a circumferential direction about a predetermined axis.

7. The magnetic machine as claimed in claim 1, wherein the predetermined direction is a linear direction.

8. A magnetic machine comprising:
a first magnetic pole member including a plurality of first magnetic poles arranged such that said first magnetic poles are along a predetermined imaginary surface and each adjacent two thereof are different in polarity from each other;
a second magnetic pole member including a plurality of second magnetic poles arranged such that said second magnetic poles are along the predetermined imaginary surface and each adjacent two thereof are different in polarity from each other, and arranged in a manner spaced from said plurality of first magnetic poles; and
a soft magnetic material member including a plurality of soft magnetic material elements arranged along the predetermined imaginary surface in a manner spaced from each other between said plurality of first magnetic poles and said plurality of second magnetic poles,
wherein said plurality of first magnetic poles, said plurality of second magnetic poles, and said plurality of soft magnetic material elements are configured to be relatively movable with respect to each other along the predetermined imaginary surface in a predetermined moving direction,
wherein said plurality of first magnetic poles each extend in a first predetermined direction along the predetermined imaginary surface such that an electrical angle between opposite ends of each first magnetic pole becomes equal to θs,
wherein said plurality of second magnetic poles each extend in a second predetermined direction along the predetermined imaginary surface such that an electrical angle between opposite ends of each second magnetic pole becomes equal to θa,
wherein said plurality of soft magnetic material elements each extend in a third predetermined direction along the predetermined imaginary surface such that an electrical angle between opposite ends of each soft magnetic material element becomes equal to θb, and
wherein the three electrical angles θs, θa, and θb are set such that θs=2θb−θa holds.

9. The magnetic machine as claimed in claim 8, wherein the three electrical angles θs, θa, and θb are set such that one of the two electrical angles θs and θa is larger than the electrical angle θb by an electrical angle of π, and another of the two electrical angles θs and θa is smaller than the electrical angle θb by an electrical angle of π.

10. The magnetic machine as claimed in claim 8, wherein at least one of said first magnetic pole member and said second magnetic pole member has a plurality of armatures, and
wherein said plurality of armatures are configured to be capable of generating at least ones of said plurality of first magnetic poles and said plurality of second magnetic poles, and be capable of generating a moving magnetic field that moves in the predetermined moving direction, by the generated at least ones of said plurality of first magnetic poles and said plurality of second magnetic poles, and
wherein the three electrical angles θs, θa, and θb are set such that θs=2θb−θa holds during generation of the moving magnetic field.

11. The magnetic machine as claimed in claim 8, wherein said first magnetic pole member includes a plurality of first permanent magnets arranged side by side in the predetermined moving direction, said plurality of first magnetic poles being formed by magnetic poles of said plurality of first permanent magnets, and
wherein said second magnetic pole member includes a plurality of second permanent magnets arranged side by side in the predetermined moving direction, said plurality of second magnetic poles being formed by magnetic poles of said plurality of second permanent magnets.

12. The magnetic machine as claimed in claim 8, wherein the predetermined moving direction is a circumferential direction about a predetermined axis.

13. The magnetic machine as claimed in claim 8, wherein the predetermined moving direction is a linear direction.

* * * * *